US007242517B2

(12) United States Patent
Ghidini et al.

(10) Patent No.: US 7,242,517 B2
(45) Date of Patent: Jul. 10, 2007

(54) OPTICAL DEVICES COMPRISING SERIES OF BIREFRINGENT WAVEPLATES

(75) Inventors: Silvia Ghidini, Milan (IT); Luciano Socci, Milan (IT); Marco Romagnoli, Milan (IT); Pierluigi Franco, Padua (IT)

(73) Assignee: Pirelli & C. S.p.A., Milan (IT)

( * ) Notice: Subject to any disclaimer, the term of this patent is extended or adjusted under 35 U.S.C. 154(b) by 89 days.

(21) Appl. No.: 10/518,473

(22) PCT Filed: Jul. 31, 2002

(86) PCT No.: PCT/EP02/08541

§ 371 (c)(1),
(2), (4) Date: Dec. 20, 2004

(87) PCT Pub. No.: WO03/091789

PCT Pub. Date: Nov. 6, 2003

(65) Prior Publication Data

US 2005/0259325 A1    Nov. 24, 2005

(30) Foreign Application Priority Data

Apr. 24, 2002    (WO) ............... PCT/EP02/04504

(51) Int. Cl.
*H01S 4/00* (2006.01)
*G02B 5/30* (2006.01)
*G02B 27/28* (2006.01)

(52) U.S. Cl. ............... 359/333; 359/483; 359/494; 359/497

(58) Field of Classification Search ............... 359/333, 359/483, 494, 497
See application file for complete search history.

(56) References Cited

U.S. PATENT DOCUMENTS 4,988,170 A * 1/1991 Buhrer .................. 359/497

(Continued)

FOREIGN PATENT DOCUMENTS

EP    0 982 620 A2    3/2000

(Continued)

OTHER PUBLICATIONS

A. Yariv and P. Yeh, "Jones Calculus and Its Application to Birefringent Optical Systems," Chapter 5 of Optical Waves in Crystals, Propagation and Control of Laser Radiation, John Wiley & Sons, Inc., pp. 121-154 (1984).

*Primary Examiner*—Jack Keith
*Assistant Examiner*—Eric Bolda
(74) *Attorney, Agent, or Firm*—Finnegan, Henderson, Farabow, Garrett & Dunner, L.L.P.

(57) ABSTRACT

Bidirectional isolating devices including non-reciprocal rotators (i.e. Faraday rotators) and wavelength selective reciprocal polarization rotators are disclosed. Each wavelength selective rotator behaves like a half-wave retarder in a first frequency range and behaves like a full-wave retarder in a second frequency range, according to a substantially periodic transfer function. The rotation has a predetermined number of birefringent elements (e.g. waveplates), the thickness and the orientation of which are chosen so as to obtain a transition between the half-wave retarder behavior and the full-wave retarder behavior in a frequency range lower than or equal to 40% of the period of the transfer function. In order to satisfy such a requirement, a relatively high number of birefringent elements is required, i.e. at least the five birefringent elements. Advantageously, the isolating device may comply with any allocation scheme for the opposite propagating signals.

23 Claims, 35 Drawing Sheets

U.S. PATENT DOCUMENTS

| | | |
|---|---|---|
| 5,673,280 A | 9/1997 | Grubb et al. |
| 5,912,766 A | 6/1999 | Pattie |
| 6,400,508 B1 * | 6/2002 | Liu .............................. 359/495 |
| 2002/0024730 A1 | 2/2002 | Ducellier et al. |
| 2002/0027472 A1 * | 3/2002 | Lee et al. .................... 330/4.5 |
| 2002/0044335 A1 | 4/2002 | Islam et al. |

FOREIGN PATENT DOCUMENTS

| | | |
|---|---|---|
| EP | 1 079 249 A2 | 2/2001 |
| EP | 1 191 808 A2 | 3/2002 |
| WO | WO 01/35131 A1 | 5/2001 |

* cited by examiner

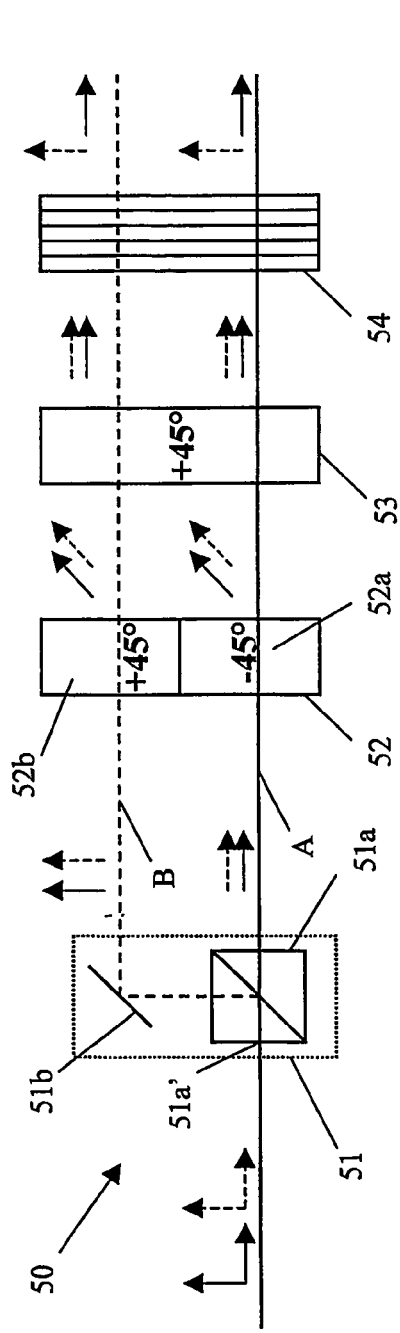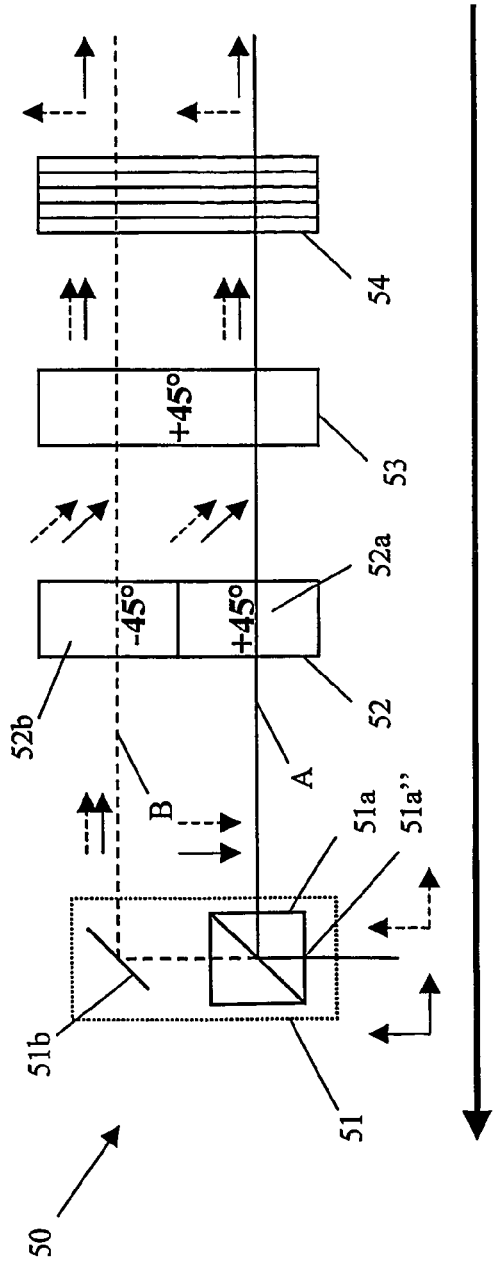

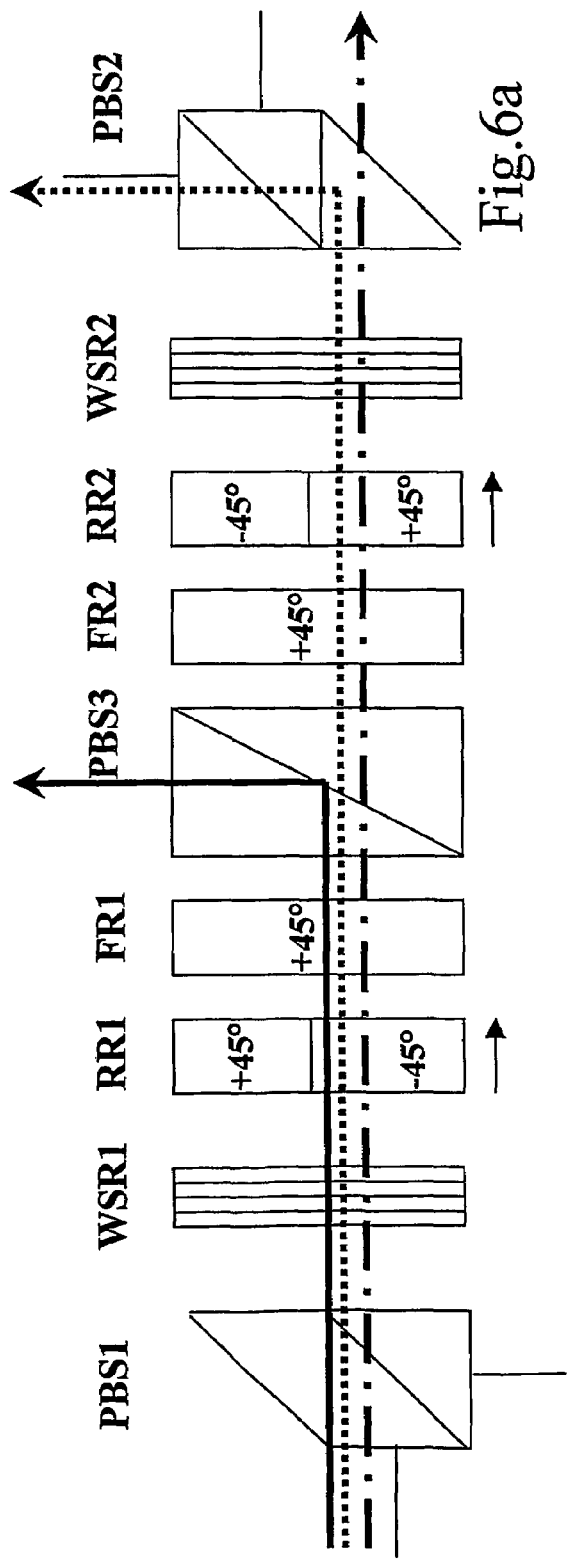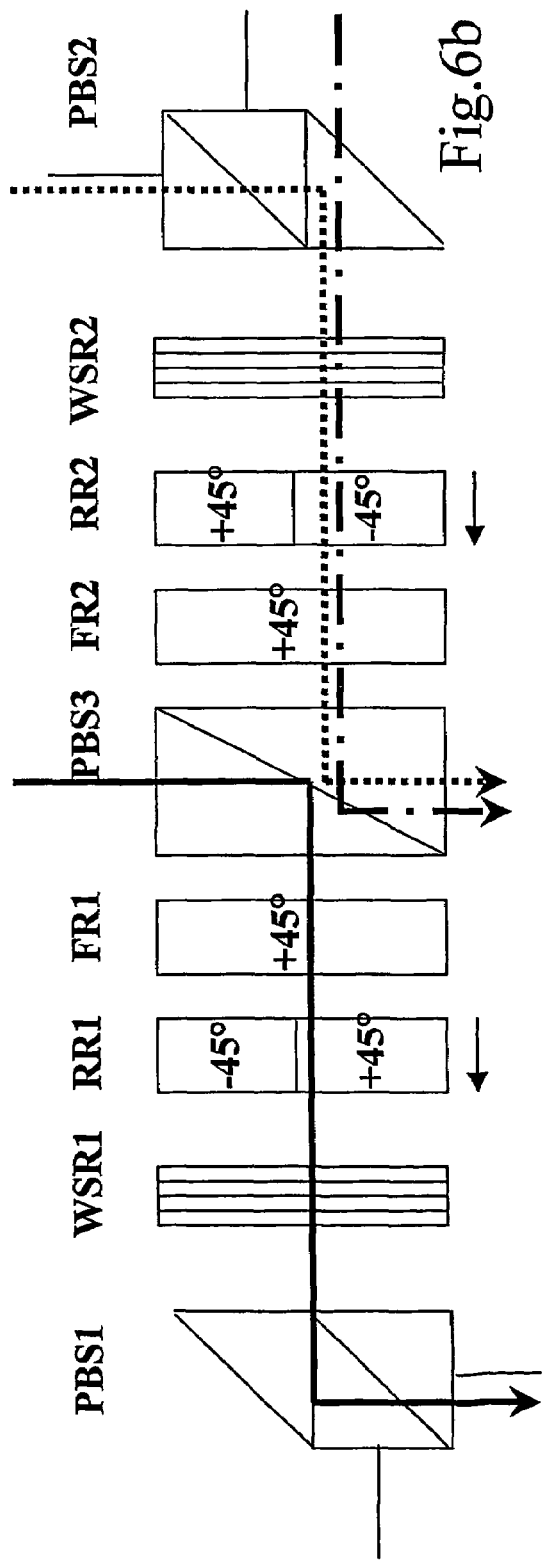

OPTICAL DEVICES COMPRISING SERIES OF BIREFRINGENT WAVEPLATES

CROSS REFERENCE TO RELATED APPLICATION

This application is a national phase application based on PCT/EP02/08541, filed Jul. 31, 2002, and claims the priority of PCT/EP02/04504, filed Apr. 24, 2002, the content of both of which is incorporated herein by reference.

BACKGROUND OF THE INVENTION

1. Field of the Invention

The present invention relates to optical devices for use in the field of optical communications.

2. Description of the Related Art

The use of optical fiber in long-distance transmission of voice and/or data is now common. As the demand for data carrying capacity in the transmission of voice and/or data continues to increase, there is a continuing need to augment the amount of actual fiber-optic cable being used as well as to utilize the bandwidth of existing fiber-optic cable more efficiently. One of the ways in which this last task may be performed is through the practice of wavelength division multiplexing (WDM) in which multiple information channels are independently transmitted over the same fiber using multiple wavelengths of light. In this practice, each lightwave-propagated information channel corresponds to light within a specific wavelength range or "band". To increase data carrying capacity in a given direction, the number of such channels or bands should be preferably increased.

Additionally, it is desirable to use existing fiber for bidirectional communications. Through the use of WDM, a single optical fiber may be used to transmit, both simultaneously and independently, eastbound (northbound) as well as westbound (southbound) data. However, since all of the channels preferably reside within specific wavelength regions, determined by the properties of existing optical fiber or of other devices in the transmission system, such as optical amplifiers, increased channel capacity requires increased channel density. Thus, as the need for increased data carrying capacity escalates, the demand on WDM optical components—to transmit increasing numbers of more closely spaced channels with no interference or "crosstalk" between them and over long distances—becomes more severe.

For example, in a first typical channel allocation scheme, westward propagating channels may have a center wavelength comprised in a first, relatively short ("blue"), wavelength band and eastward propagating channels may have a center wavelength comprised in a second, relatively long ("red"), wavelength band. The "blue" wavelength band and the "red" wavelength band occupy separate wavelength ranges wholly contained in the optical transmission window centered near a wavelength of about 1.55 μm.

In a second typical channel allocation scheme, westward and eastward propagating channels may respectively have a center wavelength spaced by a predetermined channel spacing "d". However, the center wavelengths of the eastward propagating channels are between the center wavelengths of the westward propagating channels (interleaved channels). For example, "even" channels $\lambda_2$, $\lambda_4$, $\lambda_6$, $\lambda_8$ may be westward propagating and "odd" channels $\lambda_1$, $\lambda_3$, $\lambda_5$, $\lambda_7$ may be eastward propagating.

Clearly, other channel allocation schemes may be used for implementing bidirectional optical communications. For the purposes of the present invention, it may be convenient to refer also to the optical frequency of the optical signals, in place of the wavelength thereof.

Back reflections of optical communications signals are a significant problem in optical systems. Such reflections may be generated at junctions between optical system components and/or may be due to scattering occurring along an optical fiber. They typically induce noise and distortion, which can significantly reduce and deteriorate the performance of a component and/or of the overall system. In particular, the back reflections are an acute problem in systems which include a gain element, such as an optical amplifier (either a rare earth doped amplifier or a semiconductor amplifier). In fact, reflections which travel back into the amplifier may be amplified and increase the error rate of the system or can cause the amplifier to randomly oscillate or begin to lase.

Optical isolators have been employed to inhibit reflections. To prevent oscillations or gain fluctuations occurring in the amplifier, isolators are usually employed at least at one end of an amplifier. Isolators are configured to allow optical signals to pass in one direction, but stop or inhibit signals traveling in the opposite direction.

In view of the difficulties caused by back reflections and the need to inhibit them with unidirectional isolators, gain elements are restricted to operating on signals transmitted in one direction. This imposes an increased cost burden on a system when gain is required in both directions of transmission on an optical fiber line, as in bidirectional optical communications.

However, devices suitable for allowing passage of optical signals of one wavelength band in one direction of travel and of optical signals of another wavelength band in the opposite direction of travel (and blocking back reflections in both cases) have already been proposed.

For example, U.S. Pat. No. 5,912,766, to Telstra Corporation Limited, discloses an optical isolator comprising two polarizer means, two input/output ports formed respectively on said polarizer means, and optical rotator means disposed between said polarizer means, said optical rotator means including Faraday rotator means and being selectively configured so that the isolator performs one of a plurality of isolator functions. The wavelength dispersion characteristics of said optical rotator means may determine said one of said isolator functions for at least two wavelength bands. In a disclosed embodiment, the isolator includes first and second input ports formed at the junction of respective graded-index (GRIN) lenses and spatial walk-off polarizers (SWPs). The isolator also includes a Faraday rotator and a reciprocal optical rotator disposed between the SWPs, such that all of the components form an in-line series assembly. The Faraday rotator and the reciprocal optical rotator are configured so as to provide one of a plurality of isolator functions for the isolator for two or more wavelength bands. For example, if $\lambda_1$ and $\lambda_2$ denote first and second wavelength bands, the functions may comprise isolate signals of $\lambda_2$ in one direction and isolate signals of $\lambda_1$ in the opposite direction, so that the isolator is allowed to function as a bidirectional isolator. The length of the Faraday rotator, which governs the length of the light transmission path therethrough, is selected so as to provide the rotator with a wavelength dispersion characteristic which gives rise to the desired polarization component rotation ±m 180°, where m is a non-negative integer. Similarly, the optical path length of the reciprocal optical rotator is selected to provide a wavelength dispersion characteristic which achieves the desired effective rotation ±m 180°. The reciprocal optical rotator may comprise half-wave plate or optically active material.

EP patent application No. 1,079,249, to JDS Uniphase Inc., discloses a bidirectional wavelength dependent optical isolator having two thick birefringent waveplates, having their optical axes oriented such that their birefringent axes are oriented differently, and a non-reciprocal element. The thick plates have a periodic wavelength response with polarization. In operation, even channels are passed while odd channels are blocked in a first direction from port 1 to port 2 and conversely, even channels are blocked and odd channels are passed in a second opposite direction from port 2 to port 1. In a disclosed embodiment, the first thick plate is half the length of the second thick plate and is oriented at 45° to vertically polarized incoming light and the second thick plate is oriented at 105° to the vertically polarized incoming light.

WO patent application No. 01/35131, to Avanex Corporation, discloses a bidirectional polarization independent optical isolator simultaneously transmitting two separate signal rays in opposite forward directions and simultaneously suppressing backward transmission of each signal ray in its respective reverse direction. The separate signal rays may comprise either two wavelength bands completely separated by wavelength (band bidirectional isolator) or two sets of wavelengths, such that wavelengths of the two signal rays are interspersed in alternating fashion (interleaved bidirectional isolator). The bidirectional polarization independent isolator includes a birefringent polarization separation/combining element, a reciprocal optical rotation element, a lens, a reflective element, and a reciprocal optical rotation element. The reflective element comprises either a mirror/waveplate assembly or a non-linear interferometer. More particularly, the mirror/waveplate assembly is disclosed in connection with the band bidirectional isolator and the non-linear interferometer is disclosed in connection with the interleaved bidirectional isolator. Four fibers or optical ports are optically coupled to the isolator and may be configured such that either single-stage bi-directional isolation is accomplished for each of two fiber transmission lines or double stage bi-directional isolation is accomplished on a single fiber transmission line.

EP patent application No. 1,191,808 discloses wavelength interleaving cross-connects that pass a first optical signal including a first set of optical frequencies in a first direction and a second optical signal including a second set of optical frequencies in a second direction. In one embodiment, the first optical signal, when input to a first input/output (I/O) port, is routed from the first I/O port to a third I/O port. The first optical signal, when input to a fourth I/O port, is routed from the fourth port to a second I/O port. The second optical signal, when input to the second I/O port, is routed from the second I/O port to the third I/O port. The second optical signal, when input to the fourth I/O port, is routed from the fourth I/O port to the first I/O port. Thus, by coupling an optical device (e.g., amplifier, filter) between the third port and the fourth port, the optical device can be used for bidirectional communications, thereby reducing the number of devices required for a bidirectional optical network architecture. Wavelength interleaving cross-connects disclosed in EP 1,191,808 are described in terms of filtering and routing even and odd International Telecommunications Union (ITU) channels. In one embodiment, the wavelength interleaving cross-connect has multiple half wave plates and two birefringent elements. A first half wave plate, a first birefringent element, a second half wave plate, a second birefringent element, and a third half wave plate together operate as a filtering element to filter optical signals that pass therethrough. The first birefringent element has optical path length of L and the second birefringent element has an optical path length of 2 L. In another embodiment, the wavelength interleaving cross-connect is combined with a pair of bidirectional isolators forming a uni-directional cross-connect with double-stage spectral isolation for use with an optical device, e.g. an amplifier. In another embodiment, the bidirectional isolators are combined into a single unit including a non-reciprocal rotator and a birefringent assembly.

U.S. patent application No. 2002/0024730 discloses bidirectional circulators based on interleaver technology, e.g. birefringent crystal interleaver technology, that enables signals containing even number ITU channels to travel in one direction through the device, while signals containing odd number ITU channels travel in opposite direction. In one embodiment, a bidirectional circulator is combined with a conventional three-port circulator to provide a four port device, which has two bidirectional ports and two uni-directional ports. Accordingly, signals traveling in opposite directions through a system can be passed in the same directions through an optical assembly coupled between the uni-directional ports. The optical assembly can be any one or more of: an erbium doped fiber amplifier, a fiber Bragg grating in transmission, a dynamic gain equalizer in transmission, a configurable add-drop multiplexer in transmission, a network monitoring device in transmission, and an isolating device.

The use of unidirectional optical isolators have also been proposed for applications exploiting Raman amplification. U.S. Pat. No. 5,673,280, to Lucent Technologies, discloses a low noise optical fiber Raman amplifier comprising an upstream and a downstream length of silica-based amplifier fiber, of combined length being more than 200 m, typically more than 1 km, with an optical isolator disposed between the upstream and downstream lengths of amplifier fiber, such that the passage of backscattered signal radiation from the latter to the former is substantially blocked. According to the authors, the provision of a multistage Raman amplifier, with an interstage isolator between adjacent stages, is an effective technique for reducing double Raman back scattering. Further, according to the authors, a multistage Raman amplifier with interstage isolator also increases the threshold for Brillouin scattering.

The Applicant observes that also in a unidirectional multistage Raman amplifier there may be signals that propagate in two opposite directions in the same fiber, i.e. the signal radiation amplified in the Raman amplifier fiber lengths and a counter-propagating pump radiation (typically a continuous wave signal) causing Raman amplification. In order to exploit Raman amplification, the pump wavelengths should be shifted in a lower wavelength region with respect to the signal wavelengths (typically with a shift of about 100 nm in silica-germania-based optical fibers). Advantageous configurations of counter-propagating Raman amplifiers may amplify an optical signal by using a first pump wavelength range in a first Raman fiber length and a second, different, pump wavelength range in a second Raman fiber length, so that three different wavelength ranges may be used in the same device (one for the signal, two for the pump radiation), two of which propagating in opposite directions with each other (see, for example, U.S. patent application No. 2002/0044335). However, the use of an isolator between the two Raman fiber lengths, as suggested in the above mentioned U.S. Pat. No. 5,673,280, would block the passage of the counter-propagating pump radiation from the downstream Raman fiber length to the upstream Raman fiber length. In preferred embodiments disclosed in '280, counter-propagating pump radiation is coupled into the downstream length of amplifier fiber, and wavelength-selective couplers are provided for shunting the pump radiation around the optical isolator. According to the Applicant, the use of a shunt circuit for allowing the counter-propagating pump radiation to propagate in the direction inhibited by the optical isolator may not represent an optimal solution, as it necessitates at least two more components, i.e. the wavelength selective couplers, increasing costs, complexity of the device and attenuation on the signal. The isolation requirements of the wavelength-selective couplers, which should be high in order to guarantee that signal and/or pump radiation are not lost in the shunt circuit, may be a further source of increasing costs.

The Applicant has tackled the problem of realizing optical devices being capable of passing and isolating signal radiations having different wavelengths traveling in opposite directions, i.e., bidirectional isolating devices. In particular, the Applicant has considered that different applications may require different schemes for the arrangement of allowed propagation directions (and forbidden directions) versus wavelength: for example, the opposite propagating signals may belong to mutually exclusive wavelength ranges or may have interleaved wavelengths; furthermore, the mutually exclusive wavelength ranges may be symmetrical or asymmetrical (i.e. they may have the same width or not); as another example, three or more different wavelength ranges may be used for the signal and the pump wavelengths in advantageous configurations of counter-propagating Raman amplifier. According to the Applicant, in such a complex framework the components included in a bidirectional isolating device should guarantee that, given a specific scheme, they may be simply reconfigured in order to allow the isolating device to comply with the specific scheme, without changing the type of device or the type of components included therein. In other words, the components included in the bidirectional isolating device should guarantee a high versatility of the device, in order to allow simple reconfigurations during the design thereof, according to the different requirements. Furthermore, the Applicant observes that another important feature that a bidirectional isolating device should comply with is the capability of allowing the use of as much wavelengths as possible for the opposite propagating signals, in order to maximally exploit the bandwidth available with optical fibers, in particular for WDM and dense WDM transmission: thus, the wavelength range dedicated to the transition between the wavelengths of optical signals allowed to travel in one direction and the wavelengths of optical signals allowed to travel in the opposite direction should be as small as possible.

SUMMARY OF THE INVENTION

The Applicant has found that such problem may be solved by arranging an isolating device including a non-reciprocal rotator (i.e. a Faraday rotator) and a wavelength selective reciprocal polarization rotator. The wavelength selective rotator behaves like a half-wave retarder for a first group of frequencies and behaves like a full-wave retarder for a second group of frequencies, according to a substantially periodic transfer function. More particularly, the wavelength selective rotator comprises a predetermined number of birefringent elements (e.g. waveplates), the thickness and the orientation of which are chosen so as to obtain a transition between the half-wave retarder behavior and the full-wave retarder behavior in a frequency range lower than or equal to the 40% of the period of the transfer function. In order to satisfy such a requirement a relatively high number of birefringent elements is required, i.e. at least five birefringent elements. Advantageously, the isolating device may comply with any allocation scheme for the opposite propagating signals. The Faraday rotator and the stack of birefringent elements may be easily packed together with polarization beam splitters, so as to obtain a very compact polarization independent device.

A non wavelength-selective reciprocal polarization rotator may be further included in the isolating device. The non-reciprocal polarization rotator, the non wavelength-selective reciprocal polarization rotator and the wavelength selective reciprocal polarization rotator may be arranged in the isolating device with a polarizer, so that an optical signal comprising a first signal having frequency in the first group of frequencies and a second signal having frequencies in the second group of frequencies, if input at the polarizer with any polarization, exits from the device so that the first signal is in a first polarization state and the second signal is in a second polarization state, orthogonal to the first polarization state.

More particularly, the Applicant has found that it is possible to build many different bidirectional isolating optical devices by combining together in suitable way a number of optical assemblies according to the above, including non-reciprocal polarization rotators and wavelength selective polarization rotators, in order to satisfy the requirements of many applications using bidirectional propagating signals.

In a first aspect, the invention relates to a bidirectional isolating device as defined in claim 1.

In a second aspect, the invention relates to an optical amplifier as defined in claim 14.

Preferred aspects are defined in the dependent claims.

BRIEF DESCRIPTION OF THE DRAWINGS

Further features and advantages of the present invention will be better illustrated by the following detailed description, herein given with reference to the enclosed drawings, in which:

FIGS. 5*a* and 5*b* schematically show a preferred embodiment of an optical assembly for a bidirectional device according to the invention;

FIGS. 6*a* and 6*b* schematically show the functioning of a preferred embodiment of an isolating device according to the invention, with three optical signals having different wavelengths, propagating respectively in a forward and in a backward direction;

FIG. 20b shows a magnification in the transition range;

FIG. 22b shows a magnification in the transition range;

FIG. 25b shows a magnification in the transition range;

FIG. 27b shows a magnification in the transition range;

FIGS. 30b and 30c show a magnification in the transition ranges;

FIG. 32b shows a magnification in the transition range;

DETAILED DESCRIPTION OF THE INVENTION

Optical devices according to the teachings of the present invention allow the routing in different optical paths and/or in different propagation directions of optical signals having wavelengths (or frequencies) included in different wavelength (frequency) bands. The routing is performed in an isolated manner, i.e. in such a manner that the same optical signals, if traveling in an opposite direction with respect to the assigned routing optical path, do not follow the same routing optical path, so that they can be blocked. In other words, the optical devices according to the teachings of the invention allow the propagation of optical signals having wavelengths (frequencies) in a certain wavelength (frequency) range only in predetermined optical paths and only in one propagation direction. The "forbidden" propagation directions or optical paths for optical signals in a first wavelength (frequency) range may be allowed for optical signals in a second wavelength (frequency) range. For these purposes, non-reciprocal rotators and wavelength-selective reciprocal rotators are combined together in optical devices according to the invention.

Figure 1:
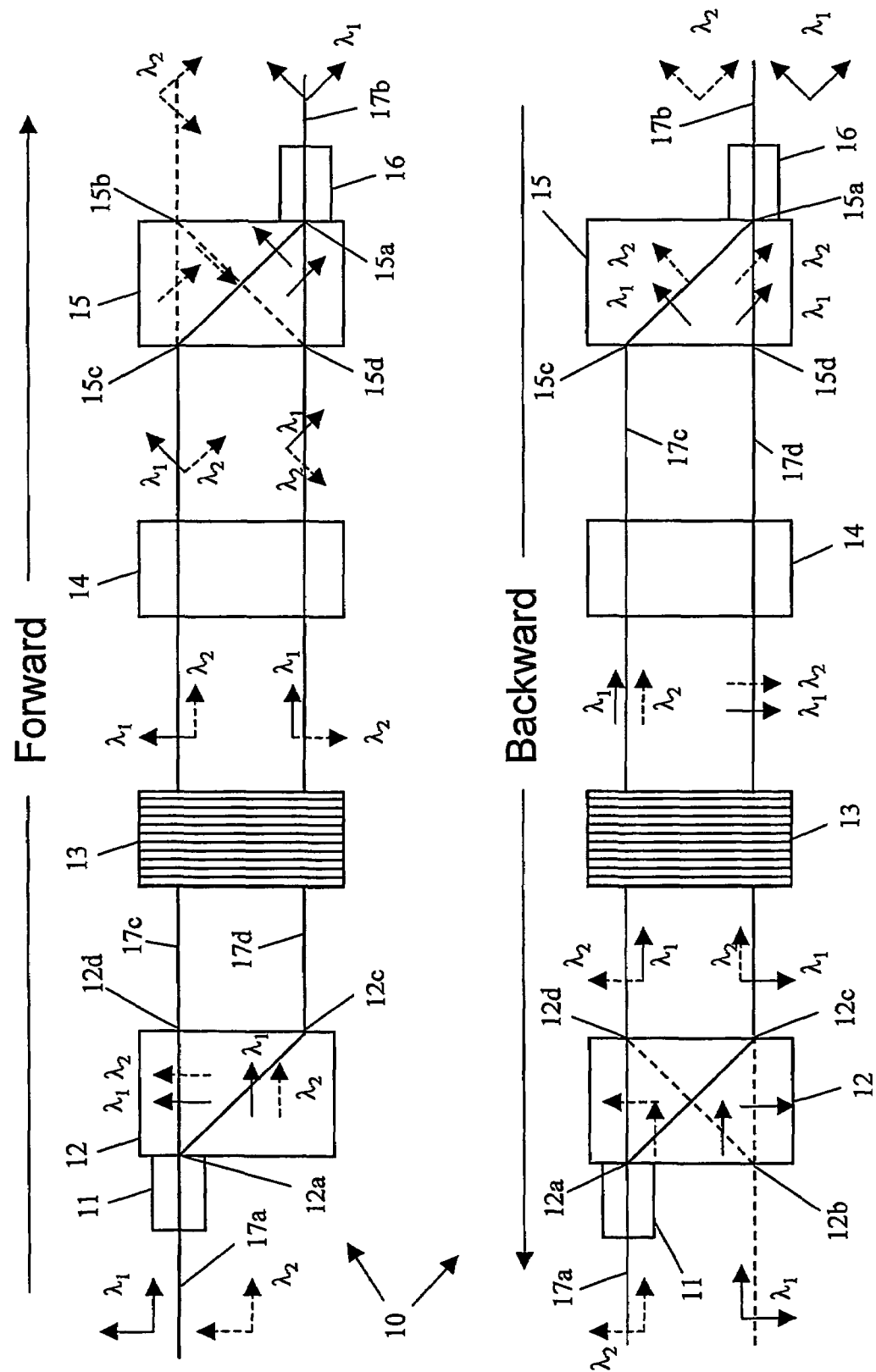
FIG. 1 schematically shows the structure and the functioning in a forward and in a backward direction of a preferred embodiment of a bidirectional isolating device according to the invention.

FIG. 1 schematically shows the structure and the functioning in a forward and in a backward direction of a preferred embodiment of a bidirectional isolating device according to the invention. More particularly, FIG. 1 schematically shows the structure and the functioning in a forward and in a backward direction of a preferred embodiment of a bidirectional isolator 10. The isolator 10 comprises two GRIN lenses 11, 16, two polarizers 12, 15, a wavelength selective reciprocal polarization rotator 13 and a non-reciprocal (or Faraday) rotator 14. The wavelength selective reciprocal polarization rotator 13 and the non-reciprocal Faraday rotator 14 are optically arranged between the two polarizers 12, 15.

The GRIN lenses 11 and 16 may be preferably used for focusing on the input/output ports 12a and 15a of the polarizers 12 and 15 the light propagating on optical paths 17a and 17b. Suitable components other than GRIN lenses may be used for such purpose. The optical paths 17a and 17b may include optical fibers, typically single mode optical fibers.

The polarizers 12, 15 are adapted for obtaining an output optical signal polarized along a predetermined polarization direction. In the preferred embodiment shown in FIG. 1, the polarizers 12 and 15 are adapted to split light having any polarization into two separate optical paths, in which perpendicular polarizations are propagated. In the same manner, the polarizers 12, 15 allow recombination on a same optical path of light propagating into two separate optical paths in perpendicular polarizations. To such purpose, polarization beam splitters (or walk-off polarizers), suitably oriented, may be used. In particular, they may be used in the optical isolator 10 in order to make it independent on polarization, which may be advantageous for use with typical, non-polarization maintaining optical fibers. If polarized light is used, polarization beam splitters 12 and 15 may be substituted by simple polarizing waveplates, suitably oriented, or other polarizers.

The reciprocal wavelength selective polarization rotator 13 comprises a stack of birefringent elements, having their axes of polarization oriented so that a first group of polarized signals having wavelengths in a first group of wavelengths does not undergo any rotation of the polarization state (or undergoes a rotation of $\pm n_1 180°$, wherein $n_1$ is a non-negative integer), whereas a second group of polarized signals having wavelengths in a second group of wavelengths may undergo rotation of their axes of polarization of $90°\pm m_1 180°$, wherein $m_1$ is a non-negative integer. The polarization rotator 13 is reciprocal, i.e. it changes the rotation direction of the polarization of the incoming signal (clockwise or counterclockwise) according to the direction of the incoming light (forward or backward). The first group of signals and the second group of signals may have wavelengths disposed according to any allocation scheme: for example, the first group of signals may have wavelengths comprised in a first wavelength range and the second group of signals may have wavelengths comprised in a second wavelength range, the first and the second wavelength ranges being mutually exclusive. The wavelength ranges may have the same width or not. As another example, the first and the second group of signals may have interleaved wavelengths. According to the allocation scheme to be accomplished, the number, the thickness and the orientation of the axes of polarization of the birefringent elements used in the polarization rotator 13 may be determined, according to a technique that will be described in the following.

The Faraday rotator 14 rotates the polarization state of any polarized incoming signal substantially of an angle of $45°\pm k\cdot 90°$, wherein k is a non-negative integer. Small variations of the above angle may be tolerated in dependence of the isolation requirements. The Faraday rotator may be of any kind, either comprising a single rotation element or a plurality of rotation elements, either in a signal single-pass or in a signal multi-pass configuration, so as to provide an overall rotation of $45°\pm k\cdot 90°$. It is non-reciprocal, in the sense that the direction of rotation (clockwise or counter-clockwise) does not change with the changing of the direction of the incoming signal.

The bidirectional isolator 10 of FIG. 1 may be packaged by advantageously contacting the various components to each other, such that all of the components form an in line series compact assembly. Transparent glues may be used in order to improve the steady positioning of the various components.

FIG. 1 also shows the functioning of the bidirectional isolator 10, by considering a first group of signals propagating in a forward direction (from left to right, upper figure) and a second group of signals propagating in a backward direction (from right to left, lower figure). Let $\lambda_1$ be the wavelength of a signal belonging to the first group of signals. Let $\lambda_2$ be the wavelength of a signal belonging to the second group of signals.

In a forward direction (upper figure), signals having wavelength $\lambda_1$ should be allowed to propagate, whereas possible back-reflection of radiation having wavelength $\lambda_2$ propagating in forward direction should be blocked. Let's consider a signal of wavelength $\lambda_1$ and a back-reflected signal of wavelength $\lambda_2$, both propagating in forward direction on the optical path 17a, both having any polarization. The first GRIN lens 11 focuses both signals on the first input port 12a of the first polarization beam splitter 12. The first polarization beam splitter 12 separates the polarizations of the two signals, so that the horizontal polarizations of both signals exit from the first output port 12c and the vertical polarizations of both signals exit from the second output port 12d of the first polarization beam splitter 12. The two polarizations of both signals propagate on the two separate optical paths 17c and 17d. The polarization rotator 13 leaves the polarization state of the signal having wavelength $\lambda_1$ unchanged and rotates of 90° the polarization state of the signal having wavelength $\lambda_2$. For example, let's suppose that the polarization rotator 13 rotates the polarization of the signal having wavelength $\lambda_2$ in clockwise direction as such signal propagates forward. Thus, on the optical path 17c the signal having wavelength $\lambda_1$ exits from the rotator 13 with a vertical polarization, whereas the signal having wavelength $\lambda_2$ exits from the rotator 13 with a horizontal polarization. On the contrary, on the optical path 17d the signal having wavelength $\lambda_1$ exits from the rotator 13 with a horizontal polarization, whereas the signal having wavelength $\lambda_2$ exits from the rotator 13 with a vertical polarization. The Faraday rotator 14 rotates the polarization of both signals on both optical paths 17c, 17d of the same angle independently of the propagation direction of the incoming signal, for example 45° clockwise. Thus, on the optical path 17c the signal having wavelength $\lambda_1$ exits from the Faraday rotator 14 with a polarization oriented at +45°, whereas the signal having wavelength $\lambda_2$ exits from the Faraday rotator 14 with a polarization oriented at −45°. On the optical path 17d the signal having wavelength $\lambda_1$ exits from the Faraday rotator 14 with a polarization oriented at −45°, whereas the signal having wavelength $\lambda_2$ exits from the Faraday rotator 14 with a polarization oriented at −135°. The two signals propagating on the two separated optical paths 17c and 17d, with polarizations according to the above, thus arrive to the first and second output ports 15c, 15d of the second polarization beam splitter 15. The second polarization beam splitter 15 is oriented at +45° with respect to the first polarization beam splitter 12, so that it may recombine the signal having wavelength $\lambda_1$ on its first input port 15a. Further, it may recombine the back-reflected signal having wavelength $\lambda_2$ on its second input port 15b. Alternatively, the two polarizations of the signal having wavelength $\lambda_2$ may not be recombined together. In any case, the back-reflected signal having wavelength $\lambda_2$ is separated by the signal having wavelength $\lambda_1$, and may be eliminated (e.g., by absorption), whereas the signal having wavelength $\lambda_1$ may be allowed to propagate, through the second GRIN lens 16, on the optical path 17*b*.

In a backward direction (lower figure), signals having wavelength $\lambda_2$ should be allowed to propagate whereas possible back-reflection of radiation having wavelength $\lambda_1$ propagating in backward direction should be blocked. Let's consider a signal of wavelength $\lambda_2$ and a back-reflected signal of wavelength $\lambda_1$, both propagating in backward direction on the optical path 17*b*, both having any polarization. The second GRIN lens 16 focuses both signals on the first input port 15*a* of the second polarization beam splitter 15. The second polarization beam splitter 15 separates the polarizations of the two signals, so that both signals exit from the first output port 15*c* with a polarization oriented at +45° and from the second output port 15*d* with a polarization oriented at −45°. The two perpendicular polarizations of both signals propagate on the two separate optical paths 17*c* and 17*d*. The Faraday rotator 14 rotates clockwise the polarization of both signals on both optical paths 17*c*, 17*d* of an angle of 45°. Thus, on the optical path 17*c* both signals having wavelength $\lambda_1$, $\lambda_2$ exit from the Faraday rotator 14 with horizontal polarization, whereas on the optical path 17*d* both signals having wavelength $\lambda_1$, $\lambda_2$ exit from the Faraday rotator 14 with vertical polarization. The polarization rotator 13 leaves the polarization state of the signal having wavelength $\lambda_1$ unchanged and rotates (counterclockwise, for signals propagating in backward direction) of 90° the polarization state of the signal having wavelength $\lambda_2$. Thus, on the optical path 17*c* the signal having wavelength $\lambda_1$ exits from the rotator 13 with a horizontal polarization, whereas the signal having wavelength $\lambda_2$ exits from the rotator 13 with a vertical polarization. On the contrary, on the optical path 17*d* the signal having wavelength $\lambda_1$ exits from the rotator 13 with a vertical polarization, whereas the signal having wavelength $\lambda_2$ exits from the rotator 13 with a horizontal polarization. Then, the two signals propagating on the two separated optical paths 17*c* and 17*d*, with polarizations according to the above, arrive at the first and second output ports 12*c*, 12*d* of the first polarization beam splitter 12. The first polarization beam splitter 12 is oriented so that it may recombine the signal having wavelength $\lambda_2$ on its first input port 12*a*. Further, it may recombine the back-reflected signal having wavelength $\lambda_1$ on its second input port 12*b*. Alternatively, the two polarizations of the signal having wavelength $\lambda_1$ may not be recombined together. In any case, the back-reflected signal having wavelength $\lambda_1$ is separated by the signal having wavelength $\lambda_2$, and may be eliminated (e.g., by absorption), whereas the signal having wavelength $\lambda_2$ may be allowed to propagate, through the first GRIN lens 11, on the optical path 17*a*.

The wavelength selective reciprocal polarization rotator 13 used in the bidirectional optical isolator 10 according to the invention includes a predetermined number of birefringent elements having a predetermined thickness and orientation versus a reference polarization direction. For example, the reference direction may be the horizontal polarization or the vertical polarization of a signal emerging from the first polarizer 12. In preferred embodiments, the birefringent elements may be birefringent waveplates. Alternatively, the birefringent elements may be portions of birefringent optical fiber (see, for example, H. D. Ford, Ralph P. Tatam, "*Birefringent-fiber wavelength filters*", SPIE Proceedings Vol. 2341 (1994), pp. 173-181). The different orientation of the axes of polarization of the birefringent elements allows an energy exchange between orthogonal polarized modes of a signal propagating therethrough: such energy exchange depends on the wavelength of the signal, so that the stack of birefringent elements may behave like a full wave retarder (e.g. like a $\lambda$-waveplate) for signals having wavelength in a first group of wavelengths and like a half-wave retarder (e.g. like a $\lambda/2$-waveplate) for signals having wavelength in a second group of wavelengths, according to a predetermined transfer function. For the purposes of the present invention, it is convenient to refer also to the optical frequency of the signals, in place of the wavelength thereof. Referring to frequencies, the stack of birefringent elements behaves like a full wave retarder for signals having frequency in a first group of frequencies and like a half-wave retarder for signals having frequency in a second group of frequencies. Such behavior may be experimentally verified by enclosing the stack of birefringent elements between two polarizing waveplates having orthogonal polarizations with each other. A light having a frequency in the first group of frequencies is almost wholly blocked, whereas a light having a frequency in the second group of frequencies is almost wholly transmitted. The resulting curve of transmittance versus frequency (or wavelength) will be referred as "transfer function" of the stack of birefringent elements. Practically, a full wave behavior of the stack of birefringent elements may correspond to values of transfer function of at most 0.05, preferably of at most 0.01, whereas a half wave behavior may correspond to values of transfer function of at least 0.95, preferably of at least 0.99. In practice, a substantially frequency periodic transfer function is chosen for complying with the bidirectional allocation scheme to be accomplished. For example, if the first group of frequencies and the second group of frequencies belong to mutually exclusive frequency ranges, respectively a first frequency range and a second frequency range, the period of the function may be comprehensive of the first frequency range, of the second frequency range and typically of a transition frequency region between the first and the second frequency range. The first and the second frequency ranges may have the same width or not. In other words, the transfer function may be either symmetrical or asymmetrical with respect to the transition between the full wave behavior and the half wave behavior. As another example, the first and the second group of frequencies may correspond to interleaved frequencies, e.g. according to the ITU recommendations. In such case, the period of the function may be practically two times the frequency spacing between a frequency belonging to the first group and a frequency belonging to the second group. However, also in this case a transition between a full wave behavior and a half wave behavior is obtained.

By suitably choosing (for example by computer simulation) the number, the thickness and the orientation of the birefringent elements included in the stack, it is possible to obtain any substantially frequency periodic transfer function for the stack of birefringent elements, matching with the required bidirectional allocation scheme. In particular, signal frequencies having a certain assigned propagation direction (e.g. eastward) are associated with the full wave behavior of the stack of birefringent elements, whereas signal frequencies having assigned the opposite propagation direction (e.g. westward) are associated with the half wave behavior of the stack of birefringent elements. However, in order to maximally exploit the optical bandwidth available with typical optical fibers and/or optical amplifiers, it is important to minimize the frequency range dedicated to the transition between the full wave behavior and half wave behavior of the stack of birefringent elements. In fact, the frequencies included in such transition frequency range cannot be used for the allocation of optical signals, i.e., for carrying an information signal, because they would not correspond to a well defined allowed propagation direction (and forbidden direction) in a bidirectional isolating device including the stack of birefringent elements. In other words, as the frequencies included in the transition range between the full wave behavior and the half wave behavior represent a sort of "waste" of bandwidth, such transition range has to be minimized in order to maximize the quantity of information that can be transmitted along an optical system. This is of particular importance in applications exploiting mutually exclusive frequency ranges for bidirectional transmission, in which, for example, a first frequency range is dedicated to eastward propagation and a second, separate frequency range is dedicated to westward propagation. In order to define the transition frequency range between the full wave behavior and the half wave behavior of the stack of birefringent elements, it is convenient to refer to the period of the transfer function of the stack of birefringent elements. An acceptable loss of bandwidth for most bidirectional applications may be obtained by limiting the transition frequency range to at most the 40%, preferably at most the 30%, more preferably at most the 20% of the period of the transfer function. For the purposes of the present invention, the transition frequency range is identified as the frequency range in each period of the transfer function in which the transfer function takes a value included between the 5% and the 95% of the maximum value reached by the transfer function. The steepness of the transition required for satisfying the above requirements may be obtained by using a high number of birefringent elements: in fact, the higher the steepness required, the higher the number of birefringent elements to be included in the stack of birefringent elements. A number of at least five birefringent elements may be sufficient by choosing appropriately the thickness of the birefringent elements, as it will be shown in the following with reference to some examples. Preferably, at least eight, more preferably at least nine, even more preferably at least ten birefringent elements may be used.

Figure 2:
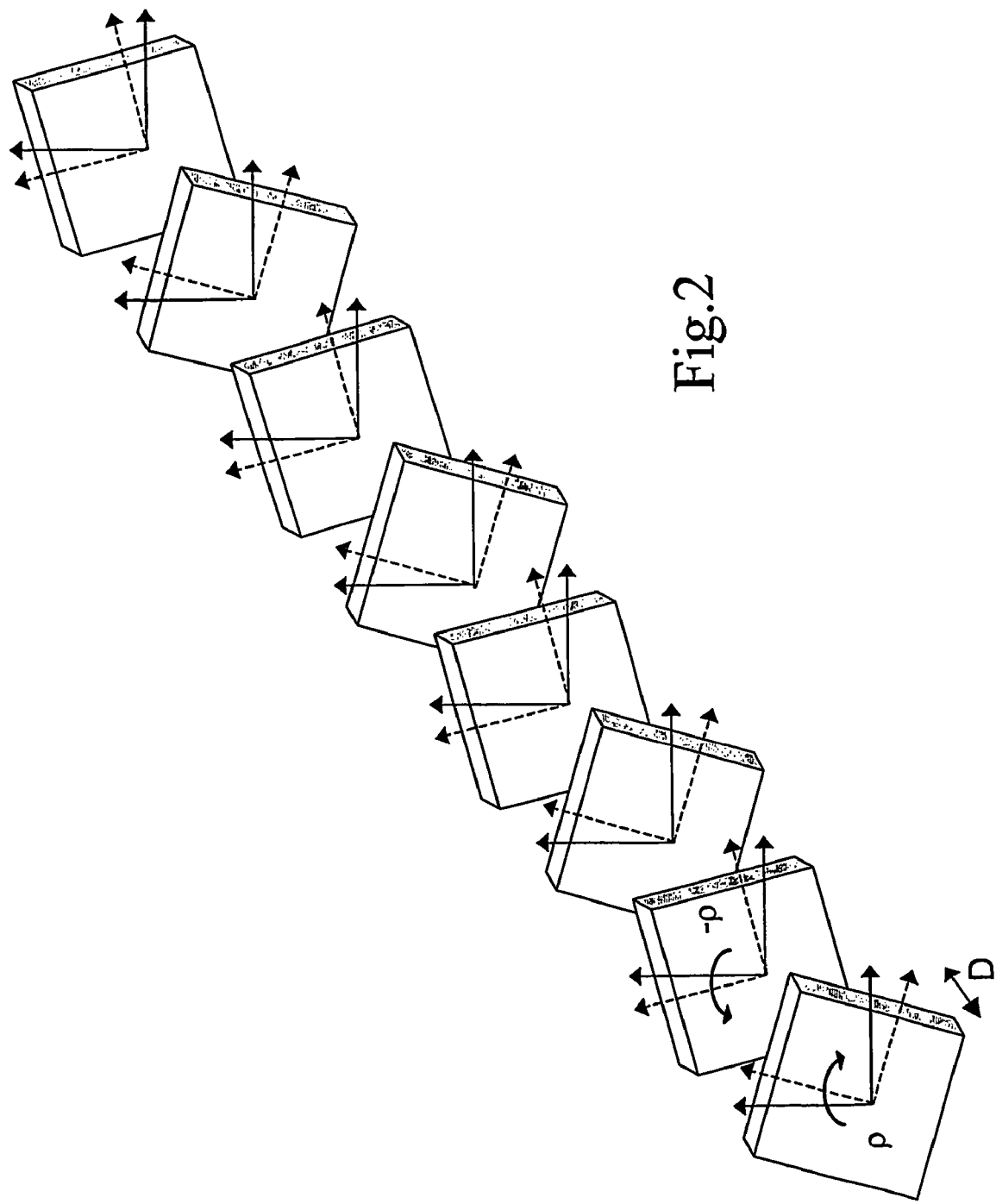
FIG. 2 schematically shows a plurality of birefringent waveplates having thickness D and axes of polarization (dashed lines) differently oriented versus a predetermined polarization direction (continuous lines)

For example, in order to design the stack of birefringent elements, i.e. in order to find the number, the thickness and the orientation of the birefringent elements to be included in a stack to obtain a predetermined transfer function, the known principle of the Solc filters may be advantageously exploited. A Solc filter is made by a plurality of birefringent elements having substantially the same thickness disposed so as their axes of polarization are differently oriented versus a predetermined reference polarization direction (see FIG. 2). In the framework of the present invention the expression "having substantially the same thickness" means that the elements of the stack have a maximum thickness variation of 2%, preferably 1%, more preferably 0.6% with respect to the average thickness. Clearly, a birefringent element having a certain orientation and a thickness L may be practically realized by approaching to each other N birefringent elements having an overall thickness L (for example N birefringent elements having a thickness L/N), all oriented in the same direction. Techniques explained in the article of S. E. Harris et al., "*Optical Network Synthesis Using Birefringent Crystals.\*I. Synthesis of Lossless Networks of Equal-Length Crystals*", Journal of the Optical Society of America, vol. 54, No. 10 (1964), may be used in order to perform the synthesis of the birefringent elements for any arbitrarily prescribed transfer function. The prescribed transfer function, assumed to be periodic, is approximated by an exponential series containing a finite number of terms i. The number of birefringent elements corresponds to i−1. In order to find the orientation of the elements, a Fourier transform of the approximated function is performed. The thickness t of each birefringent element may be found by the following formula:

$$t = \frac{c}{A\Delta n}$$

wherein c is the speed of light, A is the frequency period of the chosen function and $\Delta n$ is the birefringence. Thus, a low birefringence and/or a low period of the transfer function may lead to a higher thickness of the elements. For example, for a spacing of 100 GHz between interleaved channels in a bidirectional system, the period of the transfer function should be 200 GHz. With a birefringence of 0.1 an element thickness of 15 mm is found with the above formula. With a period of 4 THz (roughly corresponding to the C-band of an erbium doped fiber amplifier, i.e. 1530 nm-1560 nm) and a birefringence of $5 \cdot 10^{-2}$, a thickness of 1.5 mm is found.

The design of the stack of birefringent elements may be alternatively performed by using known teachings related to other types of filters, different from Solc filters. A review of various types of filters using birefringent elements may be found in the book of A. Yariv and P. Yeh, "*Optical waves in crystals*", John Wiley & Sons, Inc. (1984), at chapter 5.

The number and the thickness of the birefringent elements may be preferably set by taking into account the overall attenuation introduced by the stack of birefringent elements. Preferably, such attenuation may be kept lower than 0.5 dB, more preferably lower than or equal to 0.2 dB for both the first and the second group of frequencies. A lower thickness of the birefringent elements allows to obtain a lower attenuation and a compact device. Preferably, in order to obtain a low element thickness, a birefringence of the element material higher than or equal to $1 \cdot 10^{-2}$ may be used. More preferably, a birefringence higher than or equal to $5 \cdot 10^{-2}$ may be used. Typical birefringent materials suitable for manufacturing birefringent waveplates suitable for the stack are mica, quartz, lithium niobate, barium titanate, calcite or sodium nitrate.

In order to overcome possible problems caused by thickness variation of the birefringent elements due to fabrication tolerances, the birefringent elements may be disposed so that a birefringent element having a thickness slightly lower than the calculated optimal thickness alternates to a birefringent element having a thickness slightly higher than the calculated optimal thickness. Alternatively, a substantially random distribution in thickness may be adopted. In any case, a systematic error in the thickness of the birefringent elements with respect to the calculated optimal thickness value should be avoided, in order to obtain the desired transition between the full-wave retardation behavior and the half-wave retardation behavior, in particular for applications in which such transition should be obtained in a small wavelength range. For applications in a wavelength range around 1550 nm, a systematic error of 1% with respect to the calculated optimal thickness may lead to a shift of the transition between full-wave and half-wave behavior of about ±15 nm, that may be unacceptable for some applications.

The bidirectional isolator 10 according to the preferred embodiment of the invention above disclosed may be used in a bidirectional optical system, i.e., in an optical system in which a first group of signals having a first group of wavelengths is used for transmitting information in a forward direction (e.g. east to west) and a second group of signals having a second group of wavelengths is used for transmitting information in a backward direction (e.g. west to east). Typically, the bidirectional isolator 10 may be used in an optical amplifier.

Figure 3:
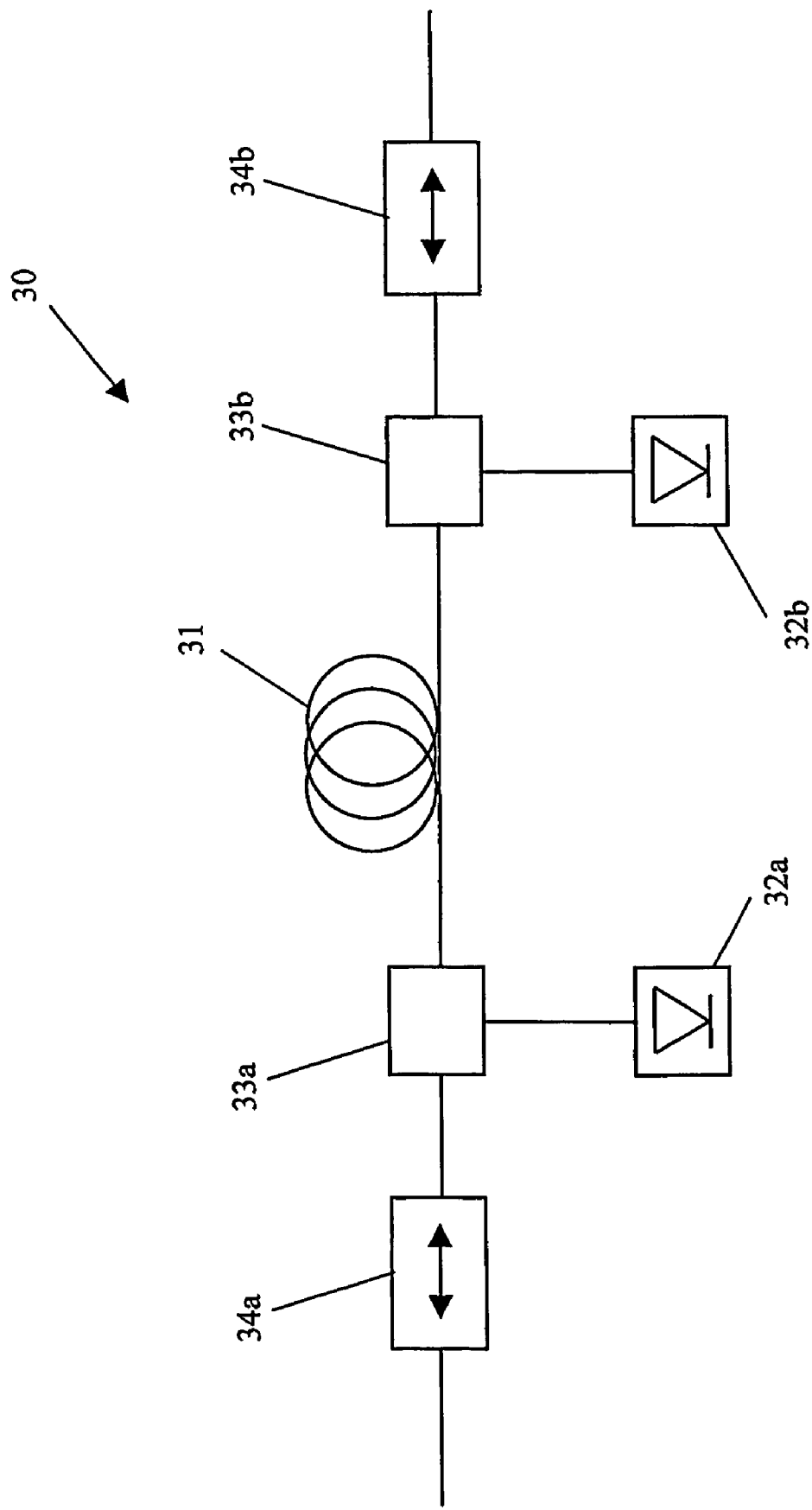
FIG. 3 schematically shows a preferred embodiment of a bidirectional optical amplifier using bidirectional isolators according to the invention.

FIG. 3 schematically shows a preferred embodiment of a bidirectional optical amplifier 30 using bidirectional isolators according to the invention. The bidirectional amplifier 30 comprises at least one optical amplifying medium 31 and a pumping system adapted for providing a pumping power and for coupling such pumping power to the optical amplifying medium. For example, the amplifying medium 31 may be a rare-earth doped optical fiber, e.g. an erbium-doped optical fiber. Alternatively, the amplifying medium 31 may be a Raman-active fiber, i.e. an optical fiber capable of obtaining a gain by stimulated Raman scattering. The pumping system may include at least one pump laser 32a and at least one WDM coupler 33a. The amplifying medium 31 is connected to a first port of the WDM coupler 33a and the pump laser 32a is connected to a second port of the WDM coupler 33a. Preferably, the optical amplifier 30 also comprises a second pump laser 32b and a second WDM coupler 33b. At least one bidirectional isolator 34a according to the invention may be included in the optical amplifier 30. Preferably, a second bidirectional isolator 34b according to the invention may be included in the optical amplifier 30.

In operation, a first group of signals having frequency comprised in a first group of frequencies propagates in a forward direction and a second group of signals having frequency comprised in a second group of frequencies propagates in a backward direction through the amplifying medium 31. Typically, the first and the second group of frequencies may correspond to wavelengths in a range around 1550 nm. The first and second group of frequencies may be comprised in mutually exclusive frequency ranges. For example, the first group of signals may have frequencies corresponding to a wavelength lower than or equal to 1565 nm. Preferably, the first group of signals may have frequencies corresponding to a wavelength higher than or equal to 1545 nm. The second group of signals may have frequencies corresponding to a wavelength higher than or equal to 1525 nm. Preferably, the second group of signals may have frequencies corresponding to a wavelength lower than or equal to 1535 nm. Alternatively, the frequencies of the first group of signals may be interleaved to the frequencies of the second group of signals. The pump lasers 32a and 32b provide pumping radiation suitable for amplifying the signal radiation of the first and the second group of wavelengths. For example, suitable pumping radiation for erbium-doped fibers may have frequencies corresponding to a wavelength around 980 nm or around 1480 nm, or even higher wavelengths. Such pumping radiation is coupled into the amplifying medium 31 through the WDM couplers 33a, 33b, together with the signal radiation, i.e. with both the first and the second group of signals. The bidirectional isolator 34a (or isolators 34a, 34b) allows the propagation of the first group of signals in forward direction and the propagation of the second group of signals in backward direction. At the same time, the bidirectional isolator 34a (or isolators 34a, 34b) blocks back-reflected radiation having frequency comprised in the first group of frequencies propagating in backward direction and back-reflected radiation having frequency comprised in the second group of frequencies propagating in forward direction.

In another application, the bidirectional isolator according to the invention may be used in a multiple stage optical amplifier using counter-propagating pump radiation, i.e., an optical amplifier in which an optical signal to be amplified and an optical pumping radiation having a different wavelength with respect to the wavelength of the optical signal propagate in opposite directions with each other into the amplifier.

Figure 4:
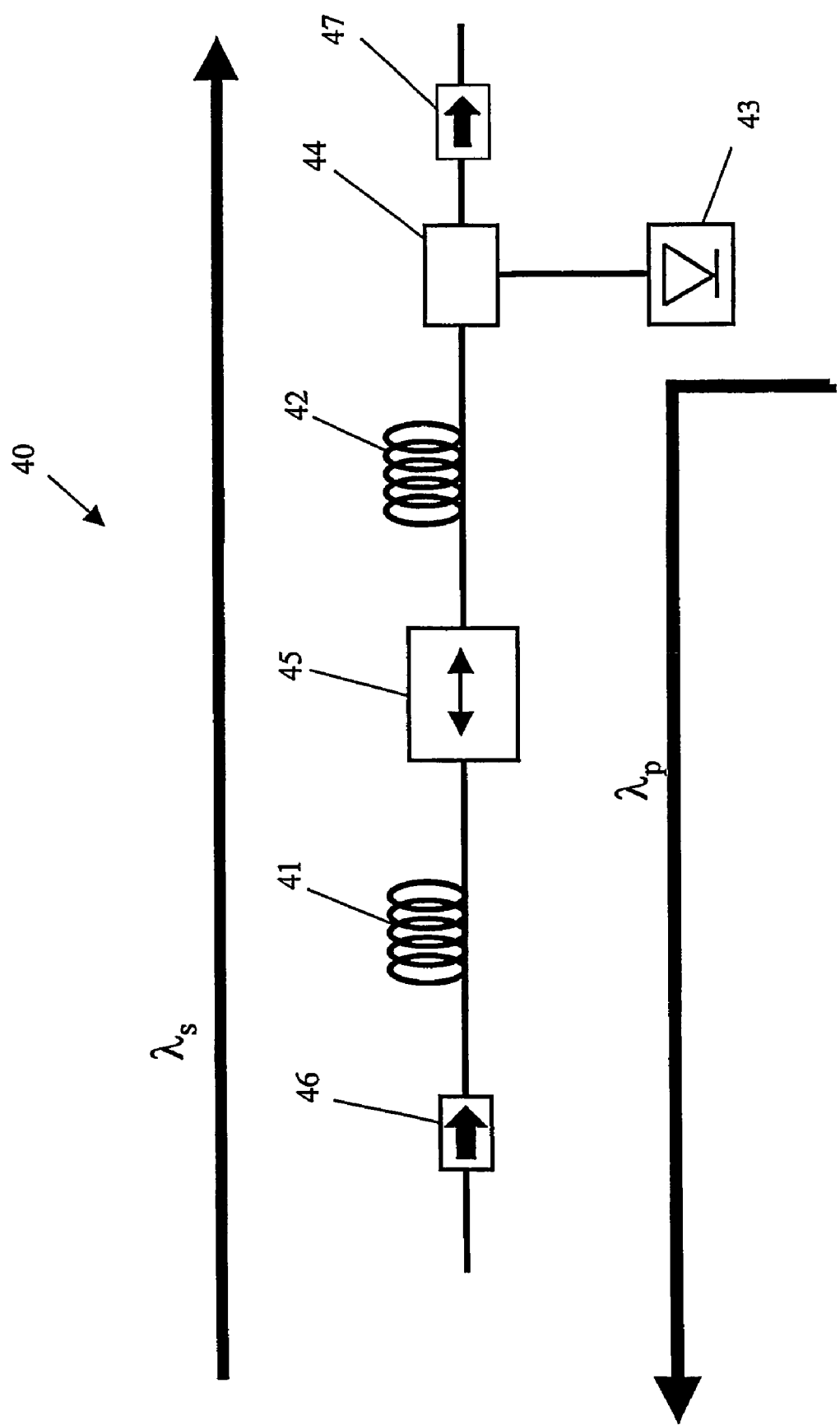
FIG. 4 schematically shows a preferred embodiment of a double stage amplifier exploiting counter-propagating pump radiation, using a bidirectional isolator according to the invention.

For example, FIG. 4 schematically shows a preferred embodiment of an optical amplifier 40 using counter-propagating pump radiation. Optical amplifier 40 comprises at least a first amplifying medium 41 and a second amplifying medium 42, at least one pump source 43 and a coupler 44, suitable for coupling optical pumping radiation emitted by pump source 43 into said second amplifying medium. For example, first and second amplifying media 41, 42 may be lengths of Raman-active optical fibers, i.e. fibers capable of obtaining a gain by the Raman effect, i.e. by stimulated Raman scattering. Typically, the Raman-active fibers may be silica-based fibers. Typically, such silica-based fibers have a core comprising germania or another dopant suitable for enhancing the Raman effect inside the core. Preferably, the sum of the lengths of the Raman-active fibers may be lower than or equal to about 10 km, more preferably lower than or equal to about 8 km. Typically, the optical signal to be amplified may use one or more wavelengths comprised in a range around 1550 nm. Preferably, the optical signal may use one or more wavelengths higher than or equal to 1510 nm, more preferably higher than or equal to 1525 nm. Preferably, the optical signal may use one or more wavelengths lower than or equal to 1630 nm, more preferably lower than or equeal to 1610 nm. For the purpose of Raman amplification of an optical signal having wavelength comprised in the specified range in silica-based fibers, a pump radiation having a wavelength lower than or equal to 1510 nm may be used. Preferably, such pump radiation may have a wavelength higher than or equal to 1400 nm. Multiple pump lasers, for example adapted for emitting pump radiation at different wavelengths, may be used in the pump source 43.

In another example, first and second amplifying media 41, 42 may be rare-earth doped optical fibers, e.g., erbium doped fibers. For amplification of an optical signal using one or more wavelengths in the range above specified a pumping radiation having a wavelength around 1480 nm may be exemplarily used.

The optical amplifier 40 is adapted for amplifying an optical signal using one or more wavelengths $\lambda_s$, propagating in a forward direction. The wavelength or wavelengths of the optical signal to be amplified are in a first wavelength range. The pumping radiation emitted by the pump source 43, typically comprising a continuous wave signal, includes one or more pump wavelengths $\lambda_p$, propagating in the amplifying media 41, 42 in a backward direction. For this purpose, the output end of the second amplifying medium 42 is connected to a first port of the coupler 44, e.g., a WDM coupler, whereas the pump source 43 is connected to a second port of the coupler 44. The wavelength or wavelengths of the pump radiation are in a second wavelength range, non-overlapping with the first wavelength range.

A bidirectional isolator 45 according to the invention is disposed between the first amplifying medium 41 and the second amplifying medium 42. The bidirectional isolator 45 allows propagation in a forward direction of wavelengths $\lambda_s$ comprised in the first wavelength range and propagation in a backward direction of wavelengths $\lambda_p$ comprised in the second wavelength range. That is, the bidirectional isolator

45 allows the propagation of the counter-propagating pump radiation from the second amplifying medium 42 to the first amplifying medium 41, with no necessity of using a suitable shunting circuit for allowing the pump radiation to by-pass the isolator. At the same time, the bidirectional isolator blocks back-reflected signal having wavelength or wavelengths comprised in the first wavelength range propagating in backward direction, and back-reflected pump radiation having wavelength or wavelengths comprised in the second wavelength range propagating in forward direction. In order to increase isolation of the optical signal, at least one unidirectional optical isolator may be further added within the amplifier 40. In the exemplary embodiment disclosed in FIG. 4, two unidirectional isolators 46, 47 are disposed at the ends of the amplifier 40.

Further to the bidirectional isolator 10 shown in FIG. 1, many other different bidirectional isolating devices, having respective different routing and isolation characteristics, may be designed and built by cascading optical assemblies including non-reciprocal rotators and wavelength selective rotators, having the features disclosed above. Furthermore, such optical assemblies may be advantageously combined with other polarization rotators (either wavelength selective or non-wavelength selective, either reciprocal or non-reciprocal), and/or with other optical components, such as for example polarization splitters/combiners, dichroic mirrors etc, in order to comply with different routing and isolation requirements, as requested by different optical systems or also different devices using bidirectional propagating signals.

FIGS. 5a and 5b show a preferred embodiment of an optical assembly 50 suitable for the accomplishment of further bidirectional isolating optical devices according to the invention. The optical assembly 50 includes a polarizer 51, a non-wavelength-selective reciprocal polarization rotator 52, a non-reciprocal polarization rotator 53 and a wavelength-selective reciprocal polarization rotator 54. More particularly, FIG. 5a shows the functioning of the optical assembly 50 in a forward direction and FIG. 5b shows the functioning of the optical assembly 50 in a backward direction.

The polarizer 51 is adapted for obtaining an output optical signal polarized along a predetermined polarization direction. In the preferred embodiment of FIGS. 5a and 5b, the polarizer 51 splits an optical signal having any polarization into two separate optical paths, in which orthogonal polarizations are propagated. This makes the optical assembly 50 independent on polarization. For such purpose, a polarization beam splitter 51a coupled to a mirror 51b may be used. In another embodiment, a walk-off polarizer may be used. If an input polarized optical signal is used, the polarizer 51 may be for example a simple polarizing waveplate.

The non wavelength-selective polarization rotator 52 is reciprocal, i.e. it changes the rotation direction of the polarization of an incoming signal (clockwise or counterclockwise) according to the direction of the incoming light (respectively forward or backward), substantially independently of the signal wavelength (or frequency) in the wavelength (or frequency) band of interest. It may comprise, for example, a first reciprocal birefringent element 52a causing a rotation of $-45°\pm n_1 180°$, wherein $n_1$ is a non-negative integer, of the polarization of an optical signal propagating in a forward direction on a first optical path. A second reciprocal birefringent element 52b, causing a rotation of $+45°\pm n_2 180°$, wherein $n_2$ is a non-negative integer, of the polarization of an optical signal propagating in a forward direction on a second optical path, may be also added in a configuration independent on polarization, as shown in FIG. 5a. In a backward direction, the reciprocal birefringent element 52a rotates the polarization of an optical signal of $+45°\pm n_1 180°$, whereas the reciprocal birefringent element 52b rotates the polarization of an optical signal of $-45°\pm n_2 180°$, as shown in FIG. 5b. The reciprocal rotator 52 may be of any kind, either comprising a single rotation element or a plurality of rotation elements in each optical path, either in a signal single-pass or in a signal multi-pass configuration, according to the overall rotation to be imparted to the optical signals propagating through the assembly 50.

The non-reciprocal polarization rotator 53, or Faraday rotator, rotates the polarization of any polarized incoming signal substantially of an angle of $+45°\pm k\cdot 90°$, wherein k is a non-negative integer. As far as the other characteristics of the Faraday rotator 53, reference is made to what said above about the Faraday rotator 14 of the bidirectional isolator 10 (see FIG. 1).

Combinations of reciprocal rotator 52 and non-reciprocal rotator 53 different with respect to that shown in FIGS. 5a and 5b may be used in the optical assembly 50. However, the combination of the reciprocal rotator 52 and of the non-reciprocal rotator 53 in the optical assembly 50 according to the invention is such that a polarized incoming optical signal is rotated of 90° (or of an odd multiple of 90°) if propagating in a first direction (e.g. forward) and is not rotated (or rotated of a multiple of 180°) if propagating in a second direction, opposite to the first direction (e.g. backward). In a configuration independent on polarization, such as the configuration shown in FIGS. 5a and 5b, the combination of the reciprocal rotator 52 and of the non-reciprocal rotator 53 is such that: on a first optical path B, indicated with a dashed line in FIGS. 5a and 5b, a polarized optical signal undergoes a polarization rotation of 90° (or of an odd multiple of 90°) when propagating forward, and does not undergo any polarization rotation (or undergoes a rotation of a multiple of 180°) when propagating backward; on a second optical path A, indicated with a continuous line in FIGS. 5a and 5b, a polarized optical signal does not undergo any polarization rotation (or undergoes a rotation of a multiple of 180°) when propagating forward, and undergoes a polarization rotation of 90° (or of an odd multiple of 90°) when propagating backward. For example, in the configuration shown in FIGS. 5a and 5b the reciprocal rotator 52 may be replaced by a first rotator adapted for rotating of +45° the polarization of any optical signal propagating in a forward direction on both the first and the second optical paths and a second rotator adapted for rotating of +90° (e.g. a half-wave plate) the polarization of an optical signal propagating onto only one of the first and of the second optical paths.

The reciprocal wavelength selective polarization rotator 54 comprises a stack of birefringent elements, having their axes of polarization oriented so that a first group of polarized signals having frequency in a first group of frequencies does not undergo any rotation (or undergoes a rotation of $\pm i 180°$, wherein i is a non-negative integer), whereas a second group of polarized signals having frequency in a second group of frequencies undergoes rotation of their axes of polarization of $90°\pm j 180°$, wherein j is a non-negative integer. In other words, the wavelength-selective polarization rotator 54 behaves like a full wave retarder for the first group of signals and like a half-wave retarder for the second group of signals. As far as the characteristics of the wavelength selective rotator 54, reference is made to what said above about the wavelength selective rotator 13 of the bidirectional isolator 10 (see FIG. 1), in particular with regards to the width of the frequency transition range between the full wave behavior and the half wave behavior.

The optical assembly 50 comprising the polarizer 51, the reciprocal polarization rotator 52, the non-reciprocal polarization rotator 53 and the wavelength-selective reciprocal polarization rotator 54 allows to re-arrange the polarizations of an optical signal of the first group of signals (hereinafter "first optical signal") and of an optical signal of the second group of signals (hereinafter "second optical signal") in the following way. With reference to FIG. 5a, the first optical signal and the second optical signal are input at the polarizer 51 in a forward direction, from an input port 51a'. The two optical signals may have whatever polarization, as schematically shown in FIG. 5a: more particularly, in FIG. 5a the polarization of the first signal is indicated with continuous arrows and the polarization of the second signal is indicated with dashed arrows. Downstream from the polarizer 51, the optical signals are polarized according to a predetermined first direction, e.g. a horizontal direction, on a first optical path A (continuous line). In the preferred embodiment independent on polarization of FIG. 5a, the two optical signals are polarized according to a second direction, orthogonal to the first direction, on a second optical path B (dashed line). Downstream from the reciprocal rotator 52 and the non-reciprocal rotator 53, the optical signals traveling in a forward direction on the optical path A have substantially unchanged polarization direction (or are rotated by a multiple of 180°). Differently, on the optical path B the polarizations of the optical signals traveling in a forward direction are rotated by an odd multiple of 90° by the reciprocal rotator 52 and the non-reciprocal rotator 53, so that in both optical paths A and B the optical signals travel with polarization directions parallel to each other. Downstream from the wavelength-selective reciprocal polarization rotator 54, the polarization of the first optical signal is left substantially unchanged and the polarization of the second optical signal is rotated by an odd multiple of 90° (−90° in the embodiment shown in FIG. 5a), in a forward direction. Thus, as shown in FIG. 5a, at the output of the optical assembly 50 the first and the second optical signal are propagated with polarization directions orthogonal to each other. In the preferred embodiment independent on polarization shown in FIG. 5a, this behavior for the signals emerging from the optical assembly 50 is obtained on both optical paths A and B. Thus, the optical assembly 50 allows to re-arrange the polarizations of the first signal and of the second signal so as the first signal has a first polarization direction and the second signal has a second polarization direction, orthogonal to the first direction, on both optical paths A and B. This allows to separate the first optical signal from the second optical signal, so that they can be routed onto different optical paths, for example by using a polarization beam splitter or by using a dichroic mirror.

Compatibly with the requirement of re-arranging the polarizations as explained above, the reciprocal polarization rotator 52, the non-reciprocal polarization rotator 53 and the wavelength-selective polarization rotator 54 may be disposed in any suitable order in the optical assembly 50.

The optical assembly 50 is non-reciprocal due to the presence of the non-reciprocal rotator 53. In a reciprocal assembly, a signal whose polarization is transformed from a first to a second polarization state when traveling through the assembly in a forward direction has its polarization transformed from the second to the first polarization state when traveling through the same assembly in a backward direction. On the contrary, as shown in FIG. 5b, the non-reciprocity of the optical assembly 50 is such that the same optical signals, traveling in a backward direction through the wavelength selective polarization rotator 54, the non-reciprocal polarization rotator 53 and the reciprocal polarization rotator 52, starting from a situation in which the first optical signal has a first polarization and the second optical signal has a second, orthogonal polarization, do not exit from the input port 51a' of the polarizer 51, so as they can be substantially blocked. In the preferred embodiment shown in FIG. 5b, the optical signals traveling in backward direction are outputted by a second port 51a" of the polarization beam splitter 51a. This allows to block the propagation of the optical signals in the backward direction, for example with an optical absorber.

The cascading of a certain number of optical assemblies as the optical assembly 50 of FIGS. 5a and 5b may allow the accomplishment of many routing and isolating devices, having different routing and isolating properties.

In general, the use of N cascaded optical assemblies as the one shown in FIGS. 5a and 5b, including wavelength selective polarization rotators having a transition between a full wave behavior and a half wave behavior at different frequencies, allows to route and isolate N+1 different frequency signal bands. FIGS. 6a and 6b schematically show the functioning in forward and backward direction of a bidirectional isolating device adapted for routing and isolating three signals having different frequency. The propagation of the first signal is schematically shown by a continuous line, whereas the propagation of the second and the third optical signal is schematically shown by a dotted line and a dash-dotted line, respectively. The bidirectional isolating device shown in FIGS. 6a and 6b includes two optical assemblies as the one shown in FIGS. 5a and 5b. The first optical assembly has a first polarization beam splitter PBS1, a first reciprocal wavelength selective rotator WSR1, a first reciprocal rotator RR1, a first non-reciprocal rotator FR1. The second optical assembly has a second polarization beam splitter PBS2, a second reciprocal wavelength selective rotator WSR2, a second reciprocal rotator RR2, a second non-reciprocal rotator FR2. A splitting component PBS3, such as for example a further polarization beam splitter, is coupled between the first and the second optical assembly. For example, the first wavelength selective rotator WSR1 may be adapted to behave like a half wave retarder for the first signal and like a full wave retarder for the second and third signal: thus, the first signal may be diverted by the splitting component PBS3 (continuous line, FIG. 6a). The second wavelength selective rotator WSR2 may be adapted to behave like a half wave retarder for the second signal and like a full wave retarder for the first and third signal: thus, the second signal may be diverted by the second polarization beam splitter PBS2 (dotted line, FIG. 6a). FIG. 6b shows that, due to non-reciprocal rotators FR1, FR2, the same optical signals propagating in backward direction do not exit by the same port they entered in forward direction, so that isolation may be provided for either the first, the second or the third optical signal. Similar considerations may be made in case of cascade of more optical assemblies as the one shown in FIGS. 5a and 5b, including wavelength selective rotators with different frequency transitions.

Figure 7:
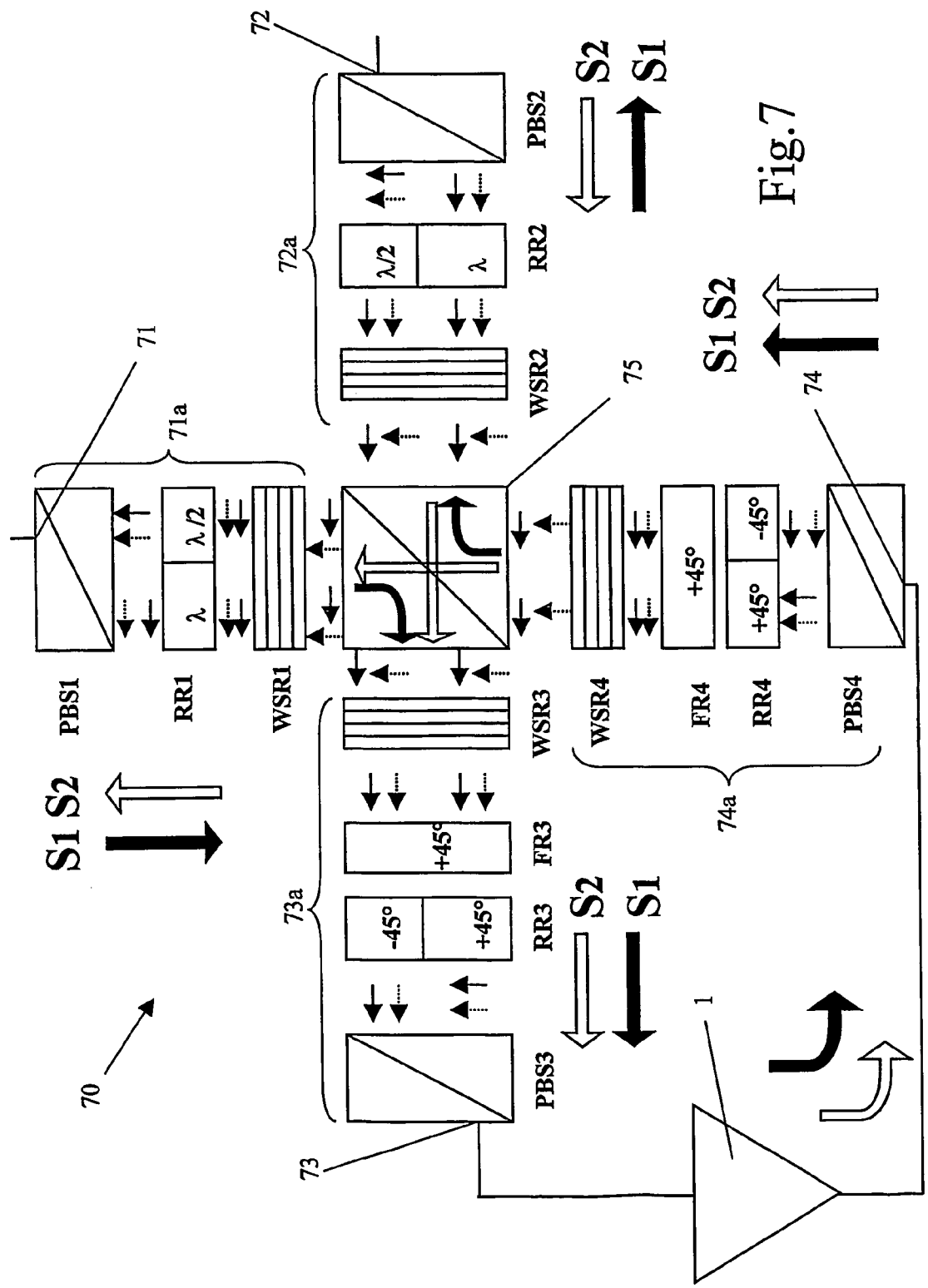
FIG. 7 schematically shows a first preferred embodiment of a bidirectional isolating device, adapted for re-arranging the traveling directions of two optical signals having different frequency, from bidirectional to unidirectional and vice versa.

FIG. 7 shows a first preferred embodiment of a four-port bidirectional isolating device 70, adapted for re-arranging, in an isolated manner, the traveling directions of two optical signals S1, S2 having different frequency. The functioning of the bidirectional isolating device 70 is diagrammatically shown in FIG. 8. The two optical signals S1, S2, indicated respectively by a solid arrow and by a blank arrow in FIG.

8, propagate in opposite directions with each other, for example in an optical line of a bidirectional optical system, and enter/exit in the bidirectional isolating device 70 by a first and a second port thereof, indicated as 71 and 72. The bidirectional isolating device 70 re-arrange the traveling directions of the two optical signals, so as they exit from the device 70 by a third port 73 and enter into the device 70 by a fourth port 74 in the same traveling direction. At the same time, the device 70 should isolate both optical signals, i.e. should block any signal entering in the device 70 with an opposite direction with respect to the "allowed" direction. An optical device 1, for example an optical amplifier, comprising at least one optical amplifying medium and a pumping system adapted for providing a pumping power and for coupling such pumping power to the optical amplifying medium. (e.g. an erbium doped fiber amplifier or a lumped Raman amplifier), may be connected between ports 73, 74. Advantageously, the optical device 1 may be devoid of unidirectional isolators, as isolation may be guaranteed by the bidirectional isolating device 70, as it will be explained in the following.

Figure 8:
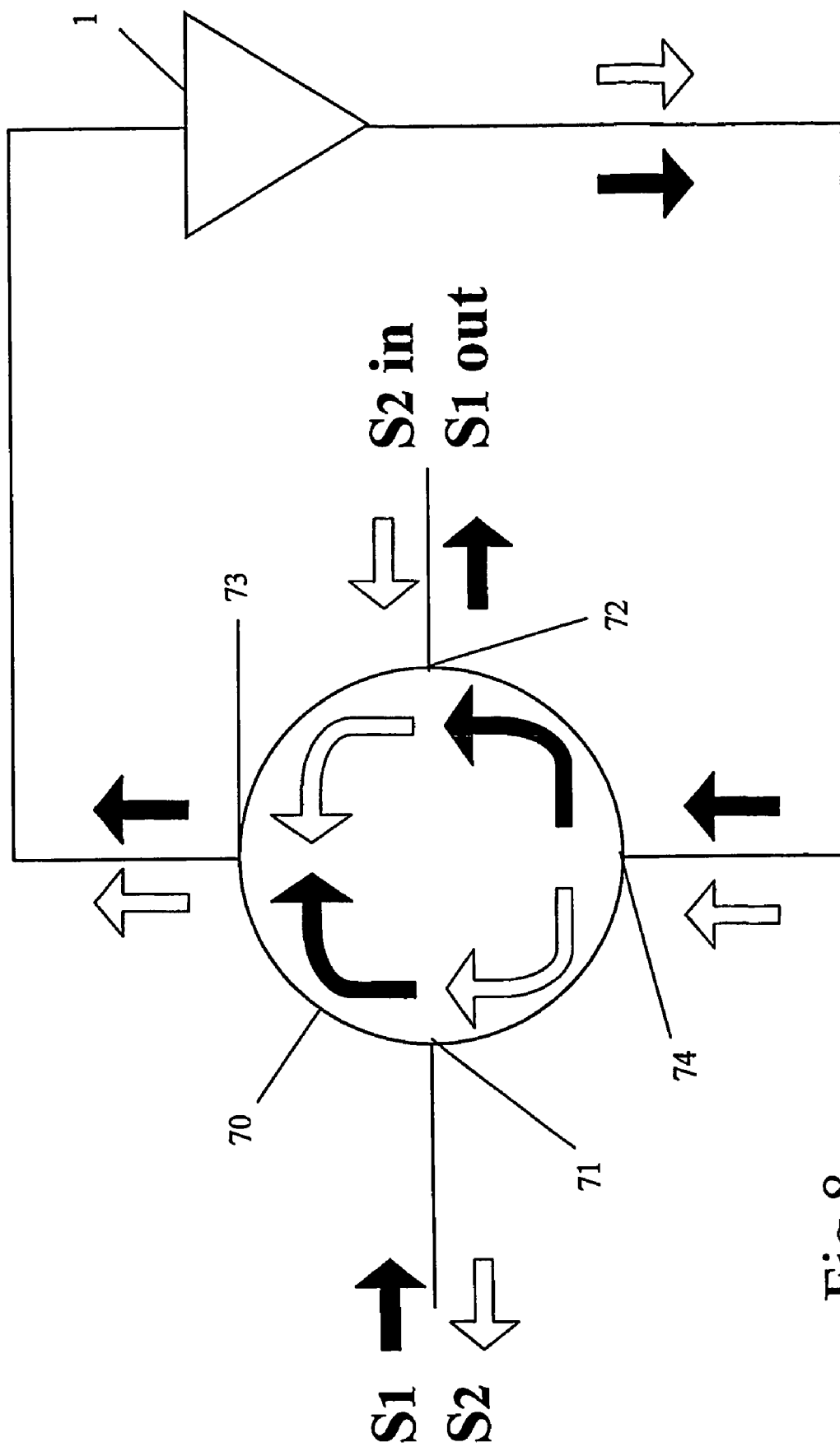
FIG. 8 diagrammatically shows the functioning of the bidirectional isolating device of FIG. 7.

Coming back to FIG. 7, in which the same reference numbers of FIG. 8 are used for indicating the same elements, the bidirectional isolating device 70 may include four branches 71a, 72a, 73,a, 74a, each branch being respectively dedicated to a different input/output port 71, 72, 73, 74. Each of the four branches 71a, 72a, 73,a, 74a includes a polarizer PBS1, PBS2, PBS3, PBS4 as input/output. One port of each polarizer is used as input/output port of the device 70. Each of the four branches 71a, 72a, 73,a, 74a includes a respective wavelength selective reciprocal polarization rotator WSR1, WSR2, WSR3, WSR4. Such wavelength selective rotators have a frequency transition between the frequency of the first optical signal S1 and the second optical signal S2, so that they behave like a full wave retarder for the first optical signal S1 and like a half wave retarder for the second optical signal S2. Preferably, such wavelength selective rotators are all substantially equal, namely, they have the same number of elements with substantially the same thickness and orientation. With regard to the other features of the wavelength selective rotators included in the bidirectional isolating device 70, reference is made to what said above about the wavelength selective rotator 13 of the bidirectional isolator shown in FIG. 1, with particular reference to the width of the frequency range dedicated to the transition between the full wave behavior and the half wave behavior. The optical signals S1, S2 propagate in opposite directions with each other within branches 71a, 72a, whereas they propagate in the same direction within branches 73a, 74a. Further to the wavelength selective rotators, the branches 71a, 72a, 73,a, 74a include other polarization rotators. More particularly, branches 73a and 74a include a combination of a non-reciprocal polarization rotator FR3, FR4 and a reciprocal rotator RR3, RR4, respectively, so that both branches 73a and 74a correspond to the optical assembly 50 disclosed with reference to FIGS. 5a and 5b. The rotating angles shown in FIG. 7 for the reciprocal rotator RR3 refer to a propagation direction from right to left. The rotating angles shown in FIG. 7 for the reciprocal rotator RR4 refer to a propagation direction from down to up. The branches 71a and 72a include reciprocal polarization rotators RR1, RR2, respectively, being adapted for rotating of 90° (or of an odd multiple thereof) the polarization state of any traveling optical signal on a first optical path and for leaving unchanged (or rotating of a multiple of 180°) the polarization state of any traveling optical signal on a second optical path. In the exemplary embodiment shown in FIG. 7, the reciprocal rotators RR1, RR2 comprise each a half wave rotator (e.g. a λ/2-waveplate) and a full wave rotator (e.g. a λ-waveplate). Alternatively, only the half wave rotator may be used. A splitting component 75 adapted for separating two optical signals according to their polarization state, such as for example a dichroic mirror or a polarization beam splitter, is disposed in the center of the device, among the four branches 71a, 72a, 73a, 74a. In the exemplary embodiment shown in FIG. 7, the splitting component 75 transmits vertically polarized signals and reflects horizontally polarized signals.

In operation, the first optical signal S1 enters from input port 71 and the second optical signal enters from input port 72 of the bidirectional isolating device 70. The polarization states of the first optical signal S1 are shown by continuous arrows in FIG. 7, whereas the polarization states of the second optical signal S2 are shown by dotted arrows. The first optical signal S1 travels along the first branch 71a, being split into two optical paths in which orthogonal polarizations are initially propagated. The combination of the first reciprocal rotator RR1 and of the first wavelength selective reciprocal rotator WSR1 allows to obtain, at the output of the first branch 71a, the same polarization state (e.g. horizontal) for the first optical signal S1 onto both optical paths. In a similar way, the second optical signal S2 travels along the second branch 72a, being split into two optical paths in which orthogonal polarizations are initially propagated. The combination of the second reciprocal rotator RR2 and of the second wavelength selective reciprocal rotator WSR2 allows to obtain, at the output of the second branch 72a, the same polarization state for the second optical signal S2 onto both optical paths, orthogonal to the polarization obtained with the first optical signal S1 at the output of the first branch 71a (i.e. vertical), due to the different behavior of the wavelength-selective rotator WSR2 for the second optical signal with respect to the first optical signal. The splitting component 75 reflects the first optical signal S1 and transmits the second optical signal S2 towards the third branch 73a. In the third branch 73a, the polarization states of both the first and the second optical signals S1, S2 are re-arranged so as they may be recombined together by the polarizer PBS3 onto the same optical path, to be sent to the optical device 1, through output port 73. After being passed through the optical device 1, the first and the second optical signals S1, S2 enter through the port 74 in the fourth branch 74a, wherein they are split in polarization. At the output of the fourth branch 74a, the first optical signal S1 has a horizontal polarization state and the second optical signal has a vertical polarization state, due to the presence of the wavelength selective rotator WSR4. Thus, the splitting component 75 reflects the first optical signal towards the second branch 72a and transmit the second optical signal S2 towards the first branch 71a. The second wavelength selective rotator WSR2 and the second reciprocal rotator RR2 re-arrange the polarization states of the optical signal S1 within the second branch 72a, so as the optical signal S1 can be recombined by the polarizer PBS2 onto the same optical path, through output port 72. In a similar way, the first wavelength selective rotator WSR1 and the first reciprocal rotator RR1 re-arrange the polarization states of the optical signal S2 within the second branch 72a, so as the optical signal S2 can be recombined by the polarizer PBS1 onto the same optical path, through output port 71.

A back reflected signal having the same frequency of S1 (not shown in FIG. 7), possibly entering at the second port 72, would travel through the second branch 72a and would be diverted towards the fourth branch 74a by the splitting component 75, i.e. it would travel onto the same path traveled by the "forward" signal, due to the lack of non-reciprocal elements within the second branch 72a. Similarly, a back reflected signal having the same frequency of S2 (not shown in FIG. 7), possibly entering at the first port 71, would travel through the first branch 71a and would be also transmitted towards the fourth branch 74a by the splitting component 75. The non-reciprocity of the fourth branch 74a, due to the presence of the Faraday rotator FR4, allows to avoid the coupling of the back-reflected signal onto the fourth port 74, and thus towards the optical device 1, since the two back-reflected signals arrive at the polarizer PBS4 with a wrong polarization state.

On the other hand, a back-reflected signal of either S1 or S2 (not shown in FIG. 7) may possibly be coupled at the third port 73, due for example to imperfect coupling of the optical device 1 between the third port 73 and the fourth port 74. The non-reciprocity of the third branch 73a, due to the presence of the Faraday rotator FR3, causes the transmission of a back-reflected signal having the same frequency of S1 towards the second branch 72a: in fact, such back-reflected signal, after a backward traveling into the third branch 73a, arrives at the splitting component 75 with a vertical polarization. After traveling into the second branch 72a, such back-reflected signal is not coupled to the second port 72, due to a wrong polarization state with respect to the orientation of the polarizer PBS2. Furthermore, the non-reciprocity of the third branch 73a also causes the reflection of a back-reflected signal having the same frequency of S2 towards the first branch 71a: in fact, such back-reflected signal, after a backward traveling into the third branch 73a, arrives at the splitting component 75 with a horizontal polarization. After traveling into the first branch 71a, such back-reflected signal is not coupled to the first port 71, due to a wrong polarization state with respect to the orientation of the polarizer PBS1.

Figure 9:
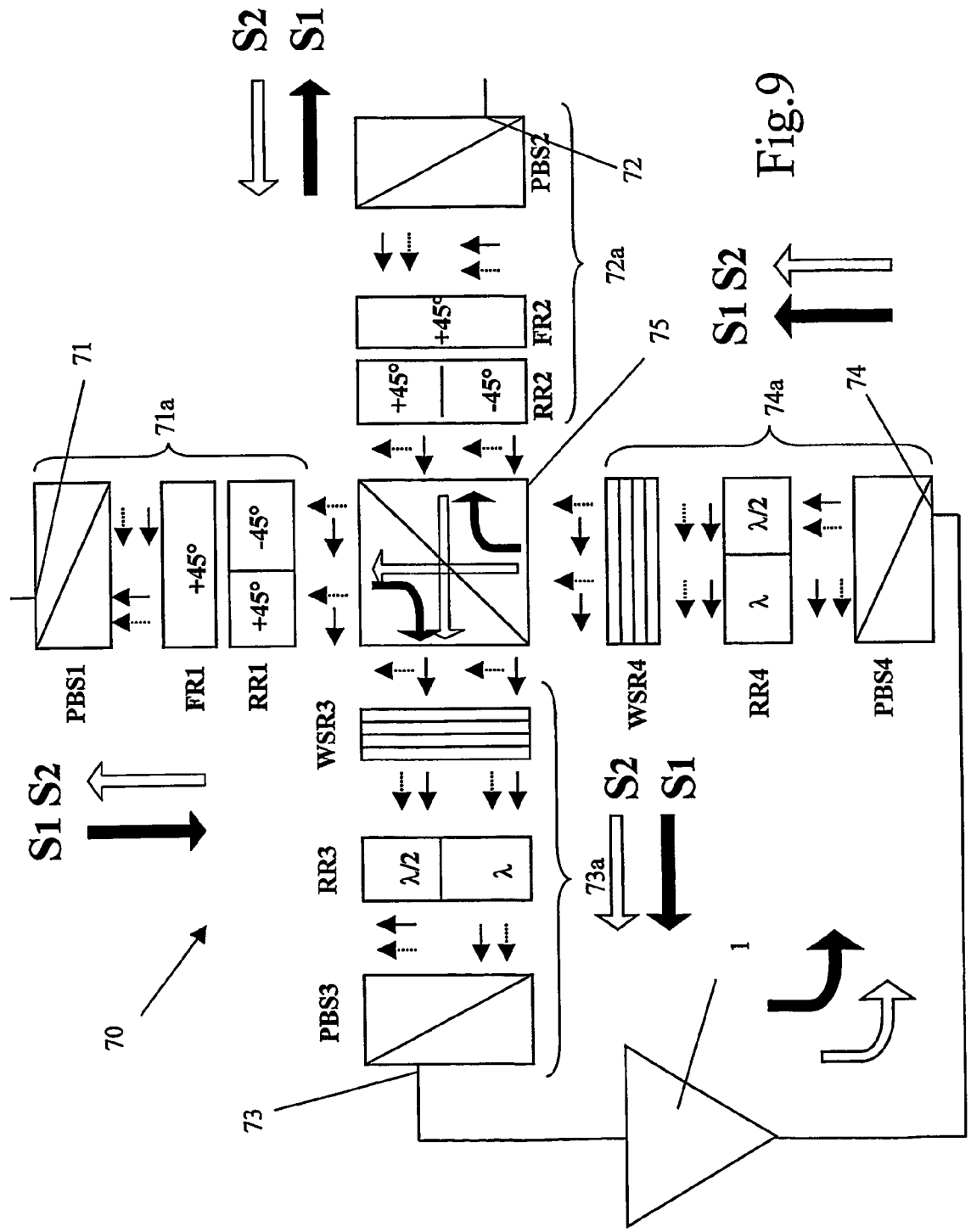
FIG. 9 schematically shows a second preferred embodiment of a bidirectional isolating device, adapted for re-arranging the traveling directions of two optical signals having different frequency, from bidirectional to unidirectional and vice versa.

FIG. 9 shows a second preferred embodiment of a four-port bidirectional isolating device 70, adapted for re-arranging, in an isolated manner, the traveling directions of two optical signals S1, S2 having different frequency. Also the bidirectional isolating device 70 shown in FIG. 9 satisfies the functioning diagrammatically shown in FIG. 8. The bidirectional isolating device 70 shown in FIG. 9 differs from the one shown in FIG. 7 in that only two wavelength selective rotators WSR3 and WSR4 are used, in place of four, and in that the optical signals S1, S2 travel in opposite direction with each other in non-reciprocal branches 71a, 72a, whereas in the embodiment shown in FIG. 7 they traveled in opposite direction with each other in reciprocal branches. The elimination of two wavelength selective rotators in the embodiment shown in FIG. 9 may advantageously reduce the overall attenuation introduced by the bidirectional isolating device 70. In FIG. 9 the same reference numbers and/or notations indicate the same components having functions and characteristics already disclosed with reference to FIG. 7. FIG. 9 shows the normal functioning of the bidirectional device 70, with a first optical signal S1 having a first frequency entering at port 71 and with a second optical signal S2 entering at port 72. The wavelength selective rotators rotate the polarization state only of the second signal S2. The functioning of the device 70 of FIG. 9 will be not explained in detail, as it may be inferred by FIG. 9. However, with regards to back-reflections, they are managed differently with the device 70 of FIG. 9. In fact, a possible back-reflected signal having the same frequency of S1 entering at the second port 72 and traveling backward in the non-reciprocal second branch 72a would arrive at the splitting component 75 with a vertical polarization state (namely, with an orthogonal polarization state with respect to that shown in FIG. 9), due to the presence of the non-reciprocal rotator FR2. Thus, such back-reflected signal would be transmitted by the splitting component 75 towards the third branch 73a, with a vertical polarization state. After traveling through the third branch 73a the back-reflected signal would arrive to the polarizer PBS3 with wrong polarization states with respect to the orientation of the polarizer PBS3, so that it couldn't be coupled to the third port 73, i.e., towards the optical device 1. On the other hand, a possible back-reflected signal having the same frequency of S2 entering at the first port 71 and traveling backward in the non-reciprocal first branch 71a would arrive at the splitting component 75 with a horizontal polarization state (namely, with an orthogonal polarization state with respect to that shown in FIG. 9), due to the presence of the non-reciprocal rotator FR1. Thus, such back-reflected signal would be reflected by the splitting component 75 towards the third branch 73a, with a horizontal polarization state. Thus, also this back-reflected signal, after traveling through the third branch 73a, would arrive to the polarizer PBS3 with wrong polarization states with respect to the orientation of the polarizer PBS3, so that it couldn't be coupled to the third port 73, i.e., towards the optical device 1. Finally, a back-reflected signal of either S1 or S2, possibly coupled at the third port 73 and traveling backward through the third branch 73a would be split by the splitting component 75 so that the back-reflected signal having the frequency of S1 would be reflected towards the first branch 71a and the back-reflected signal having the frequency of S2 would be transmitted through the second branch 72a. In the non-reciprocal first branch 71a, the Faraday rotator FR1 would rotate the polarization state so as the back-reflected signal having the frequency of S1 would arrive at the polarizer PBS1 with wrong polarization states with respect to the orientation of the polarizer PBS1: thus, it couldn't be coupled to the first port 71. In a similar manner, in the non-reciprocal second branch 72a, the Faraday rotator FR2 would rotate the polarization state so as the back-reflected signal having the frequency of S2 would arrive at the polarizer PBS2 with wrong polarization states with respect to the orientation of the polarizer PBS2: thus, it couldn't be coupled to the first port 72.

Figure 10:
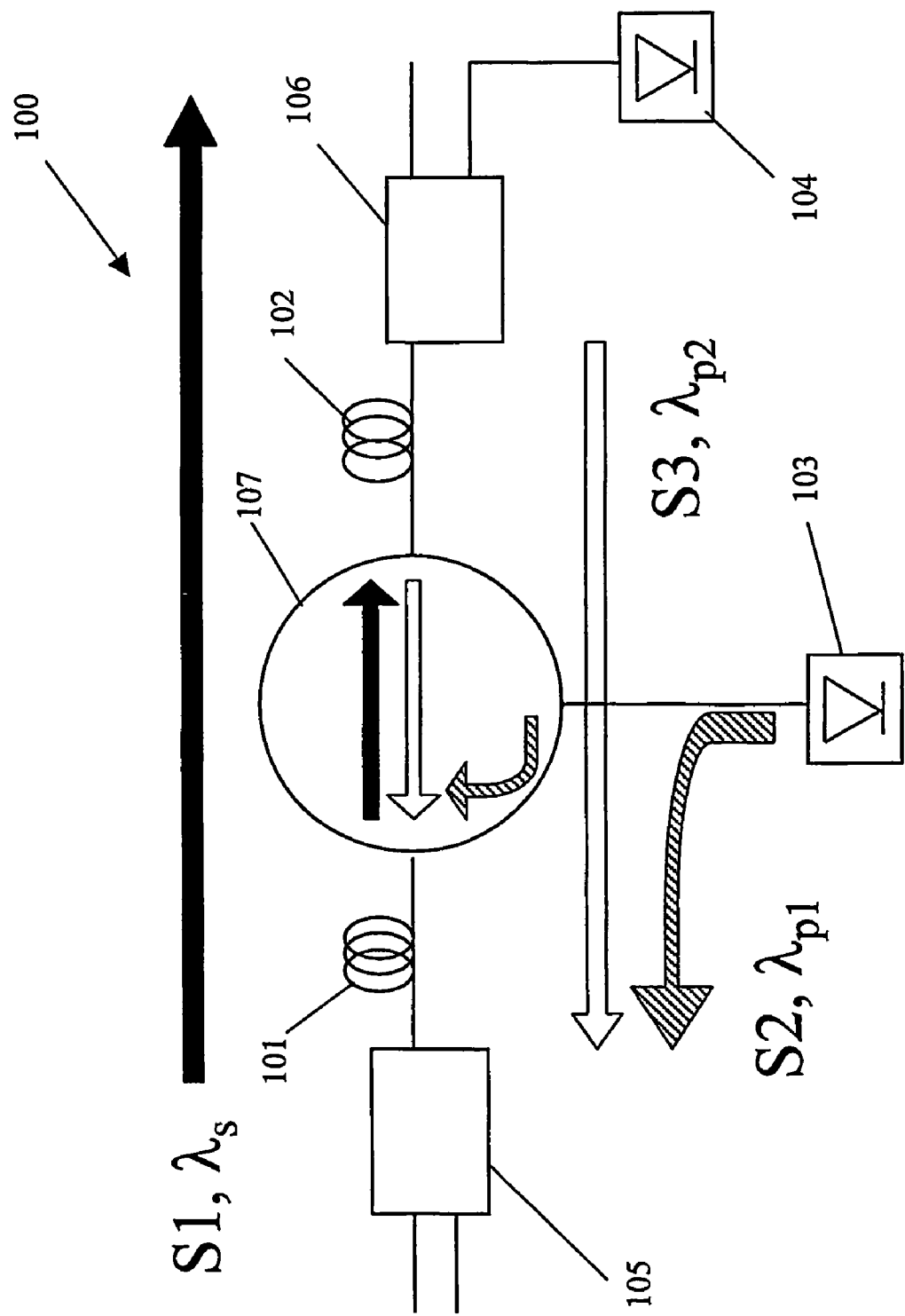
FIG. 10 shows a preferred embodiment of a double stage Raman amplifier including a bidirectional isolating device, adapted for routing in isolated manner three optical signals having different frequencies with each other, two of which traveling in opposite direction with respect to the third one (one optical signal, two pump radiations)

FIG. 10 shows a preferred embodiment of a double stage Raman amplifier 100, including a first length of Raman-active fiber 101 and a second length of Raman-active fiber 102. Raman-active fibers 101, 102 may be for example silica-based or silica/germania-based optical fibers. The first length of Raman-active fiber 101 is pumped by a first pump source 103, via a bidirectional isolating device 107 described in detail in the following. The second length of Raman-active fiber 102 is pumped by a second pump source 105, via a coupling device 106, e.g. a WDM coupler. The Raman amplifier 100 is adapted for amplifying signals having a wavelength $\lambda_s$ included in a first wavelength range, corresponding to a first optical frequency range, by stimulated Raman scattering. For this purpose, the pump sources 103, 104 provide a pump radiation having a wavelength shifted in a lower wavelength region with respect to $\lambda_s$, or, in other words, having a frequency in a higher frequency region with respect to the first frequency range, according to the Raman shift of the material included in the Raman-active fibers 101, 102. In particular, the first pump source 103 provides a first pump radiation having a wavelength $\lambda_{p1}$ included in a second wavelength range (corresponding to a second frequency range), and the second pump source 104 provides a second pump radiation having a wavelength $\lambda_{p2}$ included in a third wavelength range (corresponding to a third frequency range). The first, the second and the third wavelength (frequency) range do not overlap with each other. The first and second pump radiations are coupled into the first and second Raman-active fibers 101, 102 in counter-propagating direction with respect to the propagation direction of the optical signal to be amplified. A further coupling device 105, e.g. a WDM coupler, allows to extract the possible residual pump radiation remaining upstream from the first Raman-active fiber 101.

Preferably, at least one of the first and the second pump sources 103, 104 provides a multi-wavelength pump radiation. More preferably, both pump sources 103, 104 provide a multi-wavelength pump radiation. Multi-wavelength pumping allows to obtain a flat gain over a wide range of wavelengths. More particularly, the first pump wavelength range and the second pump wavelength range may be such that the first pump radiation coupled into the first fiber length 101 may extract optical energy to the residual second pump radiation coming from the second fiber length 102 by stimulated Raman scattering, in order to increase its power within the first fiber length 101. For example, the optical signal S1 may have a wavelength between 1530 nm and 1610 nm, the first pump radiation S2 may have a wavelength between 1450 and 1510 nm, the second pump radiation may have a wavelength between 1420 and 1450 nm.

The Raman amplifier 100 includes a bidirectional isolating device 107, adapted for routing in isolated manner the three different radiations propagating into the amplifier 100, i.e. the optical signal S1 to be Raman amplified, the first pump radiation S2 and the second pump radiation S3. More particularly, the bidirectional isolating device 107 allows the passage from the first fiber length 101 to the second fiber length 102 of the optical signal S1 and inhibits the passage of the same signal in the opposite direction thereof; furthermore, it allows the passage from the second fiber length 102 to the first fiber length 101 of the second counter-propagating pump radiation S3 and inhibits the passage of the same pump radiation in the opposite direction thereof; moreover, it allows the coupling into the first fiber length 101 from the first pump source 103 of the first counter-propagating pump radiation S2, and inhibits the passage of the same pump radiation both in the opposite direction thereof and from the first fiber length 101 to the second fiber length 102. Such bidirectional isolating device 107 allows to merge the function of the bidirectional isolator disclosed with reference to FIG. 1 and FIG. 4 and the function of coupling of a further pump radiation into the first Raman-active fiber 101, without the necessity of a further WDM coupler. In other words, the bidirectional isolating device 107 allows to advantageously eliminate problems due to double Rayleigh back-scattering of the optical signal S1 without using a unidirectional optical isolator between the first and the second Raman-active fibers 101, 102, that is, without using complex shunt circuits for allowing passage of the second counter-propagating pump radiation S3 from the second fiber length 102 to the first fiber length 101. Furthermore, it allows the coupling, in isolated manner, of the first pump radiation S2 into the first fiber length 101.

Figure 11:
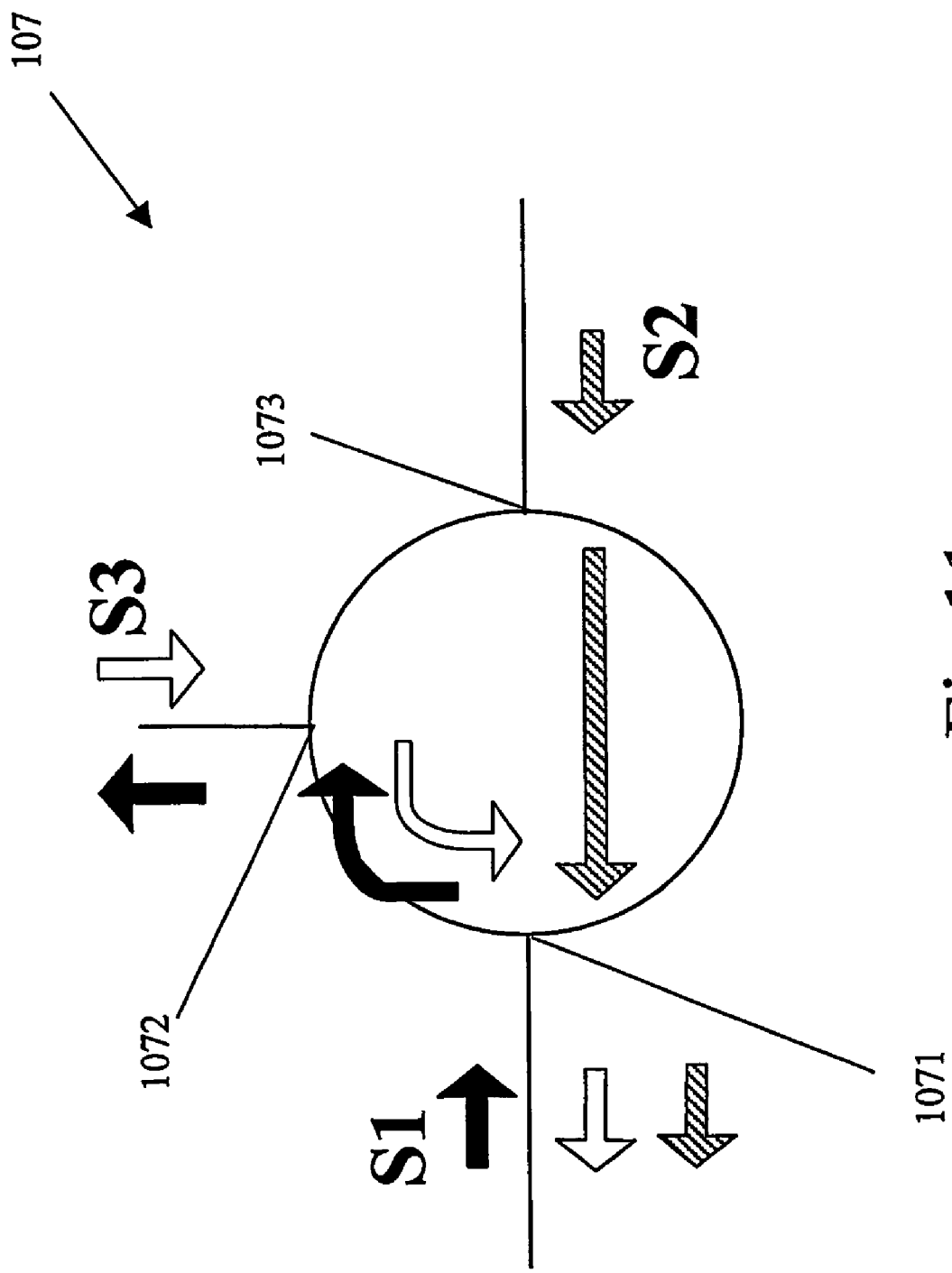
FIG. 11 shows a scheme of a three-port bidirectional isolating device suitable for being used in the preferred embodiment of Raman amplifier of FIG. 10.

FIG. 11 shows a scheme of a three-port bidirectional isolating device 107 realizing the functions required for the preferred embodiment of Raman amplifier of FIG. 10. In the bidirectional isolating device 107 of FIG. 11 the signal S1 is allowed to travel from port 1071 to port 1072 and the pump S3 is allowed to travel from port 1072 to port 1071. Both the signal S1 and the pump S3 cannot travel in an opposite direction with respect to the assigned one. Furthermore, the pump S2 is allowed to travel from port 1073 to port 1071. In order to guarantee isolation, the pump S2 is not allowed to travel neither from port 1071 to port 1073, nor from port 1071 to port 1072. More particularly, none of the signals S1, S2, S3 is allowed to propagate from its assigned output port to any other port of the bidirectional device 107.

Figure 12:
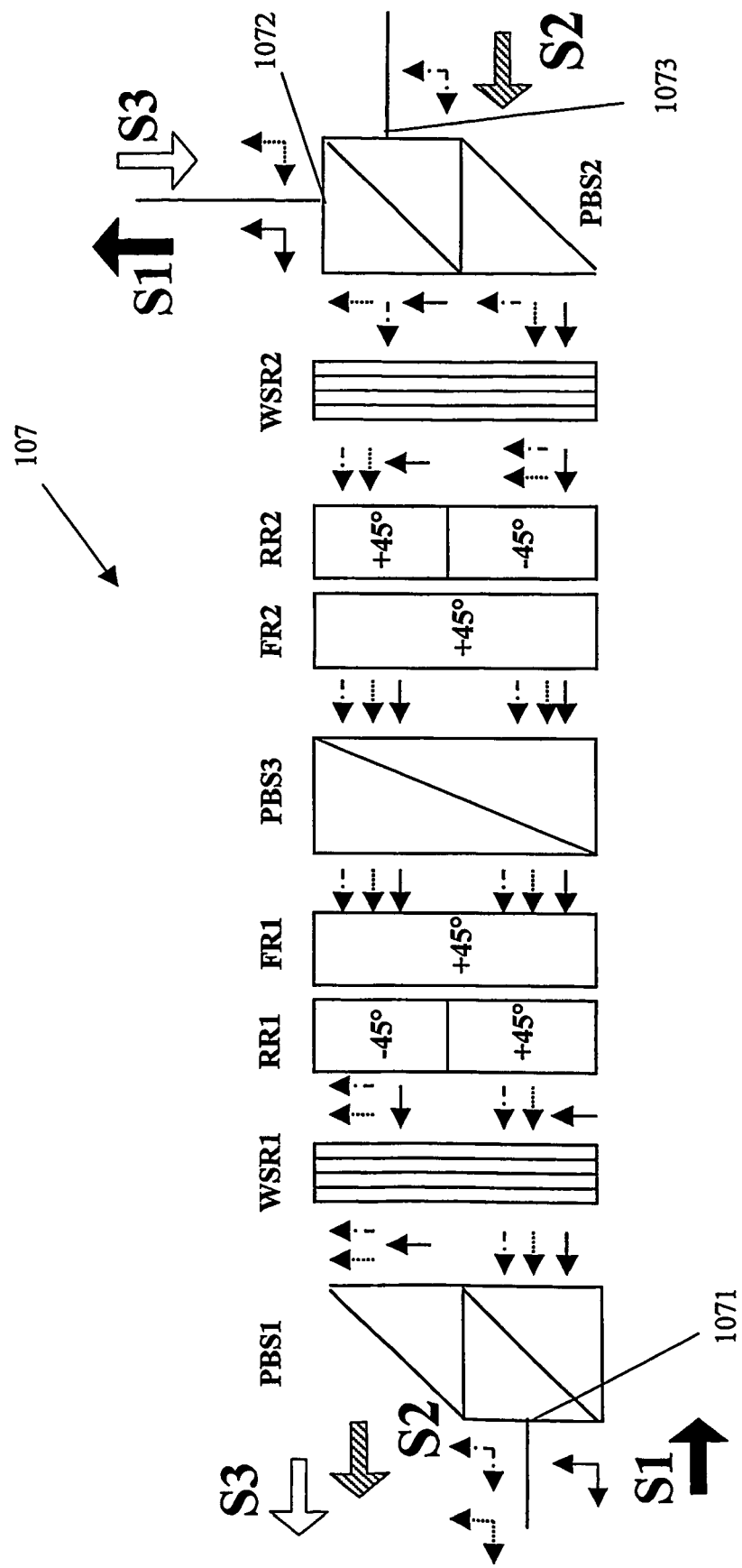
FIG. 12 schematically shows a bidirectional isolating device realizing the scheme of FIG. 11.

FIG. 12 shows a preferred embodiment of a bidirectional isolating device 107 having the features disclosed with reference to FIG. 11. As it can be seen, the bidirectional isolating device 107 shown in FIG. 12 includes the cascade of two optical assemblies such as those disclosed in FIGS. 5a and 5b (see also FIGS. 6a and 6b). More particularly, the bidirectional isolating device 107 includes a first and a second polarizer PBS1, PBS2, a first and a second wavelength selective reciprocal polarization rotator WSR1, WSR2, a first and a second reciprocal polarization rotator RR1, RR2, a first and a second non-reciprocal (or Faraday) polarization rotator FR1, FR2. The rotation direction of the polarization rotators RR1 and RR2 shown in FIG. 12 are referred to propagation from left to right. The first and second wavelength selective rotators WSR1 and WSR2 have different frequency transitions between the full wave retarder behavior and half wave retarder behavior. More particularly, the first wavelength selective rotator WSR1 behaves like a full wave retarder for the first and second pump radiations S2, S3, and like a half wave retarder for the optical signal S1. Differently, the second wavelength selective rotator WSR2 behaves like a full wave retarder for the optical signal S1 and for the first pump radiation S2, and like a half wave retarder for the second pump radiation S3. With regards to the other features of wavelength selective rotators WSR1 and WSR2, reference is made to what said above, in particular with regards to the width of the frequency transition range. The bidirectional isolating device 107 may further comprise a splitting component PBS3, such as for example a polarization beam splitter or a dichroic mirror. In the configuration shown in FIG. 12, the splitting component PBS3 is adapted to transmit signals having horizontal polarization state and to divert or reflect signals having vertical polarization state. The polarizers PBS1 and PBS2 may include for example polarization beam splitters or walk-off polarizers. In the configuration shown in FIG. 12, they are polarization beam splitters oriented in such a manner as to transmit signals having horizontal polarization state and to reflect signals having vertical polarization state, coupled to a mirror.

FIG. 12 schematically shows the "normal" functioning of the bidirectional isolating device 107 and, for the sake of clarity, does not show the functioning with back-reflections. The polarization states of the signal S1 are shown with continuous arrows, whereas the polarization states of the first and second pump radiation S2, S3 are shown as dotted and dashed arrows, respectively.

As it can be seen, the signal S1 enters from port 1071 in the first optical assembly including the polarizer PBS1, the wavelength selective rotator WSR1, the reciprocal rotator RR1 and the Faraday rotator FR1 with whatever polarization state and exits from said assembly with, e.g., a horizontal polarization, on both a first (upper) and a second (lower) optical path. It has to be noticed that this is made possible by the polarization rotation provided by the first wavelength selective rotator WSR1. The splitting component PBS3 is adapted to transmit signals having horizontal polarization state. Then, the optical signal S1 travels through the second optical assembly including the Faraday rotator FR2, the reciprocal rotator RR2, the wavelength selective rotator WSR2 and the polarizer PBS2, exiting from port 1072. A back-reflected signal having the frequency of S1 (not shown in FIG. 12), traveling in backward direction within the second assembly, would arrive at the splitting component PBS3 with a vertical polarization state, due to the non-reciprocity of the Faraday rotator FR2, so that it may be blocked (e.g. diverted or reflected) by the splitting component PBS3.

The first pump radiation S2 enters into the second optical assembly (PBS2, WSR2, FR2, RR2) from port 1073 with whatever polarization and exits from said second assembly with horizontal polarization on both the first and the second optical paths. No polarization rotation is provided at the frequency of S2 by the second wavelength selective rotator WSR2. The splitting component PBS3 allows transmission of S2 towards the first optical assembly (FR1, RR1, WSR1, PBS1) and, then, the first pump radiation exits from port 1071. No polarization rotation is provided at the frequency of S2 by the first wavelength selective rotator WSR1 either. A back-reflected signal having the frequency of S2 (not shown in FIG. 12), traveling in backward direction through the first assembly, would arrive at the splitting component PBS3 with a vertical polarization state, due to the non-reciprocity of the Faraday rotator FR1, so that it may be blocked (e.g. diverted or reflected) by the splitting component PBS3.

The second pump radiation S3 enters into the second optical assembly (PBS2, WSR2, FR2, RR2) from port 1072 with whatever polarization and exits from said assembly with horizontal polarization. It has to be noticed that this is made possible by the polarization rotation provided by the second wavelength selective rotator WSR2. The splitting component PBS3 is adapted to transmit signals having horizontal polarization state. Then, the second pump radiation S3 travels through the first optical assembly, exiting from port 1071. No polarization rotation is provided at the frequency of S3 by the first wavelength selective rotator WSR1. A back-reflected signal having the frequency of S3 (not shown in FIG. 12), traveling in backward direction through the first assembly, would arrive at the splitting component PBS3 with a vertical polarization state, due to the non-reciprocity of the Faraday rotator FR1, so that it may be blocked (e.g. diverted or reflected) by the splitting component PBS3.

Figure 13:
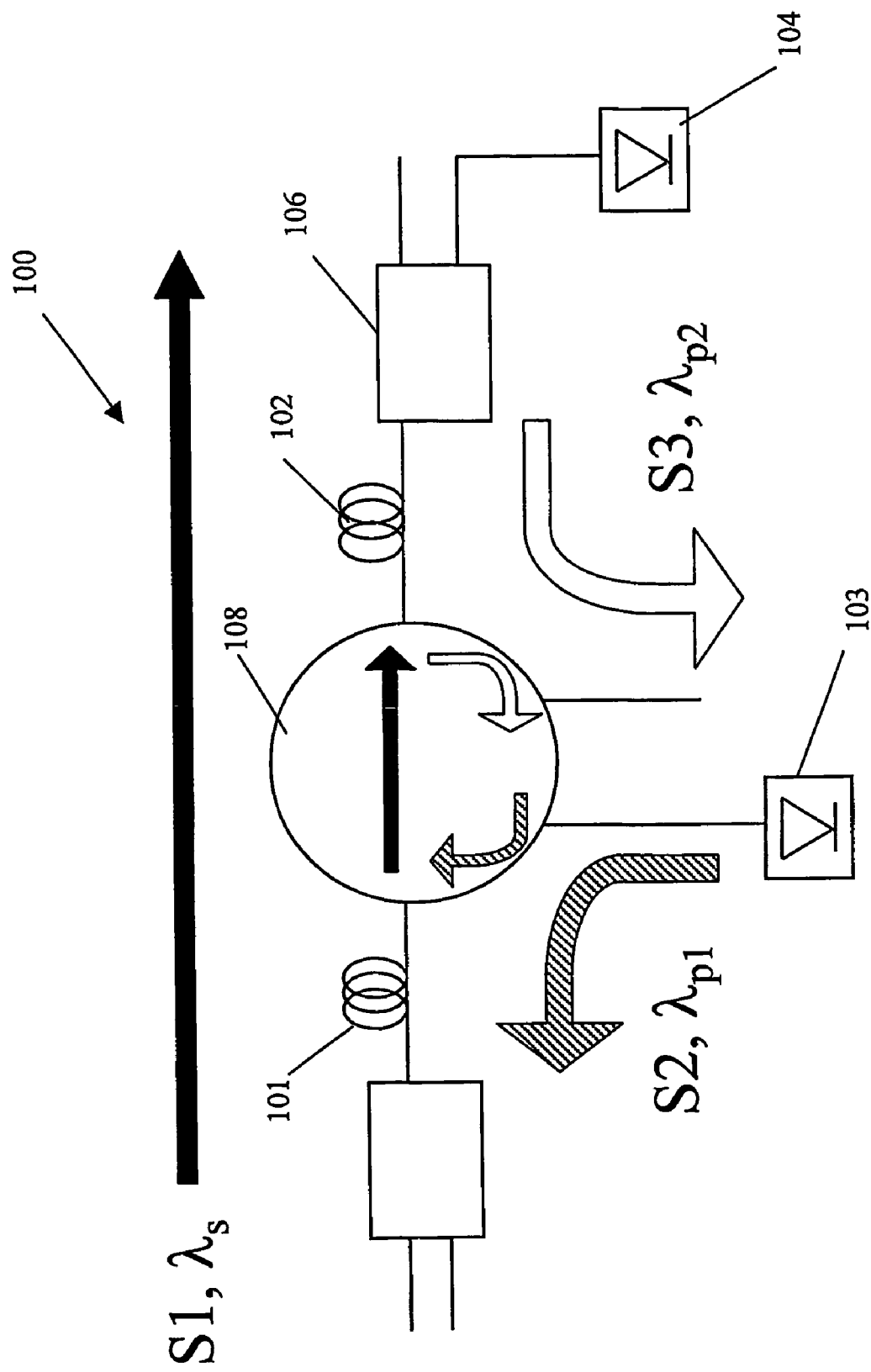
FIG. 13 shows another preferred embodiment of a double stage Raman amplifier including a bidirectional isolating device, adapted for routing in isolated manner three optical signals having different frequencies with each other, two of which traveling in opposite direction with respect to the third one (one optical signal, two pump radiations)

FIG. 13 shows another preferred embodiment of a double stage Raman amplifier 100 using counter-propagating pump radiation. Where possible, the same reference numbers used for the description of the embodiment of Raman amplifier shown in FIG. 10 are used in FIG. 13 for indicating the same components, or components having the same function. In this embodiment, a bidirectional isolating device 108 allows to extract, in isolated manner, the residual second pump radiation coming out from the second length of Raman-active fiber 102, without introducing the same into the first length of Raman-active fiber 101. The other routing and isolating features of the bidirectional isolating device 108, related to the optical signal S1 and to the first pump radiation S2, are the same disclosed with reference to the bidirectional isolating device 107 of FIG. 10-11-12. The residual pump radiation S3 coming out from the second fiber length 102 and extracted by the bidirectional isolating device 108 may be used for monitoring purposes. Thus, the bidirectional isolating device 108 combines together the functions of a unidirectional isolator for the optical signal S1 (and also for the first and second pump radiations S2, S3) and of two WDM couplers (a first one for inserting the first pump radiation, a second one for extracting the residual of the second pump radiation). In other words, the bidirectional isolating device 108 allows: to advantageously eliminate problems due to double Rayleigh back-scattering of the optical signal S1 without using a unidirectional optical isolator between the first and the second Raman-active fibers 101, 102; the coupling of the first pump radiation S2 into the first fiber length 101, in isolated manner; the extraction of the residual of the second pump radiation S3, in isolated manner. Thus, the first Raman-active fiber length 101 and the second Raman-active fiber length 102 are completely isolated, both for signal back-reflections and for pump back-reflections.

Figure 14:
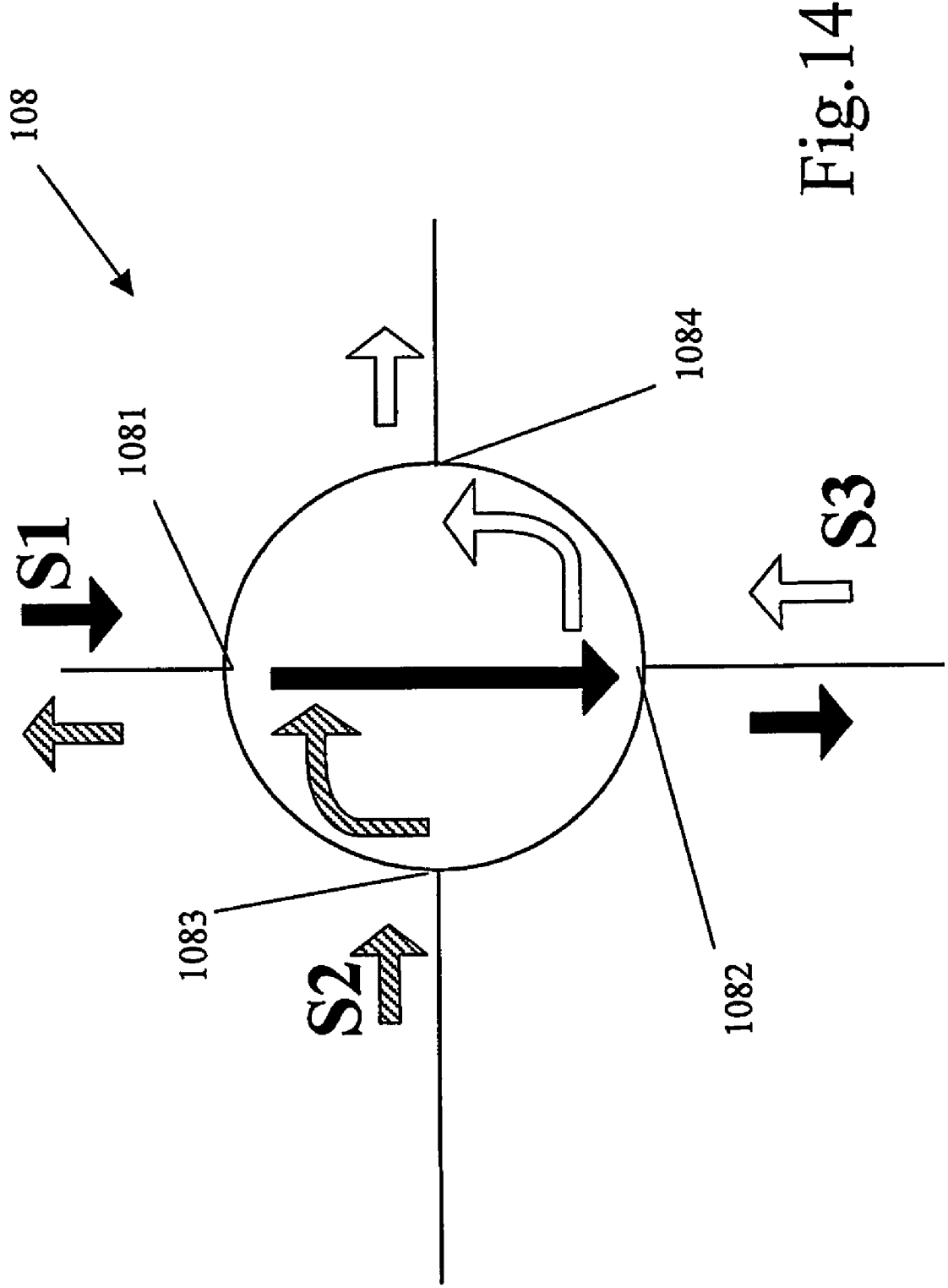
FIG. 14 shows a scheme of a four-port bidirectional isolating device suitable for being used in the preferred embodiment of Raman amplifier of FIG. 13.

FIG. 14 shows a scheme of a four-port bidirectional isolating device 108 realizing the functions required for the preferred embodiment of Raman amplifier 100 of FIG. 13. In the bidirectional isolating device 108 of FIG. 14 the signal S1 is allowed to travel from a first port 1081 to a second port 1082, the first pump radiation S2 is allowed to travel from a third port 1083 to the first port 1081, the second pump radiation S3 is allowed to travel from the second port 1082 to a fourth port 1084. None of the signals S1, S2, S3 is allowed to propagate in opposite direction with respect to the assigned direction: more particularly, none of the signals S1, S2, 83 is allowed to propagate from its assigned output port to any other port of the bidirectional device 108.

Figure 15:
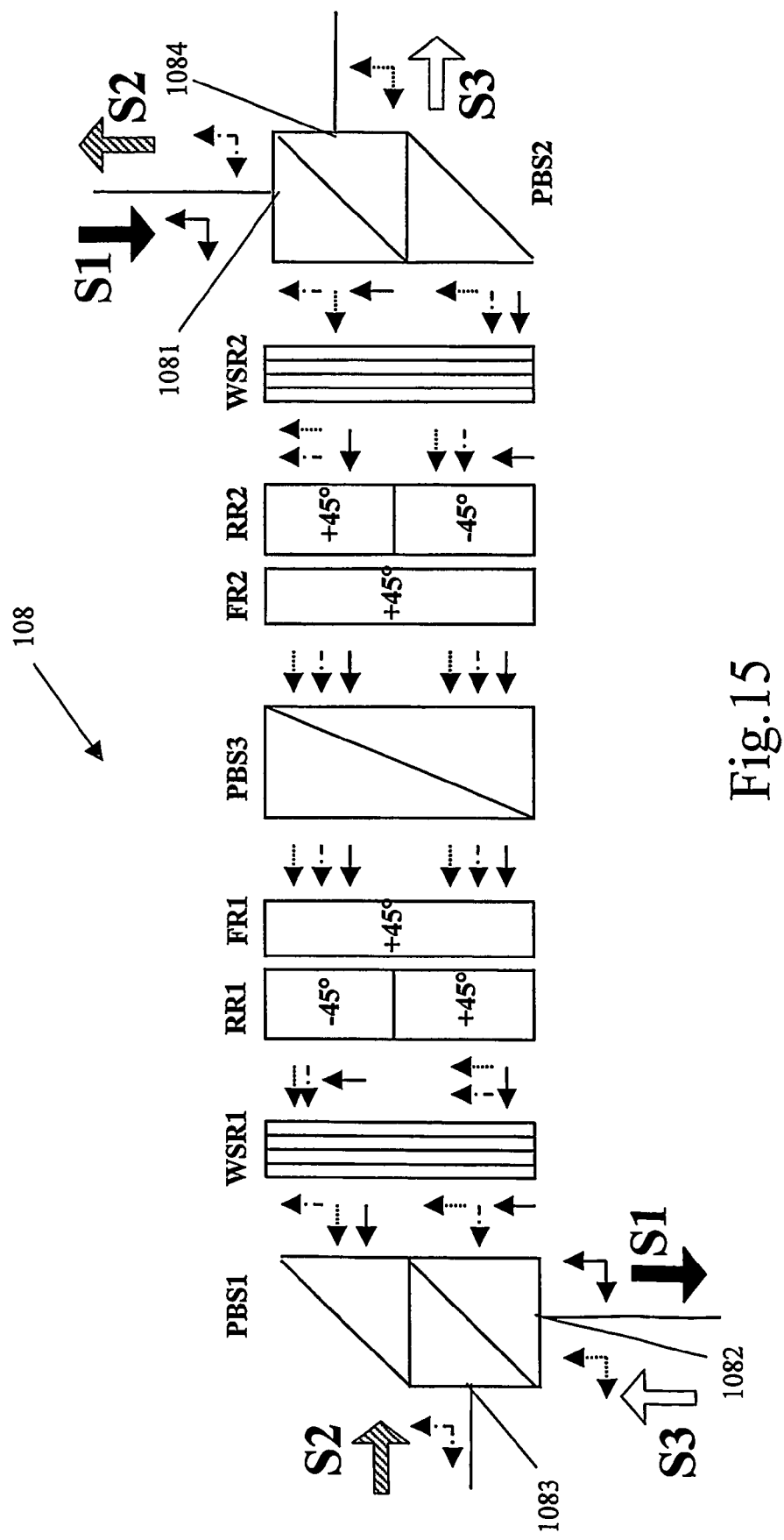
FIG. 15 schematically shows a bidirectional isolating device realizing the scheme of FIG. 14.

FIG. 15 schematically shows a bidirectional isolating device 108 realizing the scheme of FIG. 14. As it can be seen, the bidirectional isolating device 108 shown in FIG. 15 includes the cascade of two optical assemblies such as those disclosed in FIGS. 5a and 5b (see also FIGS. 6a and 6b). More particularly, the bidirectional isolating device 108 includes a first and a second polarizer PBS1, PBS2, a first and a second wavelength selective reciprocal polarization rotator WSR1, WSR2, a first and a second reciprocal polarization rotator RR1, RR2, a first and a second non-reciprocal (or Faraday) polarization rotator FR1, FR2. The rotation direction of the polarization rotators RR1 and RR2 shown in FIG. 15 are referred to propagation from the left to the right. The first and second wavelength selective rotators WSR1 and WSR2 have different frequency transitions between the full wave retarder behavior and half wave retarder behavior. More particularly, the first wavelength selective rotator WSR1 behaves like a full wave retarder for the second pump radiation S3, and like a half wave retarder for the optical signal S1 and the first pump radiation S2. Differently, the second wavelength selective rotator WSR2 behaves like a full wave retarder for the first pump radiation S2, and like a half wave retarder for the optical signal S1 and the second pump radiation S3. With regards to the other features of wavelength selective rotators WSR1 and WSR2, reference is made to what said above, in particular with regards to the width of the frequency transition range. The bidirectional isolating device 108 further comprises a splitting component PBS3, such as for example a polarization beam splitter or a dichroic mirror. In the configuration shown in FIG. 15, the splitting component PBS3 is adapted to transmit signals having horizontal polarization state and to divert or reflect signals having vertical polarization state. The polarizers PBS1 and PBS2 may include for example polarization beam splitters or walk-off polarizers. In the configuration shown in FIG. 15, they are polarization beam splitters oriented in such a manner as to transmit signals having horizontal polarization state and to reflect signals having vertical polarization state, coupled to a mirror.

FIG. 15 schematically shows the "normal" functioning of the bidirectional isolating device 108 and, for the sake of clarity, does not show the functioning with back-reflections.

The polarization states of the signal S1 are shown with continuous arrows, whereas the polarization states of the first and second pump radiation S2, S3 are shown as dotted and dashed arrows, respectively.

As it can be seen, the signal S1 enters from port 1081 in the first optical assembly including the polarizer PBS2, the wavelength selective rotator WSR2, the reciprocal rotator RR2 and the Faraday rotator FR2 with any polarization, travels from right to left and exits from said assembly with a horizontal polarization, on both a first (upper) and a second (lower) optical path, arriving at the splitting component PBS3. It has to be noticed that this is made possible by the polarization rotation provided by the second wavelength selective rotator WSR2. The splitting component PBS3 is adapted to transmit signals having horizontal polarization state. Then, the optical signal S1 travels through the first optical assembly including the Faraday rotator FR1, the reciprocal rotator RR1, the wavelength selective rotator WSR1 and the polarizer PBS1, exiting from port 1082. A back-reflected signal having the frequency of S1 (not shown in FIG. 15), entering from port 1082 and traveling in an opposite direction within the first assembly, would arrive at the splitting component PBS3 with a vertical polarization state, due to the non-reciprocity of the Faraday rotator FR1, so that it may be blocked (e.g. diverted or reflected) by the splitting component PBS3.

The first pump radiation S2 enters into the first optical assembly (PBS1, WSR1, FR1, RR1) from port 1083 with any polarization, travels from left to right and exits from said assembly with horizontal polarization on both the first and the second optical paths. A rotation of the polarization state is provided at the frequency of S2 by the first wavelength selective rotator WSR2. The splitting component PBS3 allows transmission of S2 towards the second optical assembly (FR2, RR2, WSR2, PBS2) and, then, the first pump radiation exits from port 1081. No polarization rotation is provided at the frequency of S2 by the second wavelength selective rotator WSR2. A back-reflected signal having the frequency of S2 (not shown in FIG. 15), traveling from right to left through the second assembly, would arrive at the splitting component PBS3 with a vertical polarization state, due to the non-reciprocity of the Faraday rotator FR2, so that it may be blocked (e.g. diverted or reflected) by the splitting component PBS3.

The second pump radiation S3 enters into the first optical assembly (PBS1, WSR1, FR1, RR1) from port 1082 with any polarization, travels from left to right and exits from said assembly with horizontal polarization. No polarization rotation is provided at the frequency of S3 by the first wavelength selective rotator WSR1. The splitting component PBS3 is adapted to transmit signals having horizontal polarization state. Then, the second pump radiation S3 travels through the second optical assembly, exiting from port 1084. A rotation of the polarization state is provided at the frequency of S3 by the second wavelength selective rotator WSR2. A back-reflected signal having the frequency of S3 (not shown in FIG. 15), traveling from right to left through the second assembly, would arrive at the splitting component PBS3 with a vertical polarization state, due to the non-reciprocity of the Faraday rotator FR2, so that it may be blocked (e.g. diverted or reflected) by the splitting component PBS3.

EXAMPLE 1

The Applicant has determined the structure of a stack of birefringent waveplates (number of waveplates, thickness, orientation) to be included, for example, in the bidirectional isolator 10 of FIG. 1 in order to allow the propagation of a first group of signals having wavelengths comprised in a first wavelength range between 1410 nm (namely, frequency 212.8 THz) and 1510 nm (198.7 THz) in one direction and the propagation of a second group of signals having wavelengths comprised in a second wavelength range between 1530 nm (196.1 THz) and 1630 nm (184.1 THz) in the opposite direction. Such bidirectional isolator may comply with the requirements for a double stage lumped Raman amplifier, according to the embodiment above described with reference to FIG. 4.

According to what stated above, the stack of birefringent waveplates should be arranged so as to obtain a half-wave retardation in one wavelength range, for example between 1410 nm and 1510 nm, and a full-wave retardation in the other wavelength range, i.e. between 1530 nm and 1630 nm. The transition between the full-wave behavior and the half-wave behavior has to be performed in about 20 nm, or 2.6 THz. This value or a lower one may be for example a requirement for an application of the stack of waveplates in a bidirectional isolator to be included in a double stage lumped Raman amplifier, in order to exploit as much as possible the signal wavelength range and the pump wavelength range.

Figure 16B:
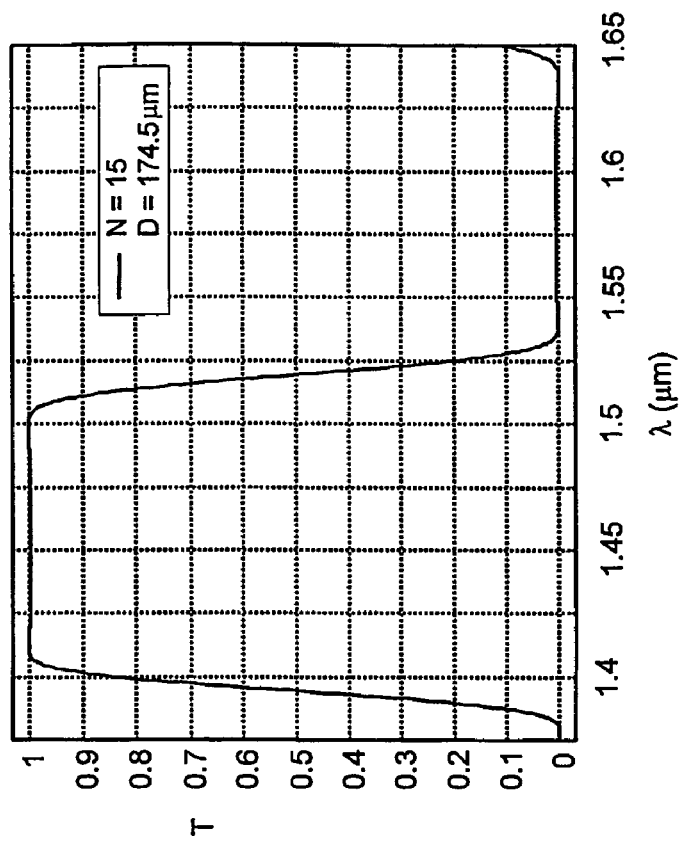
FIGS. 16a and 16b show the results of a first simulation performed by the Applicant for an exemplary stack of birefringent waveplates.
Figure 16A:
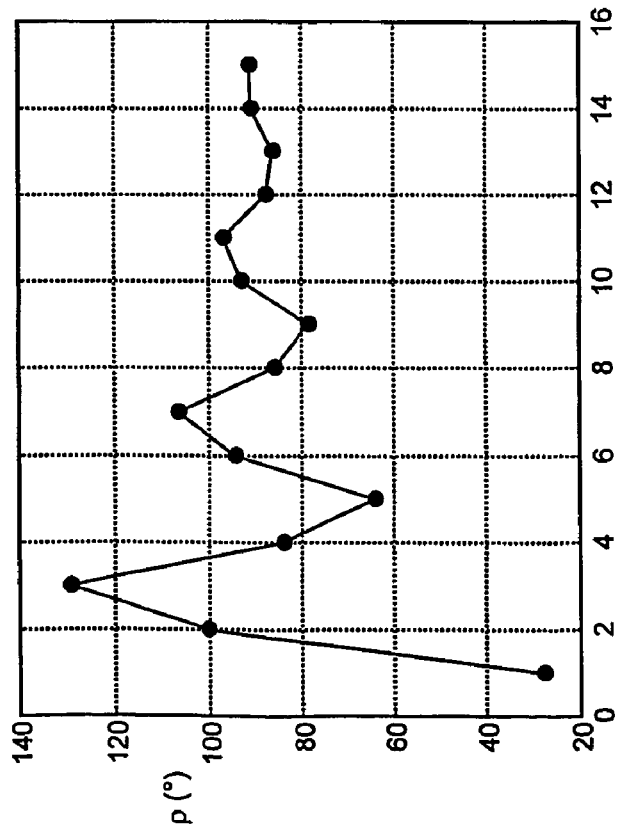

A tool was developed following the teachings of the above cited article of Harris et al. in order to determine a suitable stack structure. In order to keep the number of waveplates sufficiently low and at the same time for obtaining a better squared profile (maximum transfer function in the whole first wavelength range, minimum transfer function in the whole second wavelength range), the Fourier coefficients of the Fourier transform were multiplied by a weight function: this allowed to substantially eliminate ripples in the transfer function due to the low number of Fourier coefficients used for the approximation of the function. By setting a material birefringence $\Delta n$ of $5 \cdot 10^{-2}$, it was found that fifteen birefringent waveplates having a thickness of 174.5 μm may be used for the purpose. FIG. 16a shows the orientation $\rho$ to be applied to each birefringent waveplate. The orientation is measured with respect to a horizontal polarization direction, a rotation clockwise corresponding to positive angles. As it can be seen, the angle $\rho$ oscillates around a value of 90° (vertical polarization direction) with progressively damped oscillations. FIG. 16b shows the transfer function of the stack of birefringent waveplates disposed with orientations according to FIG. 16a. More particularly, FIG. 16b shows the normalized transmission T versus wavelength that can be obtained by sandwiching the stack of waveplates between two polarizers having crossed polarization directions. As it can be seen, the transmission is maximum between about 1410 and 1510 nm, for which the stack of waveplates behaves like a half-wave retarder, so that the polarization of an optical signal having wavelength comprised in such wavelength range is rotated of 90°. On the contrary, the transmission is minimum between about 1530 and 1625 nm, for which the stack of waveplates behaves like a full-wave retarder, so that the polarization of an optical signal having wavelength comprised in such wavelength range is left unchanged. More particularly, the transmission reaches 0.95 at about 1405 nm (213.5 THz) and 1510 nm (198.7 THz), whereas it reaches 0.05 at about 1385 nm (216.6 THz) and 1530 nm (196.1 THz). The overall width of the frequency transitions is about 5.7 THz. The period of the function ranges from about 1380 nm (217.4 THz) to about 1640 nm (182.9 THz). In other words, the frequency period of the transfer function is about 34.5 THz, so that the transition between the full wave behavior and the half wave behavior of the stack of waveplates takes about the 16.5% of the frequency period of the transfer function.

EXAMPLE 2

Figure 17:
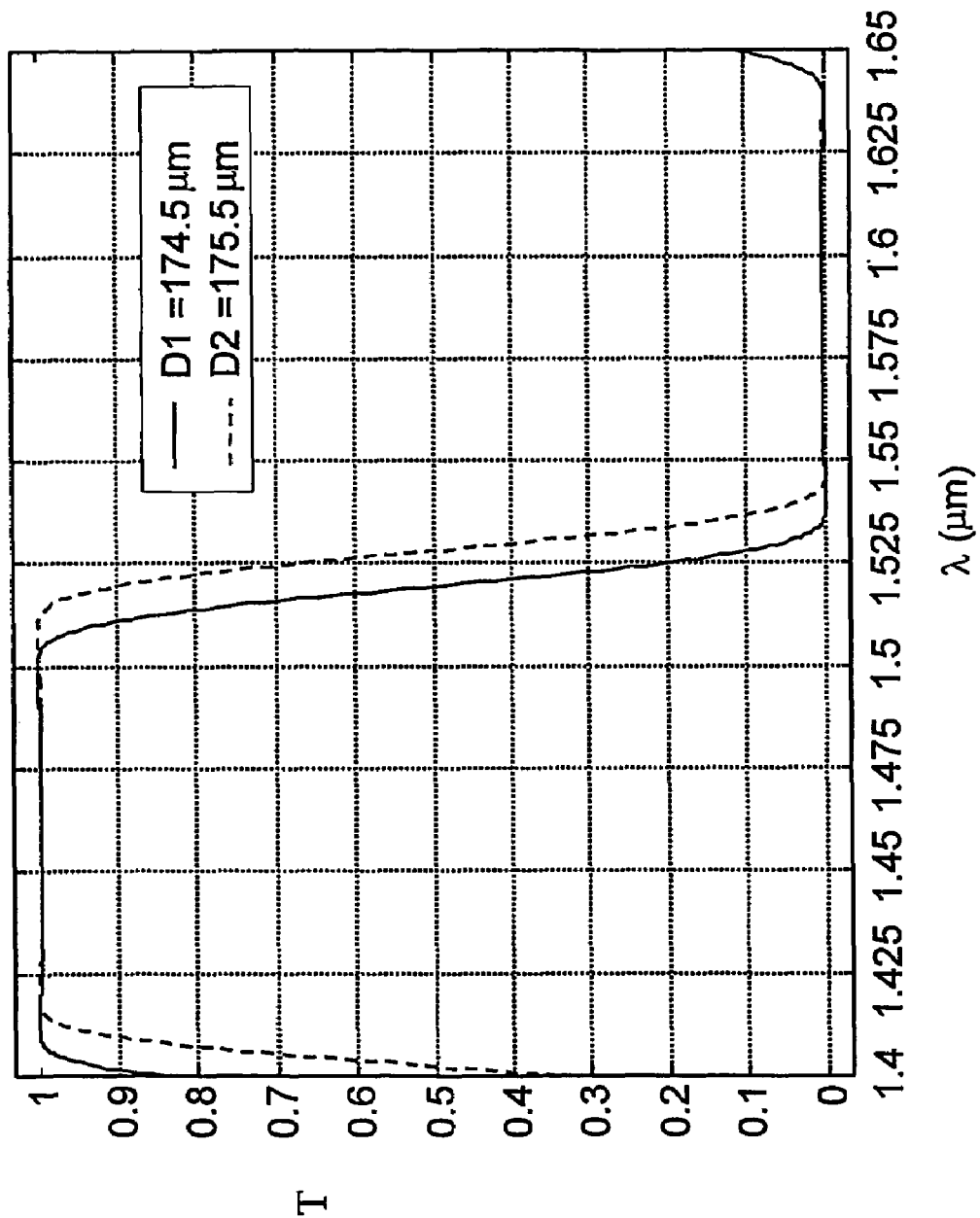
FIG. 17 shows how the plot of FIG. 16b may modify its profile by changing the thickness value of the birefringent waveplates.

It was found that a critical parameter that may be carefully controlled in order to guarantee the desired transfer function is the thickness of the birefringent waveplates. FIG. 17 shows how the plot of FIG. 16*b* may modify its profile if the thickness of the waveplates changes from 174.5 µm to 175.5 µm, for example due to an error in the fabrication of the waveplates. As it can be seen, the curve may shift towards higher wavelength values, so that the stack of waveplates may not perform as required in the boundary wavelength region between the first and the second wavelength range. In order to overcome such problem, and to take into account of possible variations of the thickness of the waveplates, for example due to fabrication tolerances, the Applicant has considered stacks of waveplates having slightly different thickness. It has been found that it is possible to reduce the variation of the transfer function due to variation of the thickness by avoiding a systematic error in the thickness of the waveplates with respect to the thickness value determined by the design tool (design value). Very reduced variation may be obtained:
  a) with a stack of waveplates having a substantially random thickness variation around the design value;
  b) with a stack of waveplates obtained by alternating a waveplate having a thickness lower than the project value to a waveplate having a thickness higher than the design value.

Figure 18:
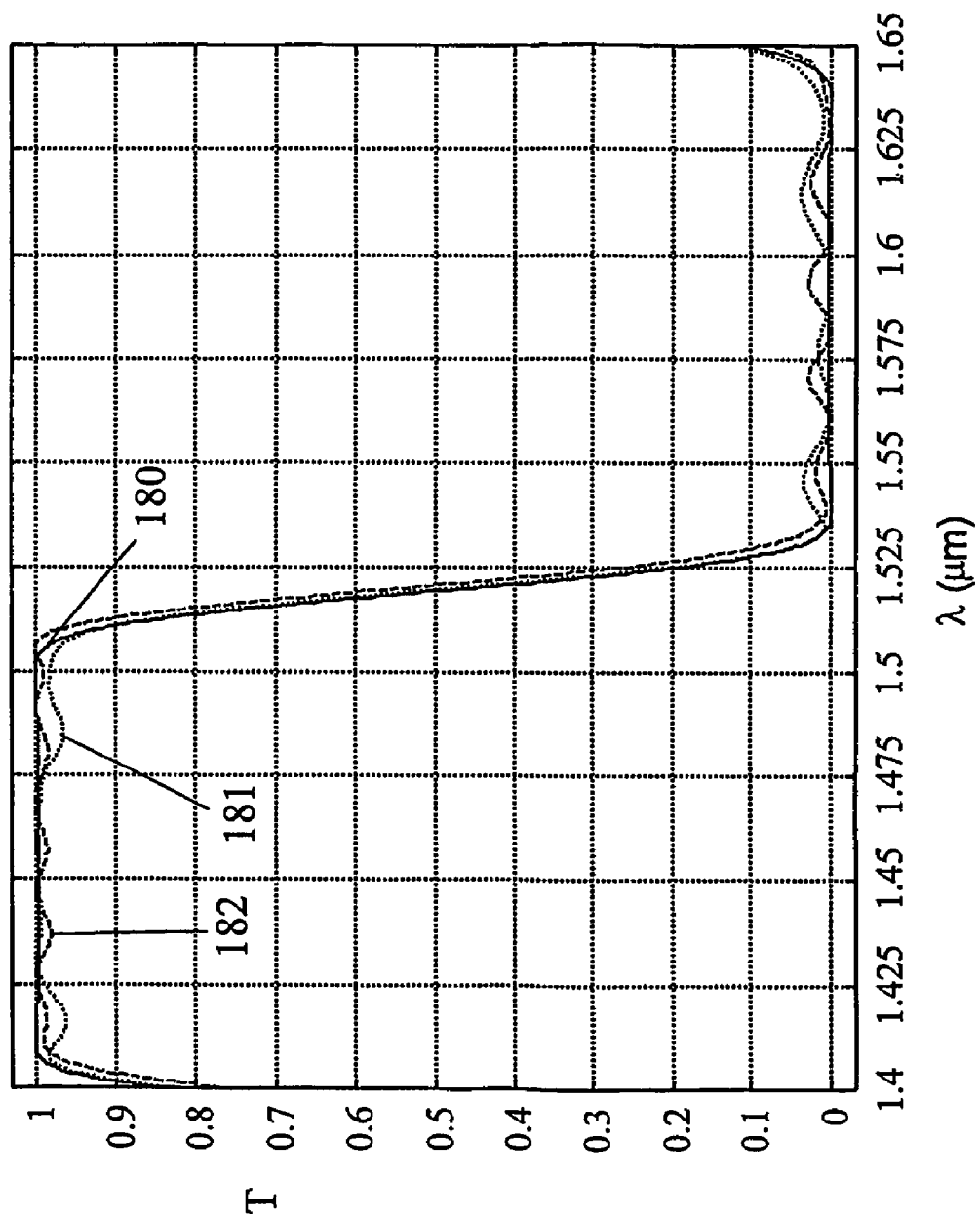
FIG. 18 shows the result of a second simulation performed by the Applicant with stacks of birefringent waveplates having slightly varying thickness.

FIG. 18 shows the two transfer functions obtained with the arrangements according to a) (dotted line 181) and b) (dashed line 182) compared with the "exact" transfer function obtained with the stack of waveplates described with reference to example 1 (continuous line 180). For the plots of FIG. 18, a random thickness value comprised between ±1 µm around the design value of 174.5 µm was considered for case a), and an alternation of waveplates having a thickness of 173.5 µm and 175.5 µm was considered for case b). As it can be seen, a very reduced variation of the transfer function can be obtained.

EXAMPLE 3

The Applicant has determined the structure of a stack of birefringent waveplates (number of waveplates, thickness, orientation) to be included, for example, in the bidirectional isolator 10 of FIG. 1 in order to allow the propagation of a first group of signals having wavelengths comprised in a first wavelength range between 1525 nm (namely, frequency 196.7 THz) and 1560 nm (192.3 THz) in one direction and the propagation of a second group of signals having wavelengths comprised in a second wavelength range between 1570 nm (191.1 THz) and 1610 nm (186.3 THz) in the opposite direction. Such bidirectional isolator may comply with the requirements for a bidirectional lumped Raman amplifier, according to one embodiment above described with reference to FIG. 3.

According to what stated above, the stack of birefringent waveplates should be arranged so as to obtain a half-wave retardation in one wavelength range, for example between 1525 nm and 1560 nm, and a full-wave retardation in the other wavelength range, i.e. between 1570 nm and 1610 nm. The transition between the full-wave behavior and the half-wave behavior has to be performed in about 10 nm, or 1.2 THz. Such a stack of birefringent waveplates could be also used, for example, as wavelength selective polarization rotator in the bidirectional isolating device 70 of FIG. 7 or FIG. 9.

The same design tool disclosed with reference to example 1 was used for performing a simulation, in order to determine a suitable stack structure.

Figure 19:
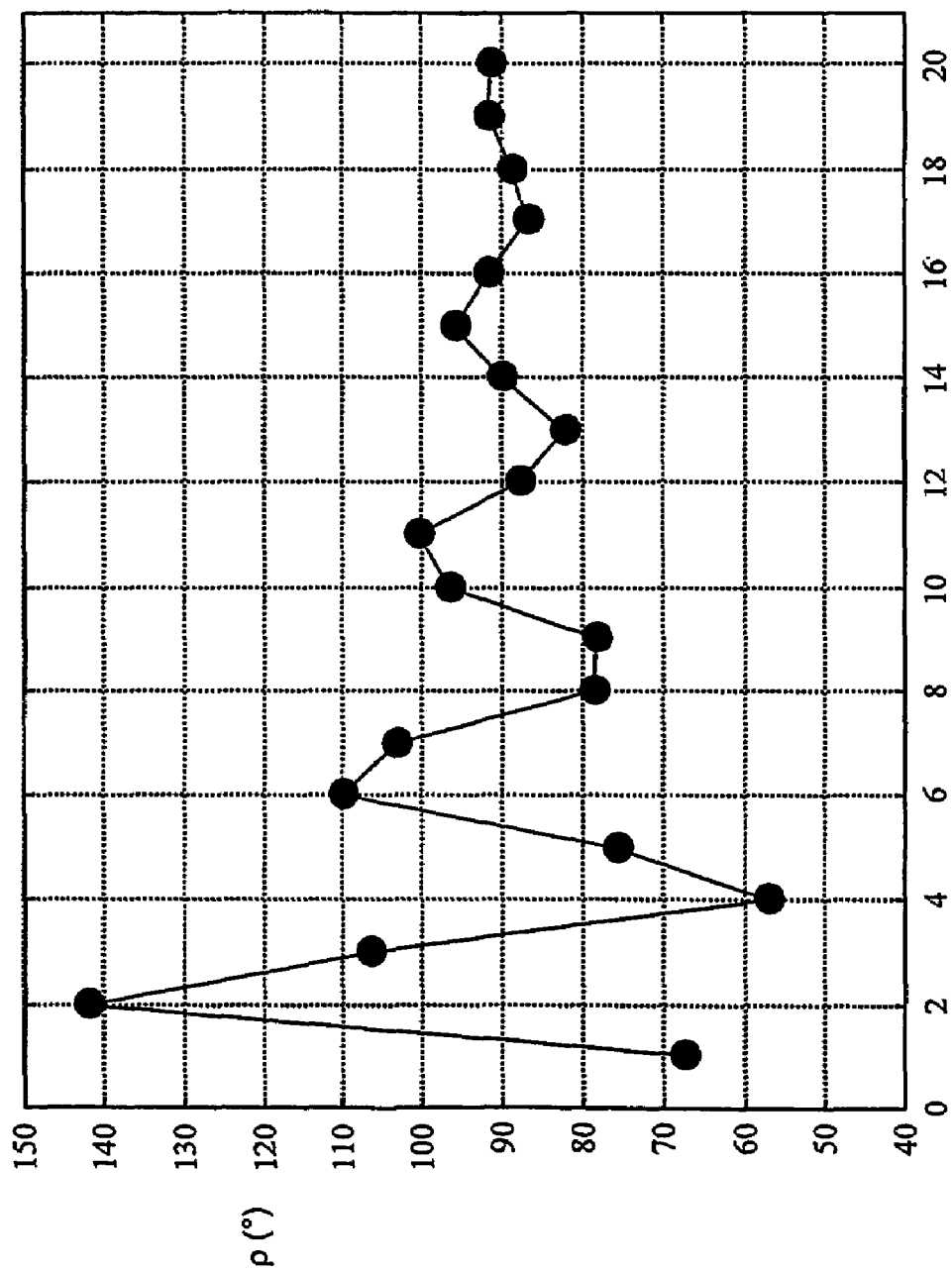
FIG. 19 shows the result of a third simulation performed by the Applicant for another exemplary stack of birefringent waveplates.
Figure 20B:
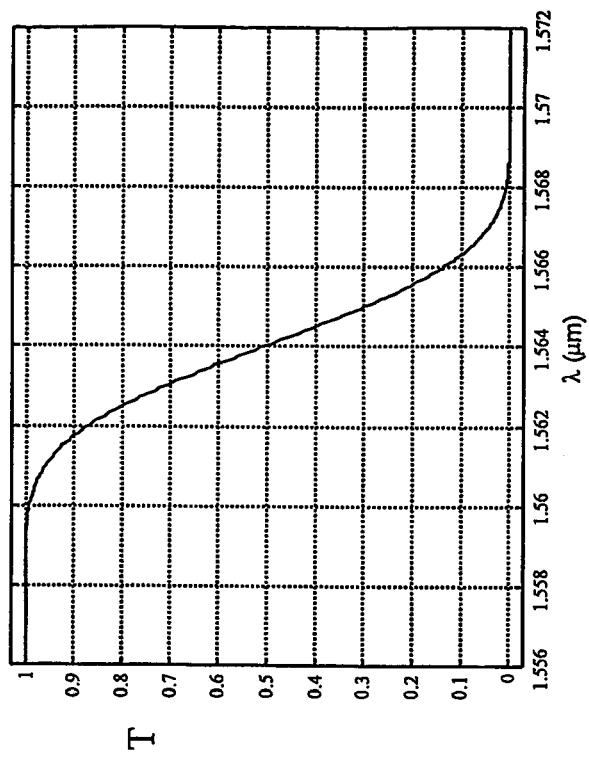
FIGS. 20a and 20b show the transfer function of the exemplary stack of waveplates oriented according to the angle values shown in FIG. 19: in particular.
Figure 20A:
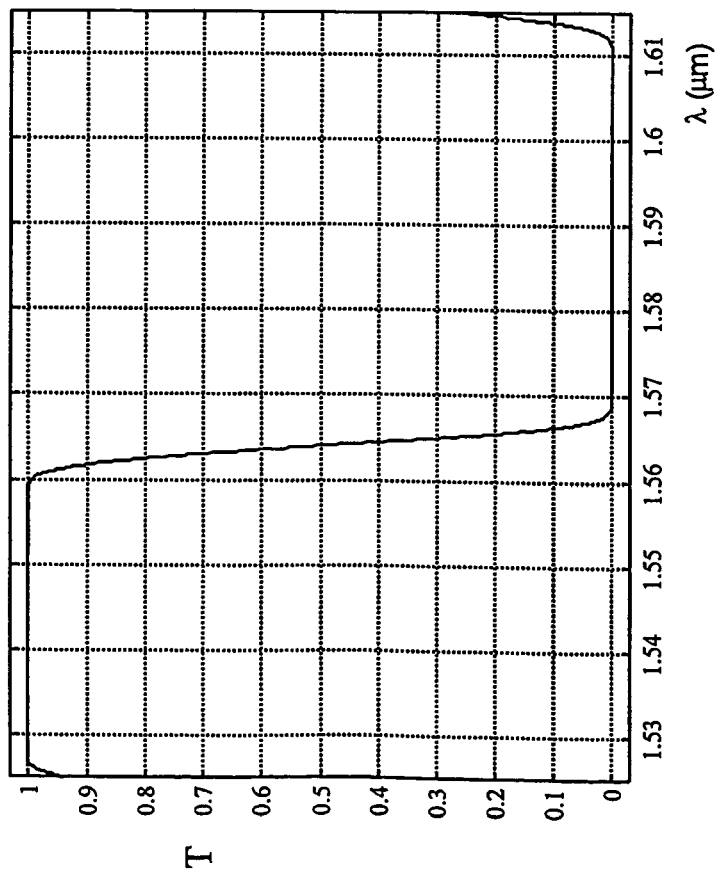

By setting a material birefringence Δn of 0.1, it was found that twenty birefringent waveplates having a thickness of 262 µm may be used for the purpose. FIG. 19 shows the orientation ρ to be applied to each birefringent waveplate. The orientation is measured with respect to a horizontal polarization direction, a rotation clockwise corresponding to positive angles. FIG. 20*a* shows the transfer function of the stack of birefringent waveplates disposed with orientations according to FIG. 19. FIG. 20*b* shows a magnification in the transition range between 1560 nm and 1570 nm. The transmission reaches 0.95 at about 1561 nm (192.2 THz), whereas it reaches 0.05 at about 1567 nm (191.5 THz). The overall width of the frequency transitions is about 1.4 THz, over a frequency period of more than 10.4 Thz (1525 nm-1610 nm). Thus, the transition between the full wave behavior and the half wave behavior of the stack of waveplates takes less than 14% of the frequency period of the transfer function.

EXAMPLE 4

The Applicant has determined the structure of a stack of birefringent waveplates (number of waveplates, thickness, orientation) to be included, for example, in the bidirectional isolator 10 of FIG. 1 in order to allow the propagation of a first group of signals having wavelengths comprised in a first wavelength range between 1530 nm (namely, frequency 196.1 THz) and 1560 nm (192.3 THz) in one direction and the propagation of a second group of signals having wavelengths comprised in a second wavelength range between 1575 nm (190.5 THz) and 1610 nm (186.3 THz) in the opposite direction. Such bidirectional isolator may comply with the requirements for a bidirectional lumped Raman amplifier, according to one embodiment above described with reference to FIG. 3. However, the required transition range is larger than that required in example 3.

According to what stated above, the stack of birefringent waveplates should be arranged so as to obtain a half-wave retardation in one wavelength range, for example between 1530 nm and 1560 nm, and a full-wave retardation in the other wavelength range, i.e. between 1575 nm and 1610 nm. The transition between the full-wave behavior and the half-wave behavior has to be performed in about 15 nm, or 1.8 THz. Such a stack of birefringent waveplates could be also used, for example, as wavelength selective polarization rotator in the bidirectional isolating device 70 of FIG. 7 or FIG. 9.

The same design tool disclosed with reference to example 1 was used for performing a simulation, in order to determine a suitable stack structure.

Figure 21:
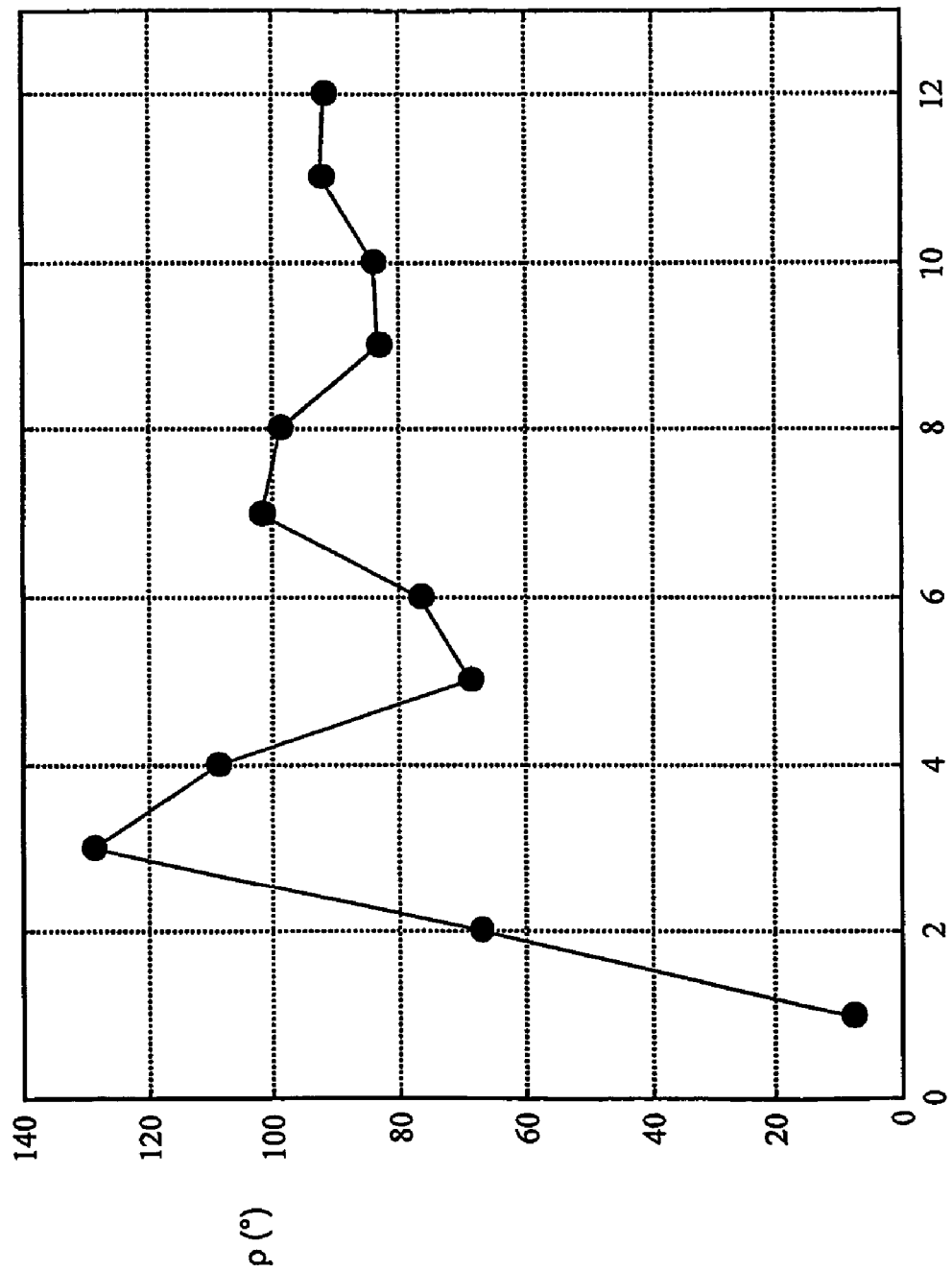
FIG. 21 shows the result of a fourth simulation performed by the Applicant for another exemplary stack of birefringent waveplates.
Figure 22B:
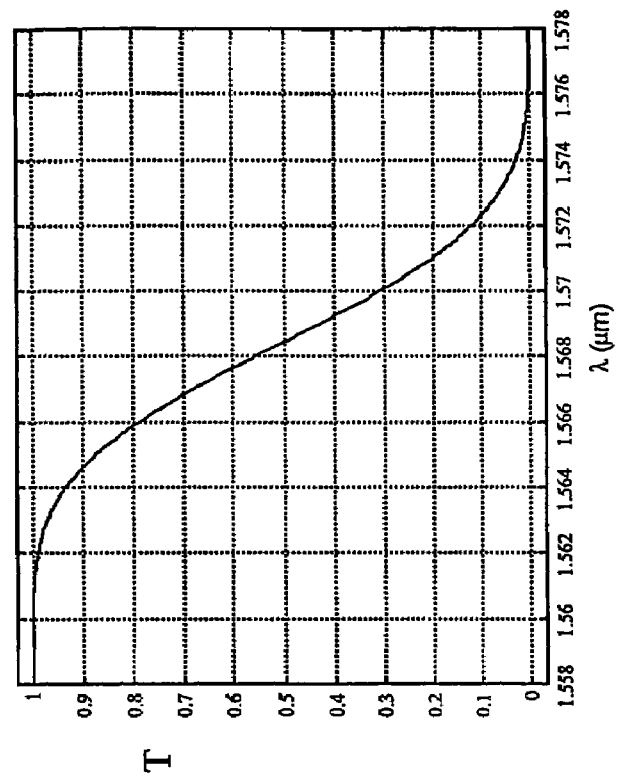
FIGS. 22a and 22b show the transfer function of the exemplary stack of waveplates oriented according to the angle values shown in FIG. 21: in particular.
Figure 22A:
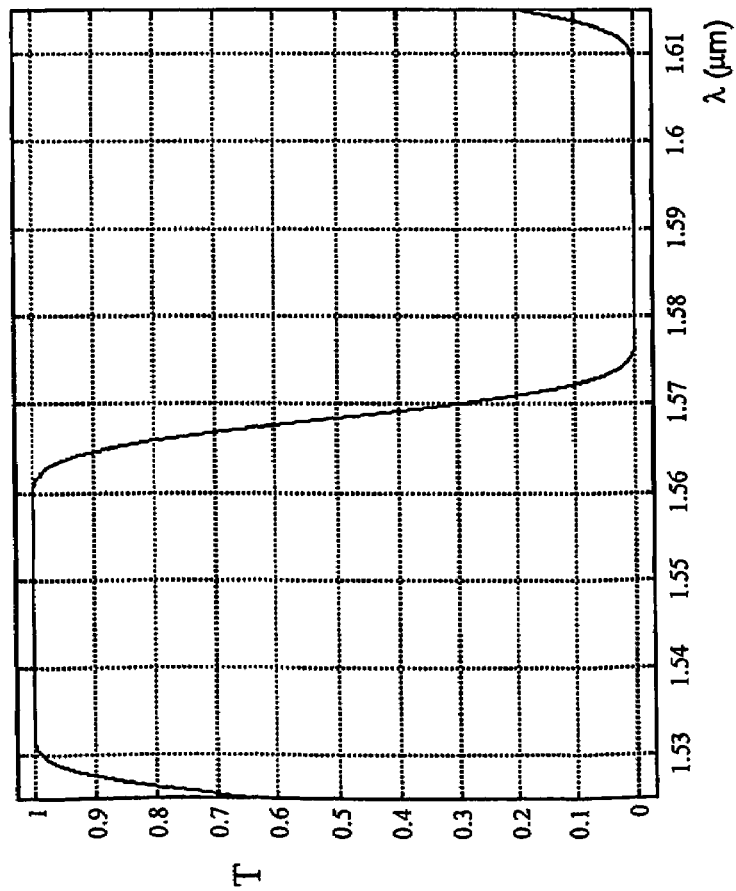

By setting a material birefringence Δn of 0.1, it was found that twelve birefringent waveplates having a thickness of 262 µm may be used for the purpose. It has to be noticed that as the transition frequency width required was wider than in example 3, a lower number of waveplates can be used. FIG. 21 shows the orientation ρ to be applied to each birefringent waveplate. The orientation is measured with respect to a horizontal polarization direction, a rotation clockwise corresponding to positive angles. FIG. 22*a* shows the transfer function of the stack of birefringent waveplates disposed with orientations according to FIG. 21. FIG. 22b shows a magnification in the transition range between 1560 nm and 1575 nm. The transmission reaches 0.95 at about 1563 nm (191.9 THz), whereas it reaches 0.05 at about 1573 nm (190.7 THz). The overall width of the frequency transitions is about 2.4 THz, over a frequency period of more than 9.8 Thz (1530 nm-1610 nm). Thus, the transition between the full wave behavior and the half wave behavior of the stack of waveplates takes less than 25% of the frequency period of the transfer function.

EXAMPLE 5

The Applicant has determined the structure of two different stacks of birefringent waveplates (number of waveplates, thickness, orientation) to be included in the bidirectional isolating device 107 shown in FIG. 12, adapted for use in the preferred embodiment of Raman amplifier 100 shown in FIG. 10. In an exemplary embodiment of a double stage Raman amplifier 100 according to FIG. 10, the optical signal S1 may comprise different channels between 1530 nm (196.1 THz) and 1610 nm (186.3 THz), the first pump radiation S2 may be provided by pump lasers emitting at 1470 nm (204.1 THz) and 1510 nm (198.7 THz), the second pump radiation S3 may be provided by pump lasers emitting at 1425 nm (210.5 THz) and 1440 nm (208.3 THz).

Figure 23:
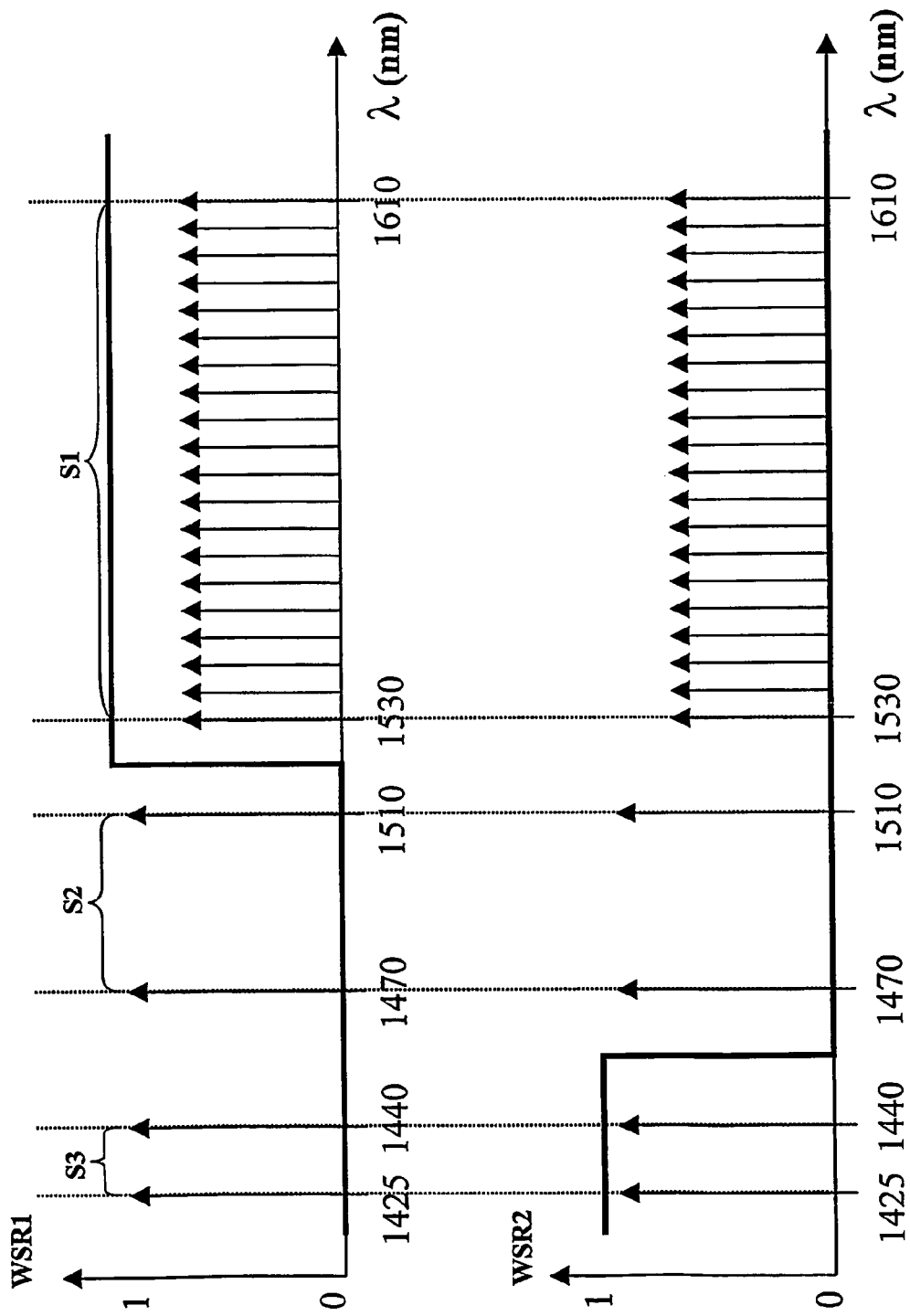
FIG. 23 schematically shows desired transfer functions for a first and a second wavelength selective polarization rotators to be used in the preferred embodiment of bidirectional isolating device of FIG. 12.

As explained in the description made for the bidirectional isolating device 107, with reference to FIG. 12, the two required stacks of waveplates should have different frequency transitions. More particularly, the first stack should behave like a half wave retarder for the optical signal S1 and like a full wave retarder for the pump radiations S2, S3; the second stack should behave like a full wave retarder for the optical signal S1 and for the first pump radiation S2 and like a half wave retarder for the second pump radiation S3. FIG. 23 shows the desired transfer functions for the two stacks of waveplates WSR1 and WSR2, according to the stated purposes.

The same design tool disclosed with reference to example 1 was used for performing a simulation, in order to determine suitable stack structures.

Figure 24:
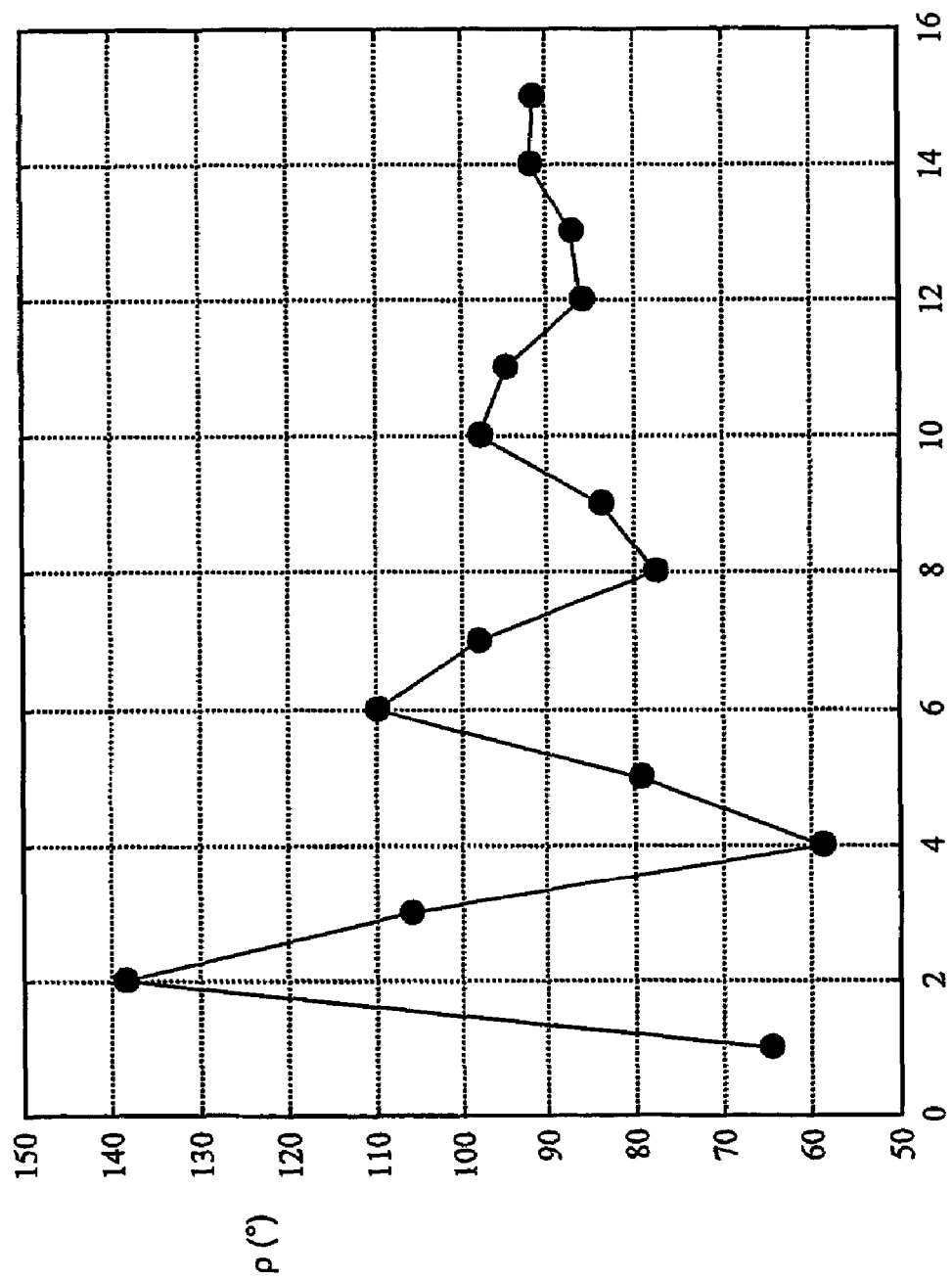
FIG. 24 shows the orientation angles of birefringent waveplates for obtaining a transfer function for the first wavelength selective rotator WSR1 according to FIG. 23.
Figure 25B:
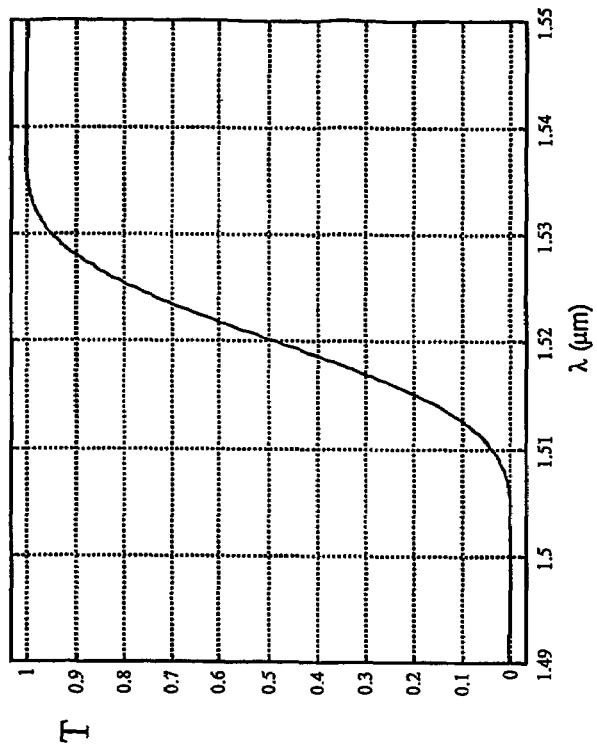
FIGS. 25a and 25b show the transfer function of the exemplary stack of waveplates oriented according to the angle values shown in FIG. 24: in particular.
Figure 25A:
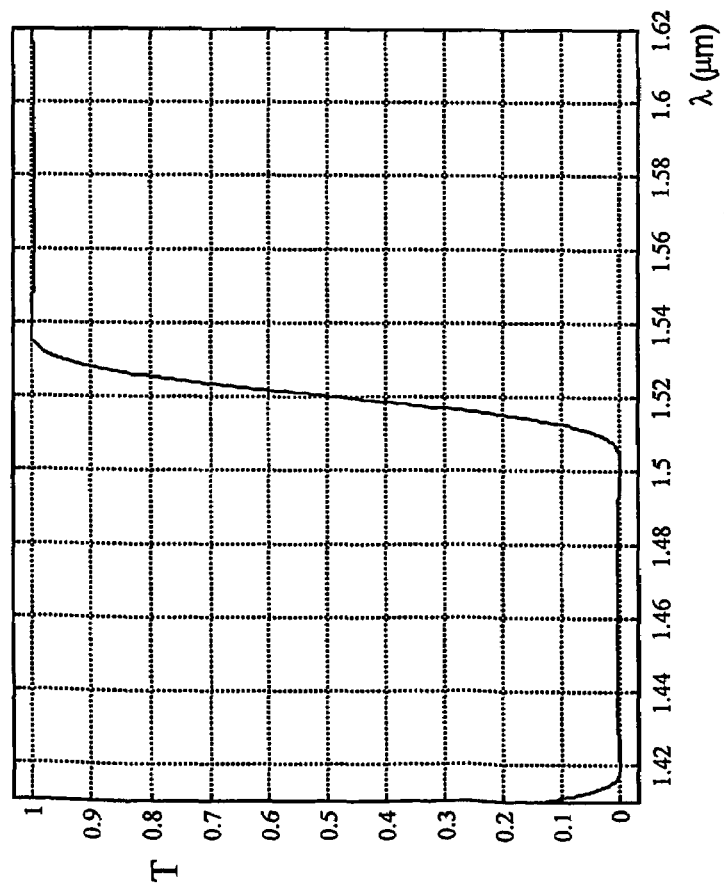

By setting a material birefringence Δn of 0.05, it was found that fifteen birefringent waveplates having a thickness of 190 μm may be used for the first stack of birefringent waveplates WSR1. FIG. 24 shows the orientation ρ to be applied to each birefringent waveplate. The orientation is measured with respect to a horizontal polarization direction, a rotation clockwise corresponding to positive angles. FIG. 25a shows the transfer function of the stack of birefringent waveplates disposed with orientations according to FIG. 24: as it can be seen, the period of the transfer function extends over a wavelength range wider than the range 1410 nm-1620 nm. FIG. 25b shows a magnification in the transition range between 1500 nm and 1540 nm. The transmission reaches 0.95 at about 1530 nm (196.1 THz), whereas it reaches 0.05 at about 1511 nm (198.5 THz). The overall width of the frequency transitions is about 4.8 THz, over a frequency period of more than 27.6 Thz (1410 nm-1620 nm). Thus, the transition between the full wave behavior and the half wave behavior of the first stack of waveplates WSR1 takes less than 18% of the frequency period of the transfer function.

Figure 26:
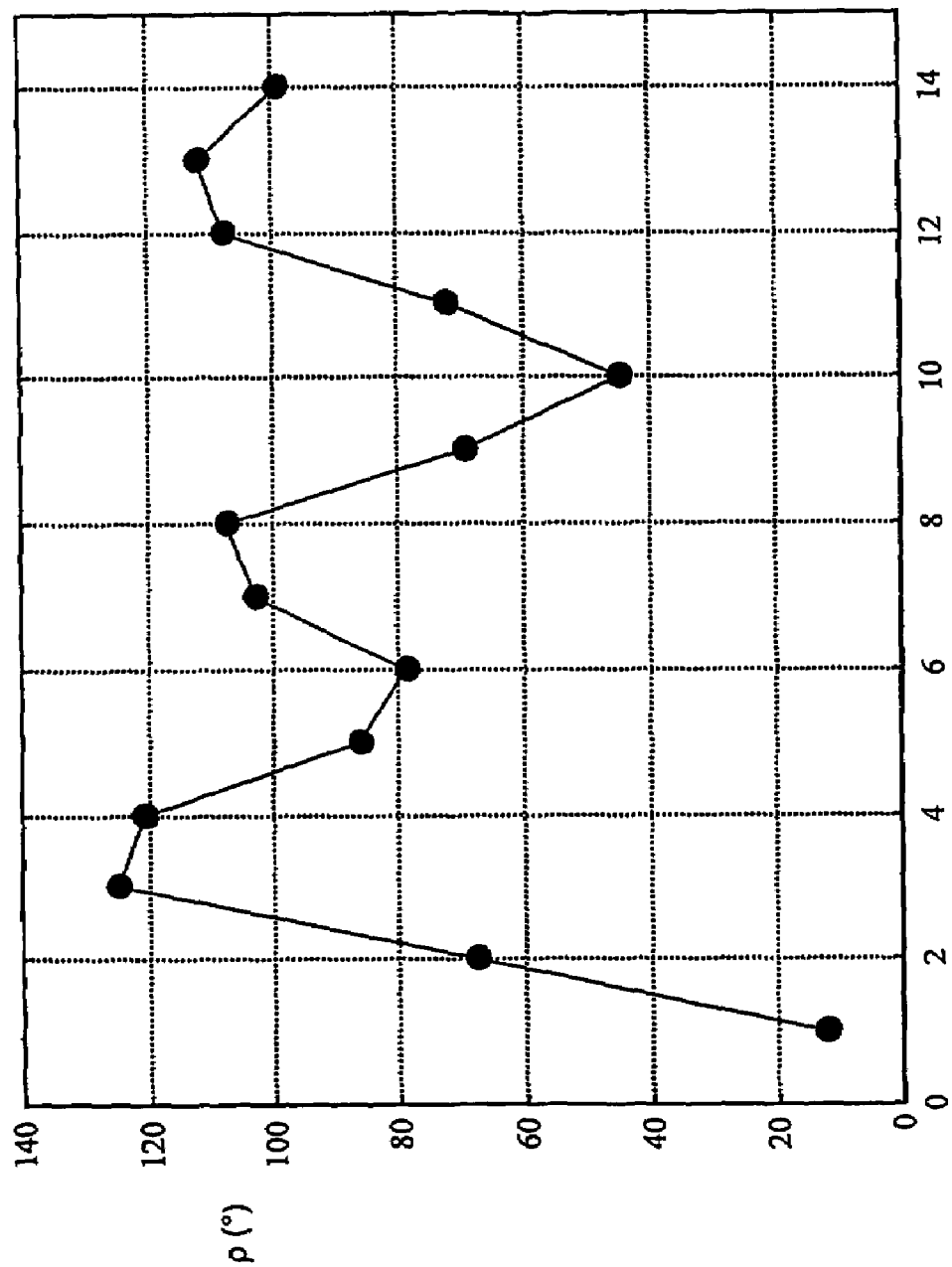
FIG. 26 shows the orientation angles of birefringent waveplates for obtaining a transfer function for the second wavelength selective rotator WSR2 according to FIG. 23.
Figure 27B:
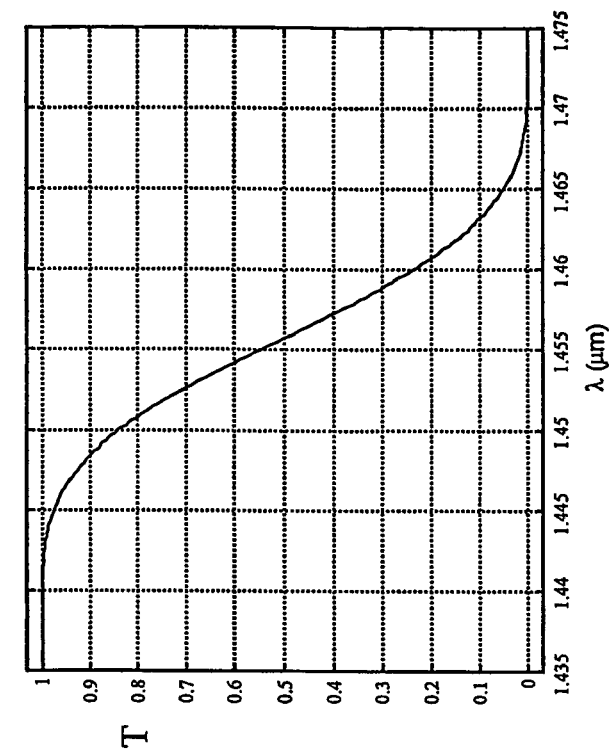
FIGS. 27a and 27b show the transfer function of the exemplary stack of waveplates oriented according to the angle values shown in FIG. 26: in particular.
Figure 27A:
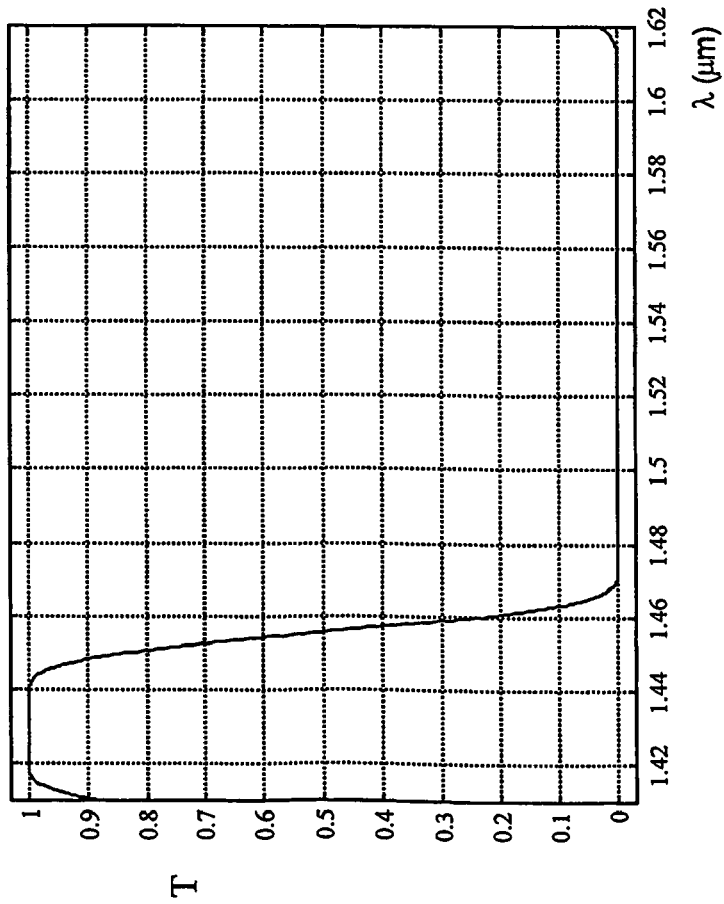

By setting a material birefringence Δn of 0.05, it was found that fourteen birefringent waveplates having a thickness of 200 μm may be used for the second stack of birefringent waveplates WSR2. FIG. 26 shows the orientation ρ to be applied to each birefringent waveplate. The orientation is measured with respect to a horizontal polarization direction, a rotation clockwise corresponding to positive angles. FIG. 27a shows the transfer function of the stack of birefringent waveplates disposed with orientations according to FIG. 26: as it can be seen, the period of the transfer function extends over a wavelength range wider than the range 1410 nm-1620 nm. FIG. 27b shows a magnification in the transition range between 1440 nm and 1475 nm. The transmission reaches 0.95 at about 1447 nm (207.3 THz), whereas it reaches 0.05 at about 1465 nm (204.8 THz). The overall width of the frequency transitions is about 5 THz, over a frequency period of more than 27.6 Thz (1410 nm-1620 nm). Thus, the transition between the full wave behavior and the half wave behavior of the second stack of waveplates WSR2 takes less than 18% of the frequency period of the transfer function.

EXAMPLE 6

The Applicant has determined the structure of two different stacks of birefringent waveplates (number of waveplates, thickness, orientation) to be included in the bidirectional isolating device 108 shown in FIG. 15, adapted for use in the preferred embodiment of Raman amplifier 100 shown in FIG. 13. In an exemplary embodiment of a double stage Raman amplifier 100 according to FIG. 13, the optical signal S1 may comprise different channels between 1530 nm (196.1 THz) and 1610 nm (186.3 THz), the first pump radiation S2 may be provided by pump lasers emitting 1425 nm (210.5 THz) and 1440 nm (208.3 THz), the second pump radiation S3 may be provided by pump lasers emitting at 1470 nm (204.1 THz) and 1510 nm (198.7 THz).

Figure 28:
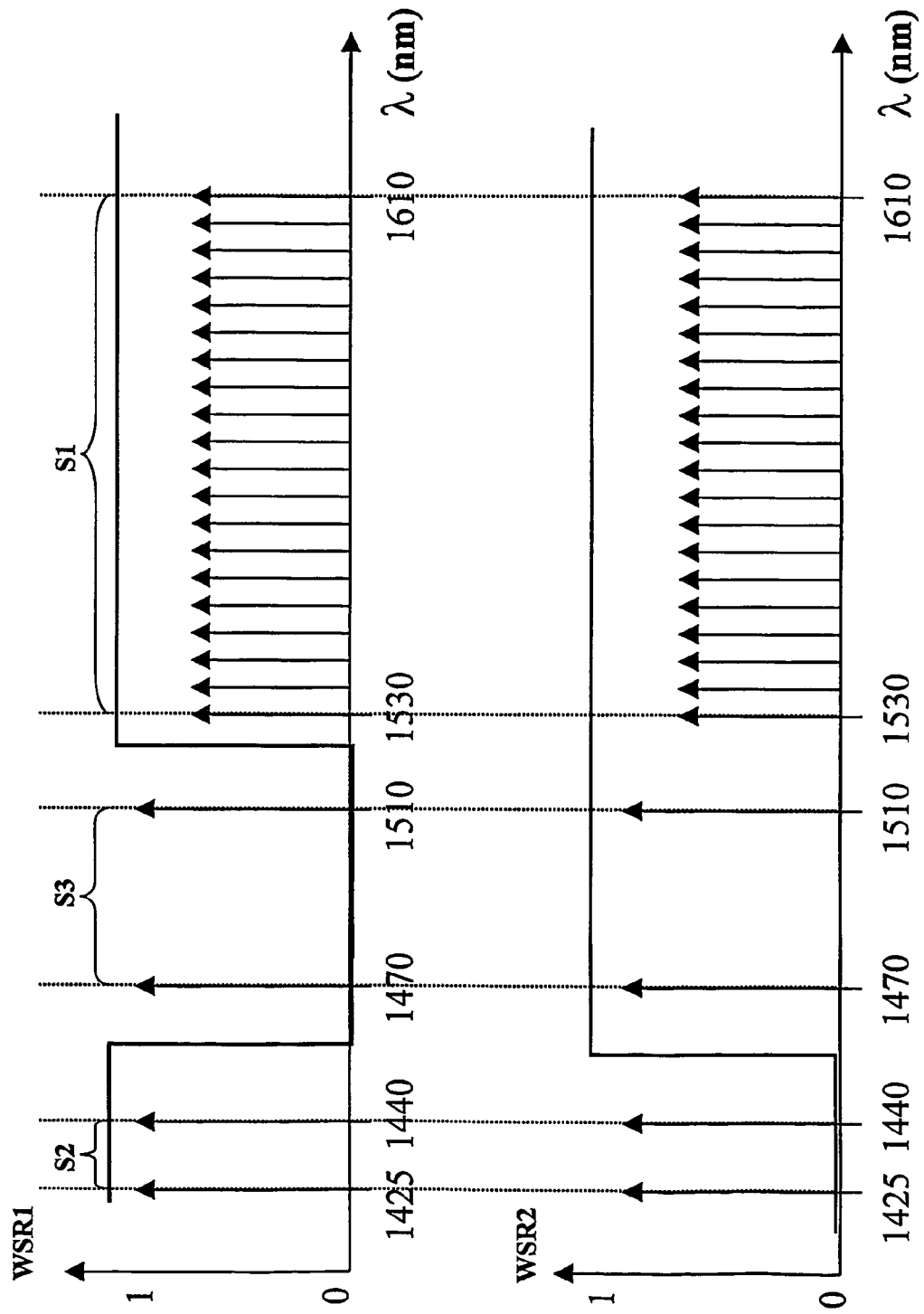
FIG. 28 schematically shows desired transfer functions for a first and a second wavelength selective polarization rotators to be used in the preferred embodiment of bidirectional isolating device of FIG. 15.

As explained in the description made for the bidirectional isolating device 108, with reference to FIG. 15, the two required stacks of waveplates should have different frequency transitions. More particularly, the first stack should behave like a half wave retarder for the optical signal S1 and for the first pump radiation S2 and like a full wave retarder for the second pump radiation S3; the second stack should behave like a full wave retarder for the first pump radiation S2 and like a half wave retarder for the optical signal S1 and for the second pump radiation S3. FIG. 28 shows the desired transfer functions for the two stacks of waveplates WSR1 and WSR2, according to the stated purposes.

The same design tool disclosed with reference to example 1 was used for performing a simulation, in order to determine suitable stack structures.

Figure 29:
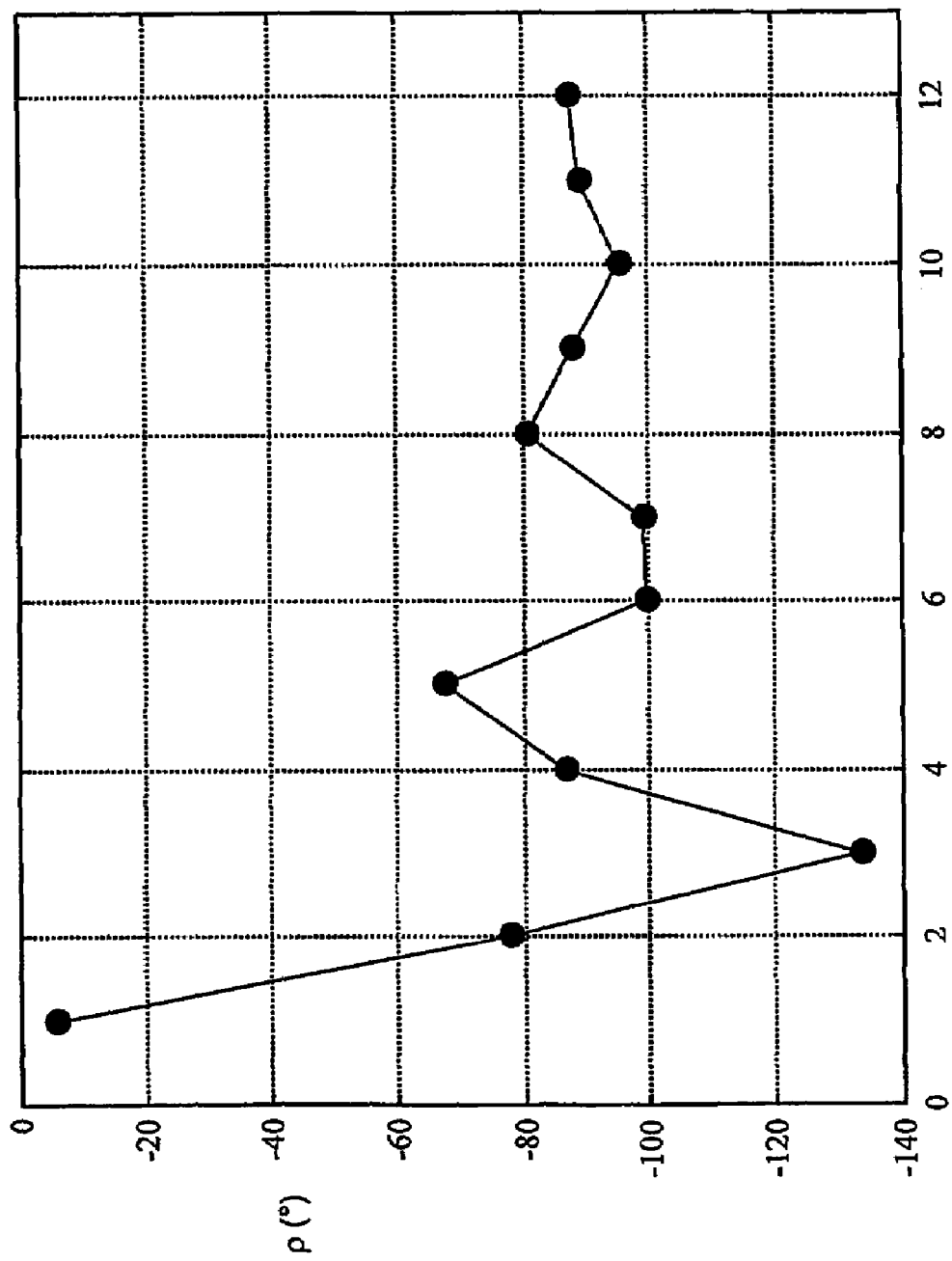
FIG. 29 shows the orientation angles of birefringent waveplates for obtaining a transfer function for the first wavelength selective rotator WSR1 according to FIG. 28.
Figure 30B:
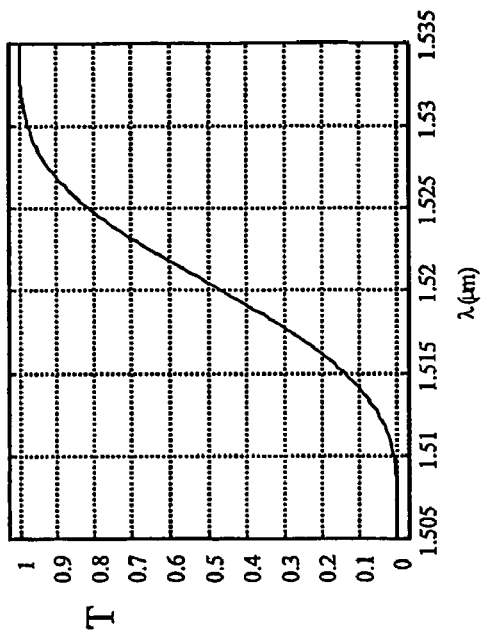
FIGS. 30a, 30b and 30c show the transfer function of the exemplary stack of waveplates oriented according to the angle values shown in FIG. 29: in particular.
Figure 30C:
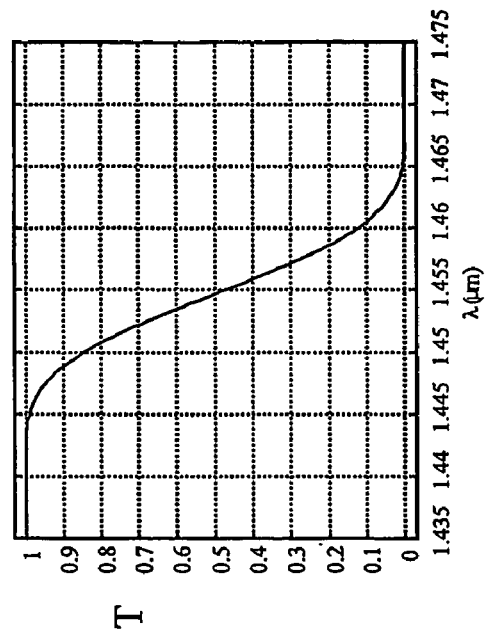
Figure 30A:
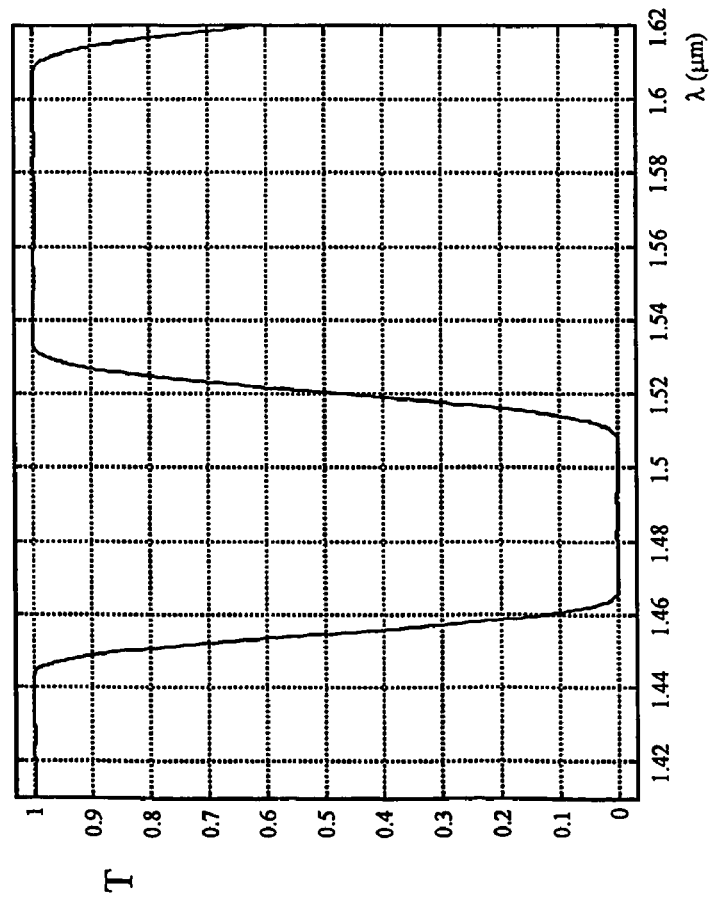

By setting a material birefringence Δn of 0.05, it was found that twelve birefringent waveplates having a thickness of 282 μm may be used for the first stack of birefringent waveplates WSR1. FIG. 29 shows the orientation ρ to be applied to each birefringent waveplate. The orientation is measured with respect to a horizontal polarization direction, a rotation clockwise corresponding to positive angles. FIG. 30a shows the transfer function of the stack of birefringent waveplates disposed with orientations according to FIG. 29: as it can be seen, the period of the transfer function extends over a wavelength range between about 1450 nm and about 1620 nm. FIGS. 30b and 30c show a magnification in the transition range between 1505 nm and 1535 nm and in the transition range between 1440 nm and 1470 nm, respectively. The transmission reaches 0.95 at about 1528 nm (196.3 THz) and at about 1447 nm (207.3 THz), whereas it reaches 0.05 at about 1513 nm (198.3 THz) and at about 1462 nm (205.2 THz). Thus, the overall width of the frequency transitions is about 4.1 THz, over a frequency period of more than 21.7 Thz (1450 nm-1620 nm). Thus, the transition between the full wave behavior and the half wave behavior of the first stack of waveplates WSR1 takes about the 19% of the frequency period of the transfer function.

Figure 31:
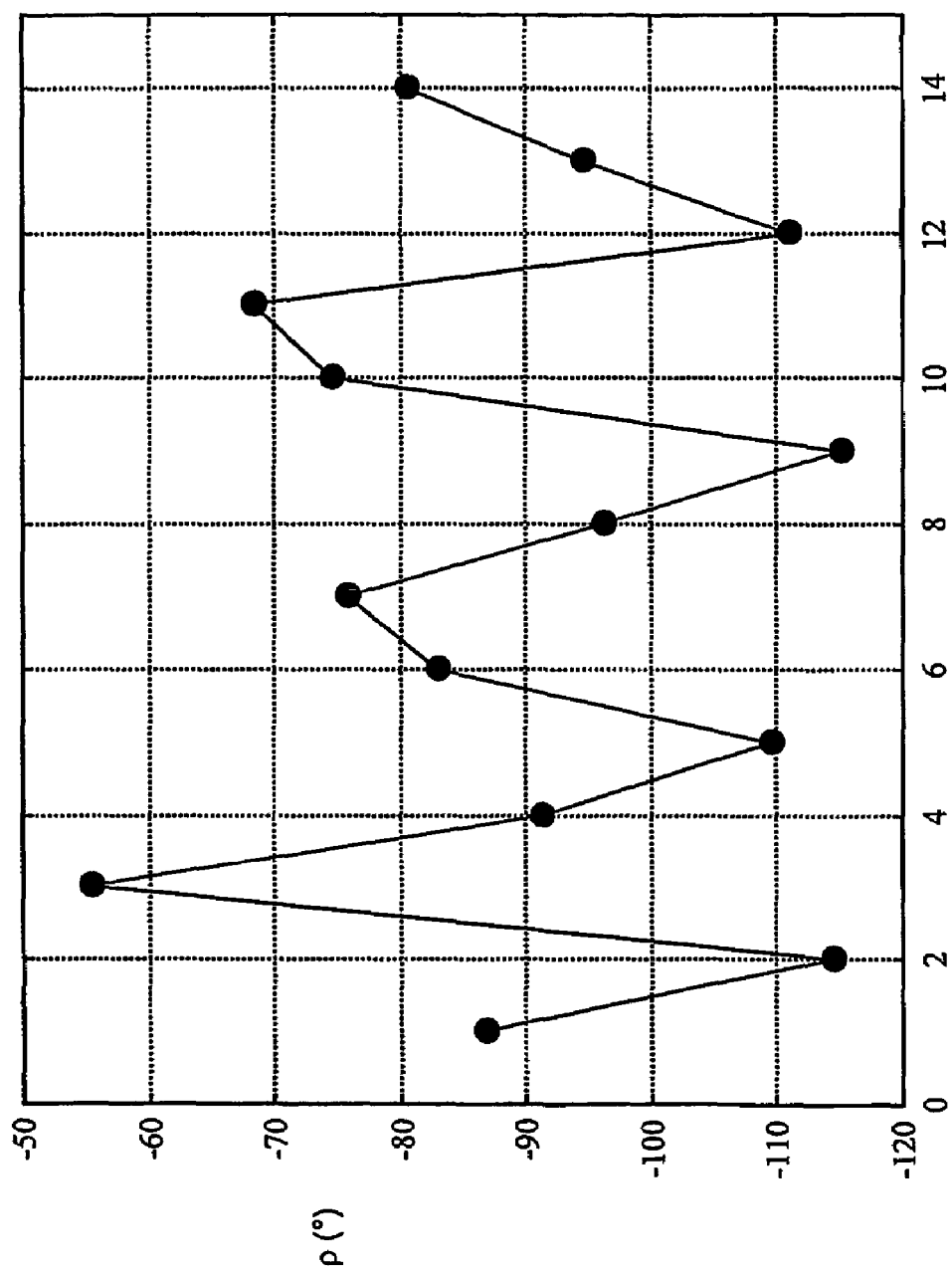
FIG. 31 shows the orientation angles of birefringent waveplates for obtaining a transfer function for the second wavelength selective rotator WSR2 according to FIG. 28.
Figure 32B:
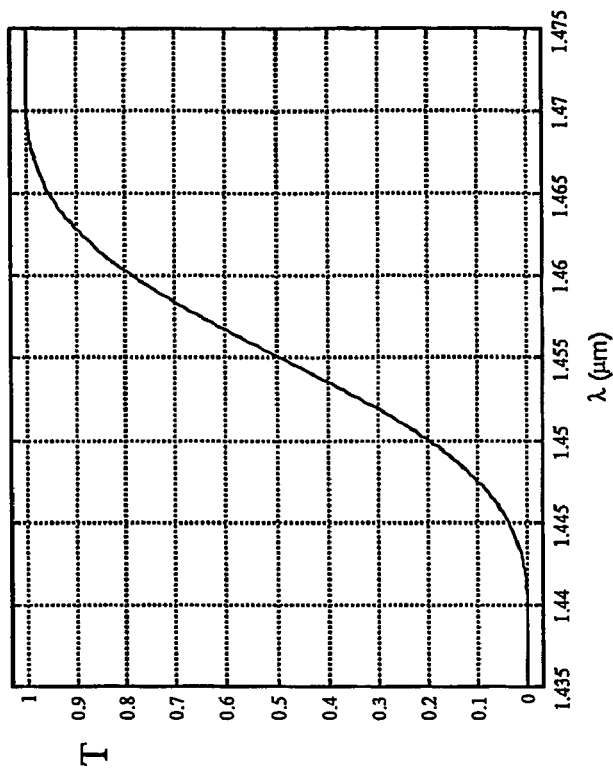
FIGS. 32a and 32b show the transfer function of the exemplary stack of waveplates oriented according to the angle values shown in FIG. 31: in particular.
Figure 32A:
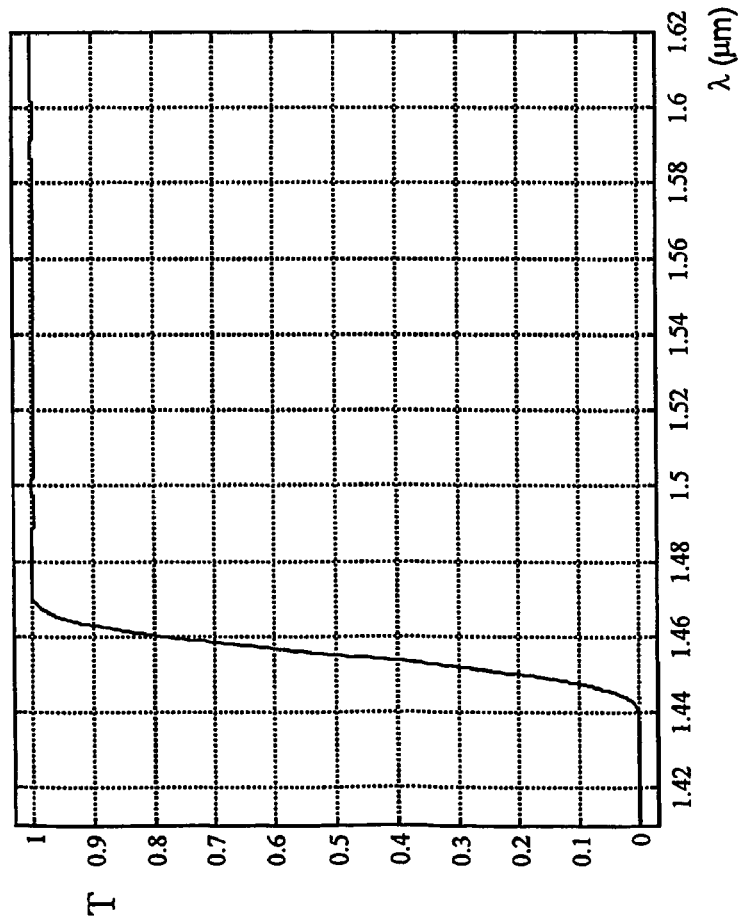

By setting a material birefringence Δn of 0.05, it was found that fourteen birefringent waveplates having a thickness of 185 μm may be used for the second stack of birefringent waveplates WSR2. FIG. 31 shows the orientation ρ to be applied to each birefringent waveplate. The orientation is measured with respect to a horizontal polarization direction, a rotation clockwise corresponding to positive angles. FIG. 32a shows the transfer function of the stack of birefringent waveplates disposed with orientations according to FIG. 31: as it can be seen, the period of the transfer function extends over a wavelength range wider than the range 1410 nm-1620 nm. FIG. 32b shows a magnification in the transition range between 1440 nm and 1475 nm. The transmission reaches 0.95 at about 1465 nm (204.8 THz), whereas it reaches 0.05 at about 1445 nm (207.6 THz). The overall width of the frequency transitions is about 5.6 THz, over a frequency period of more than 27.6 Thz (1410 nm-1620 nm). Thus, the transition between the full wave behavior and the half wave behavior of the second stack of waveplates WSR2 takes less than 20% of the frequency period of the transfer function.

EXAMPLE 7

Figure 33B:
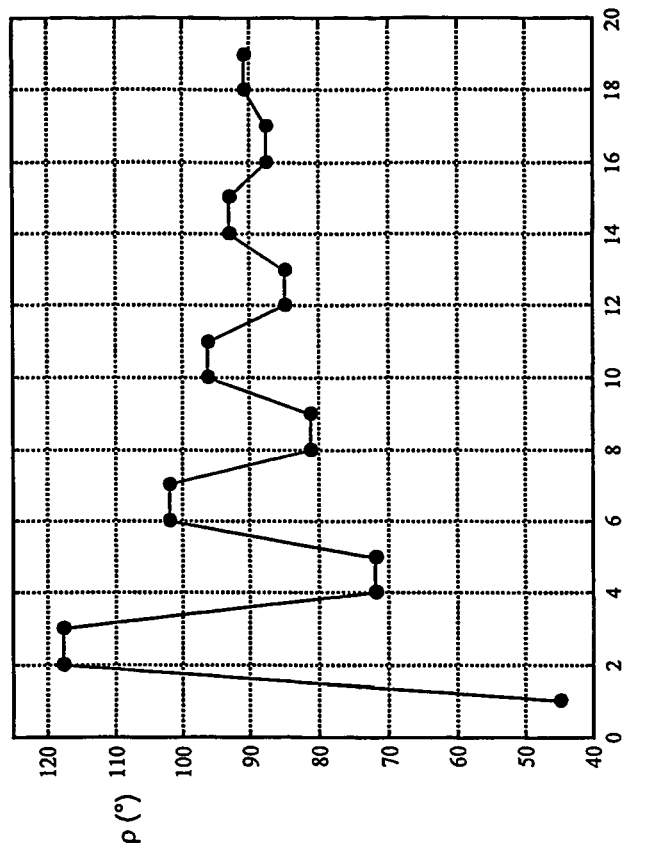
FIGS. 33a and 33b show, respectively, the transfer function versus a normalized frequency and the orientation angle values of a further exemplary stack of birefringent elements.
Figure 33A:
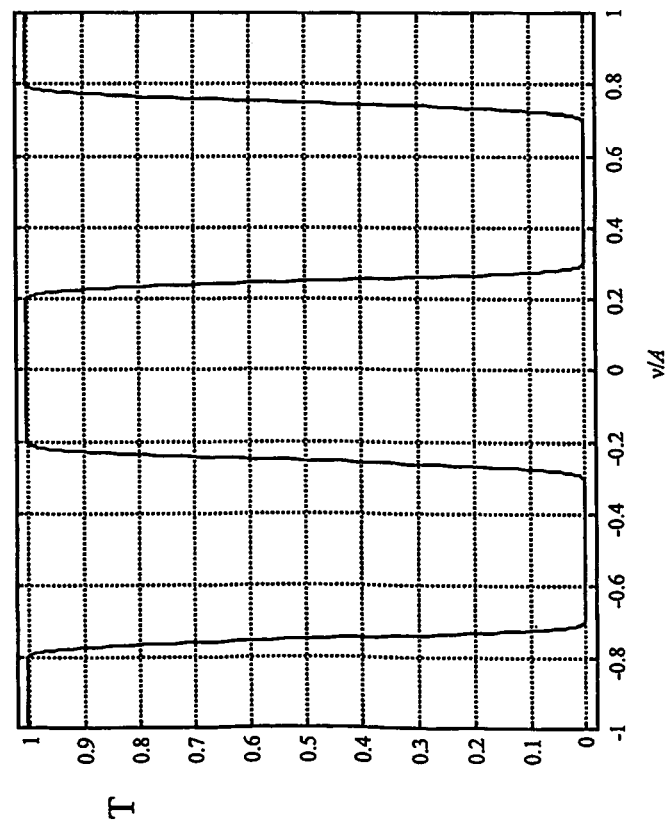

FIG. 33a shows a periodic transfer function versus frequency ν normalized on the frequency period A of a stack of birefringent waveplates. FIG. 33a differs from the transfer functions of the previous figures in that it is independent on the birefringence and the thickness of the waveplates. As a matter of fact, a transfer function versus normalized frequency may be used during the design of a stack of birefringent waveplates in order to predetermine what fraction of the frequency period of the transfer function may be dedicated to the transition between the full wave and the half wave behavior. In each period, two transitions take place. In the exemplary transfer function of FIG. 33a, the overall width dedicated to such transitions is about 16% (8% per each transition). Furthermore, the exemplary transfer function of FIG. 33a is an odd function: in other words, the frequency width reserved to the full wave behavior and the frequency width dedicated to the half wave behavior are practically equal. In this case, a low number of waveplates can be used, due to the symmetry properties of the transfer function. For example, FIG. 33b shows the orientation ρ to be applied to each birefringent waveplate of a stack having nineteen waveplates with the same thickness. As it can be seen, each of the pairs of waveplates following the first one has waveplates oriented according to substantially the same angle (i.e., with a maximum difference of less than 0.5°, preferably less than 0.1°). Hence, instead of using nineteen waveplates having substantially the same thickness L, one waveplate having thickness L and nine waveplates having substantially thickness 2 L may be used, for an overall sum of ten waveplates.

EXAMPLE 8

Figure 34B:
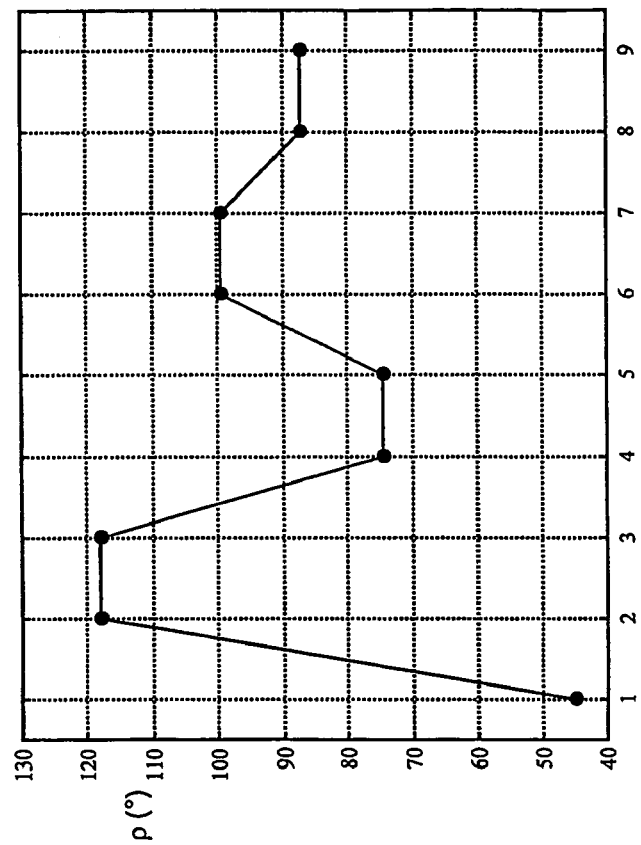
FIGS. 34a and 34b show, respectively, the transfer function versus normalized frequency and the orientation angle values of a further exemplary stack of birefringent elements.
Figure 34A:
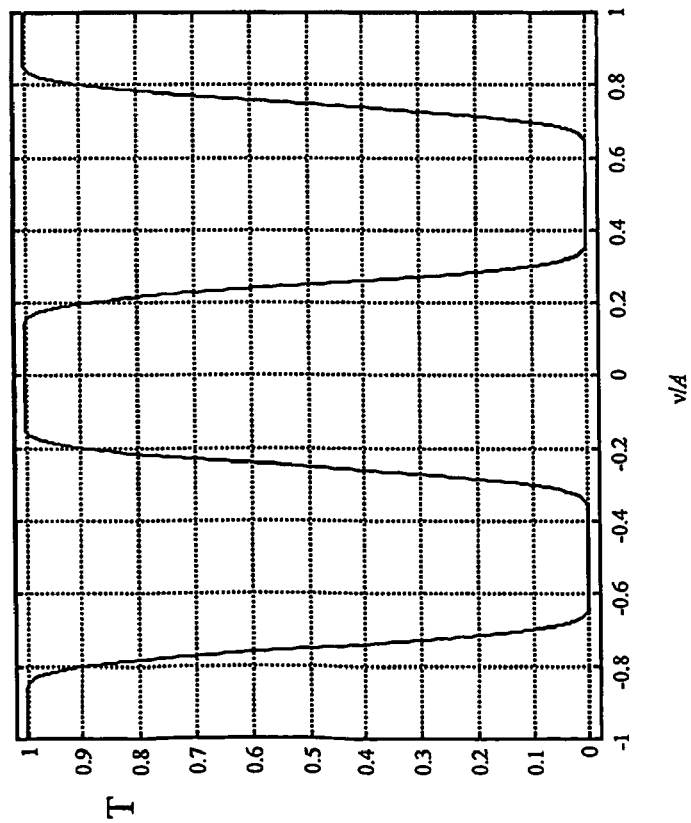

FIGS. 34a and 34b show the result of a simulation made with an odd transfer function versus frequency, as in example 7. However, a lower number of birefringent waveplates were considered. In particular, FIG. 34b shows the orientation ρ to be applied to each birefringent waveplate of a stack having nine waveplates having the same thickness. Instead of using nine waveplates having substantially the same thickness L, one waveplate having thickness L and four waveplates having substantially thickness 2 L may be used, for an overall sum of five waveplates. As it can be seen in FIG. 34a, the width of the transition regions in each period becomes higher than that of example 7, up to an overall width of about 40% of the frequency period.

EXAMPLE 9 (COMPARISON)

Figure 35B:
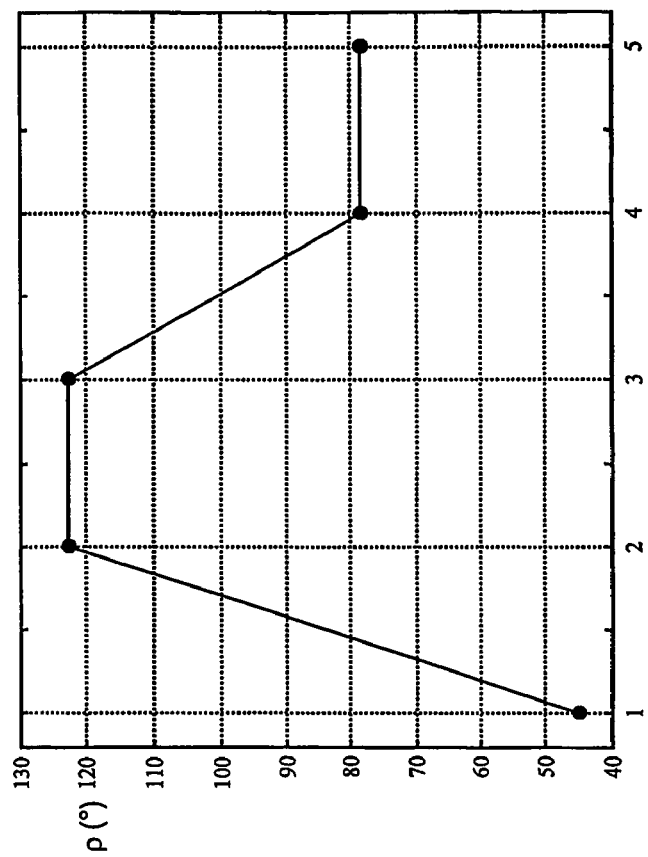
FIGS. 35a and 35b show, respectively, the transfer function versus normalized frequency and the orientation angle values of a further exemplary stack of birefringent elements.
Figure 35A:
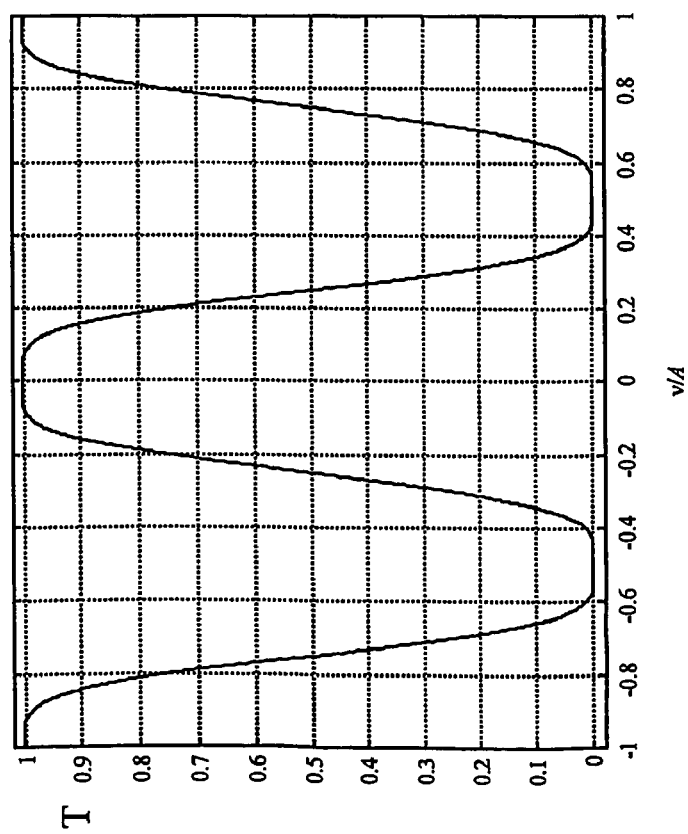

FIGS. 35a and 35b show the result of a simulation made with an odd transfer function versus frequency, as in examples 7 and 8. An even lower number of birefringent waveplates were considered. In particular, FIG. 35b shows the orientation ρ to be applied to each birefringent waveplate of a stack having five waveplates having the same thickness. Instead of using five waveplates having the same thickness L, one waveplate having thickness L and two waveplates having thickness 2 L may be used, for an overall sum of three waveplates. However, as it can be seen in FIG. 35a, the width of the transition regions in each period becomes higher than that of example 8, up to an overall width of about 60% of the frequency period, that may be unacceptable for many applications using bidirectional propagating signals, especially in case of use of mutually exclusive frequency bands per each propagation direction.

The invention claimed is:

1. A bidirectional isolating device comprising at least a first non-reciprocal optical assembly, said assembly comprising:
   at least a first polarizer;
   at least a first non-reciprocal polarization rotator arranged for rotating a polarization of a signal of substantially 45°±k·90°, wherein k is a non-negative integer; and
   at least a first wavelength selective reciprocal polarization rotator having a half-wave retarder behavior for a first group of optical frequencies and a full-wave retarder behavior for a second group of optical frequencies, according to a substantially frequency periodic transfer function;
   said first wavelength selective reciprocal polarization rotator comprising a predetermined number of at least five birefringent elements having a predetermined thickness and orientation, so as to obtain a transition between the half-wave retarder behavior and the full-wave retarder behavior in a frequency range lower than or equal to 40% of the period of said transfer function.

2. The bidirectional isolating device according to claim 1, wherein said optical assembly further comprises at least a first non-wavelength selective reciprocal polarization rotator, said polarizer, said non-reciprocal polarization rotator, said first non-wavelength selective reciprocal polarization rotator and said first wavelength selective reciprocal polarization rotator being arranged within said assembly so that a first optical signal having frequency in said first group of optical frequencies and a second optical signal having frequency in said second group of optical frequencies, input at said polarizer with whatever polarization, exit from said assembly so that the first optical signal is in a first polarization state and the second optical signal is in a second polarization state, orthogonal to said first polarization state.

3. The bidirectional isolating device according to claim 1, wherein said transition between the half-wave retarder behavior and the full-wave retarder behavior is in a frequency range lower than or equal to 20% of the period of said transfer function.

4. The bidirectional isolating device according to claim 1, wherein at least all but one of said birefringent elements have substantially the same thickness.

5. The bidirectional isolating device according to claim 4, wherein said birefringent elements have all substantially the same thickness.

6. The bidirectional isolating device according to claim 4, wherein said birefringent elements having substantially the same thickness have a thickness variation of less than or equal to 1%.

7. The bidirectional isolating device according to claim 4, wherein said birefringent elements having substantially the same thickness are disposed so that elements having a lower thickness alternate to elements having a higher thickness.

8. The bidirectional isolating device according to claim 1, wherein said polarizer is adapted for splitting an optical signal having any polarization into two signal portions propagating onto two separate optical paths, with orthogonal polarizations.

9. The bidirectional isolating device according to claim 8, further comprising at least a second polarizer, adapted for coupling said two signal portions having orthogonal polarizations on a single optical path.

10. The bidirectional isolating device according to claim 2, further comprising at least a second optical assembly including a second polarizer, a second non-reciprocal polarization rotator, a second non-wavelength selective reciprocal polarization rotator, and a second wavelength selective reciprocal polarization rotator having a half-wave behavior for a third group of frequencies and full-wave behavior for a fourth group of frequencies, said second polarizer, said second non-reciprocal polarization rotator, said second non-wavelength selective reciprocal polarization rotator and said second wavelength selective reciprocal polarization rotator being arranged within said second assembly so that a third optical signal having frequency in the third group of frequencies and a fourth optical signal having frequency in the fourth group of frequencies, input at said second polarizer with whatever polarization, exit from said second assembly so that the third optical signal is in a third polarization state and the fourth optical signal is in a fourth polarization state, orthogonal to said third polarization state, said first and second assemblies being optically coupled to a splitting component.

11. The bidirectional isolating device according to claim 10, wherein said first wavelength selective reciprocal polarization rotator has a transition between said full wave behavior and said half wave behavior at a first transition frequency, and said second wavelength selective reciprocal polarization rotator has a transition between said full wave behavior and said half wave behavior at a second transition frequency, different from said first transition frequency.

12. The bidirectional isolating device according to claim 10, comprising a first branch, a second branch, a third branch, and a fourth branch optically coupled to a splitting component, said first branch including said first assembly;

said second branch including said second assembly;

said third branch including a third assembly comprising a third polarizer, a third reciprocal polarization rotator, and a third wavelength selective reciprocal polarization rotator; and said fourth branch including a fourth assembly comprising a fourth polarizer, a fourth reciprocal polarization rotator, and a fourth wavelength selective reciprocal polarization rotator;

said first, second, third and fourth wavelength selective reciprocal polarization rotators all having a half-wave behavior for said first group of frequencies and a full-wave behavior for said second group of frequencies;

said third and said fourth assemblies being reciprocal and arranged such that said first optical signal and said second optical signal, input at said third or fourth polarizer with whatever polarization, exit from said third or fourth assembly so that the first optical signal is in a first polarization state and the second optical signal is in a second polarization state, orthogonal to said first polarization state.

13. The bidirectional isolating device according to claim 1, comprising a first branch, a second branch, a third branch, and a fourth branch optically coupled to a splitting component, wherein said first branch is non-reciprocal and includes said first polarizer, said first non-reciprocal polarization rotator and a first non-wavelength selective reciprocal polarization rotator being arranged such that any optical signal, input at said first polarizer with whatever polarization, exits from said first branch in a first polarization state;

said second branch is non-reciprocal and includes a second polarizer, a second non-reciprocal polarization rotator and a second non-wavelength selective reciprocal polarization rotator being arranged such that any optical signal, input at said second polarizer with whatever polarization, exits from said second branch in a second polarization state, orthogonal to the first state;

said third branch is reciprocal and includes said first wavelength selective reciprocal polarization rotator, a third non-wavelength selective reciprocal polarization rotator and a third polarizer being arranged such that a first optical signal having frequency in said first group of frequencies and a second optical signal having frequency in said second group of frequencies, input at said third polarizer with whatever polarization, exit from said third branch so as the first optical signal is in said first polarization state and the second optical signal is in said second polarization state; and said fourth branch is reciprocal and includes a second wavelength selective reciprocal polarization rotator, a fourth non-wavelength-selective reciprocal polarization rotator and a fourth polarizer, being arranged such that said first optical signal and said second optical signal, input at said fourth polarizer with whatever polarization, exit from said fourth branch so that the first optical signal is in said first polarization state and the second optical signal is in said second polarization state.

14. An optical amplifier comprising:
at least a first optical amplifying medium;
a pumping system suitable for generating a pumping power and for providing such pumping power to said first optical amplifying medium; and
a bidirectional isolating device comprising:
at least a first polarizer;
at least a first non-reciprocal polarization rotator arranged for rotating a polarization of a signal of substantially 45°±k·90°, wherein k is a non-negative integer; and
at least a first wavelength selective reciprocal polarization rotator having a half-wave retarder behavior for a first group of optical frequencies and a full-wave retarder behavior for a second group of optical frequencies, according to a substantially frequency periodic transfer function;

said first wavelength selective reciprocal polarization rotator comprising a predetermined number of at least five birefringent elements having a predetermined thickness and orientation, so as to obtain a transition between the half-wave retarder behavior and the full-wave retarder behavior in a frequency range lower than or equal to 40% of the period of said transfer function.

15. The optical amplifier according to claim 14, wherein said optical assembly further comprises at least a first non-wavelength selective reciprocal polarization rotator, said polarizer, said non-reciprocal polarization rotator, said first non-wavelength selective reciprocal polarization rotator and said first wavelength selective reciprocal polarization rotator being arranged within said assembly so that a first optical signal having frequency in said first group of optical frequencies and a second optical signal having frequency in said second group of optical frequencies, input at said polarizer with whatever polarization, exit from said assembly so that the first optical signal is in a first polarization state and the second optical signal is in a second polarization state, orthogonal to said first polarization state.

16. The optical amplifier according to claim 15, further comprising at least a second optical assembly including a second polarizer, a second non-reciprocal polarization rotator, a second non-wavelength selective reciprocal polarization rotator, and a second wavelength selective reciprocal polarization rotator having a half-wave behavior for a third group of frequencies and full-wave behavior for a fourth group of frequencies, said second polarizer, said second non-reciprocal polarization rotator, said second non-wavelength selective reciprocal polarization rotator and said second wavelength selective reciprocal polarization rotator being arranged within said second assembly so that a third optical signal having frequency in the third group of frequencies and a fourth optical signal having frequency in the fourth group of frequencies, input at said second polarizer with whatever polarization, exit from said second assembly so that the third optical signal is in a third polarization state and the fourth optical signal is in a fourth polarization state, orthogonal to said third polarization state, said first and second assemblies being optically coupled to a splitting component.

17. The optical amplifier according to claim 14, further comprising at least a second optical amplifying medium, said pumping system being suitable for providing said pumping power also to said second amplifying medium, said bidirectional isolating device being disposed between said first and second amplifying medium.

18. The optical amplifier according to claim 17, wherein said first or second optical amplifying medium comprises a rare-earth doped fiber.

19. The optical amplifier according to claim 17, wherein said first or second optical amplifying medium comprises a Raman-active optical fiber.

20. The optical amplifier according to claim 17, wherein said optical amplifier is adapted for transmitting and amplifying an optical signal having frequency in said first group of frequencies in a first direction from a first Raman-active optical fiber to a second Raman-active optical fiber, said pumping system comprising at least one pump source adapted for providing a first pumping radiation having frequency included in said second group of frequencies, said first pumping radiation being adapted for causing Raman amplification of said first group of signals at least in said second Raman-active optical fiber, said pumping system further comprising at least one coupler, one end of said second Raman-active optical fiber being optically connected to a first port of said coupler and said at least one pump source being optically connected to a second port of said coupler, so that said first pumping radiation may propagate in at least said second Raman-active optical fiber in a second direction, opposite to said first direction.

21. The optical amplifier according to claim 20, wherein said bidirectional isolating device is adapted for passing said first pumping radiation from said second Raman-active fiber to said first Raman-active fiber.

22. The optical amplifier according to claim 19, wherein
said pumping system comprises at least a second pump source adapted for providing a second pumping radiation having a frequency included in a third group of frequencies, said second pumping radiation being adapted for causing Raman amplification at least of said first group of signals in said first Raman-active optical; and
said bidirectional isolating device is adapted for coupling said second pumping radiation into said first Raman-active fiber in a second direction, opposite to said first direction.

23. The optical amplifier according to claim 22, wherein said bidirectional isolating device is further adapted for extracting a residual of said first pumping radiation coming out from said second Raman-active fiber.

* * * * *